United States Patent
Watanabe et al.

(10) Patent No.: US 7,957,590 B2
(45) Date of Patent: Jun. 7, 2011

(54) IMAGE PROCESSING METHOD, DISPLAY IMAGE PROCESSING METHOD, IMAGE PROCESSING DEVICE, IMAGE PROCESSING PROGRAM, AND INTEGRATED CIRCUIT DEVICE INCLUDING THAT IMAGE PROCESSING DEVICE

(75) Inventors: Tatsumi Watanabe, Osaka (JP); Yasuhiro Kuwahara, Osaka (JP); Akio Kojima, Osaka (JP); Haruo Yamashita, Osaka (JP); Toshiharu Kurosawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 936 days.

(21) Appl. No.: 11/886,277

(22) PCT Filed: Mar. 29, 2006

(86) PCT No.: PCT/JP2006/306509
§ 371 (c)(1),
(2), (4) Date: Sep. 13, 2007

(87) PCT Pub. No.: WO2006/106754
PCT Pub. Date: Oct. 12, 2006

(65) Prior Publication Data
US 2008/0181494 A1    Jul. 31, 2008

(30) Foreign Application Priority Data
Mar. 31, 2005   (JP) ................. 2005-100773

(51) Int. Cl.
*G06K 9/00* (2006.01)
(52) U.S. Cl. ....................... 382/167; 382/162
(58) Field of Classification Search ........... 382/167, 382/162; 348/602, 364, 227.1; 399/260, 399/341, 224, 120; 345/603, 604
See application file for complete search history.

(56) References Cited

U.S. PATENT DOCUMENTS
5,754,682 A    5/1998   Katoh ..................... 382/162
(Continued)

FOREIGN PATENT DOCUMENTS
JP    2-54297    2/1990
(Continued)

OTHER PUBLICATIONS

International Search Report (in English language) of Apr. 25, 2006 issued in International Application No. PCT/JP2006/306509.

*Primary Examiner* — Anh Hong Do
(74) *Attorney, Agent, or Firm* — Wenderoth, Lind & Ponack, L.L.P.

(57) ABSTRACT

An aim of the invention is to achieve an image processing method that performs color information correction of an image more naturally with a simple configuration. The image processing method of the invention is an image processing method that performs color information correction of image data that have been input, and includes an information calculation step (S11), a characteristic calculation step (S12), a color information correction step (S13), and an output step (S14). The information calculation step (S11) calculates the color information of the image data. The characteristic calculation step (S12) calculates the visual characteristic information in accordance with the color information. The color information correction step (S13) corrects the color information based on the visual characteristic information that is calculated in the characteristic calculation step (S12). The output step (S14) outputs the image data after color information correction based on the color information that has been corrected in the color information correction step (S13).

19 Claims, 32 Drawing Sheets

U.S. PATENT DOCUMENTS

| | | | |
|---|---|---|---|
| 6,701,011 B1 | 3/2004 | Nakajima | 382/167 |
| 7,667,764 B2 * | 2/2010 | Kamon et al. | 348/364 |
| 2001/0012399 A1 | 8/2001 | Tohyama et al. | 382/167 |

FOREIGN PATENT DOCUMENTS

| | | |
|---|---|---|
| JP | 3-279996 | 12/1991 |
| JP | 9-93451 | 4/1997 |
| JP | 10-210306 | 8/1998 |
| JP | 2001-16469 | 1/2001 |
| JP | 2001-292333 | 10/2001 |
| JP | 2002-281327 | 9/2002 |
| JP | 2004-312250 | 11/2004 |

* cited by examiner

IMAGE PROCESSING METHOD, DISPLAY IMAGE PROCESSING METHOD, IMAGE PROCESSING DEVICE, IMAGE PROCESSING PROGRAM, AND INTEGRATED CIRCUIT DEVICE INCLUDING THAT IMAGE PROCESSING DEVICE

TECHNICAL FIELD

The present invention relates to image processing methods, particularly image processing methods for correcting color image data that have been input. The present invention also relates to display image processing methods, image processing devices, image processing programs, and integrated circuits.

BACKGROUND ART

There has conventionally been a need to appropriately perform color correction (color information correction) on image signals in order to improve the image signal visibility, for example.

For example, one issue is that, when viewing the display screen of a portable telephone, for example, outdoors during the daytime or on the train, the direct sunlight, etc., may cause the display screen to become saturated white, and this makes it difficult to view the information that is displayed on the display screen.

Generally speaking, there is a substantial demand for improvements to this situation. To meet this demand, many undertakings for improving the liquid crystal device characteristics of the display screen are under investigation. Of such undertakings, one approach that is generally known is the method of changing the liquid crystal transmissivity of the display screen according to the ambient light level of the surroundings. Devices that use this method are known to improve the ratio of the white pixels with the highest luminance to the black pixels with the lowest luminance (the contrast ratio) to about 20:1 to 15:1. However, the aim of such devices is to improve the visibility with regard to the luminance, and they do nothing to improve the loss of color information, such as color difference, hue, or color saturation, due to strong ambient light such as sunlight during the day. Further, it has been pointed out that the white to black contrast ratio falls to about 3:1 to 2:1 during the afternoon, and thus even using a device that is capable of contrast ratios of about 20:1 to 15:1 often may not produce a sufficient improvement in the visibility in terms of the luminance.

Thus, to improve the visibility of a display screen in strong ambient light conditions, it is necessary to correct the color information as well as the luminance.

Improvements in display device performance (i.e. improvements in resolution, an increase in the number of expressible colors, and improvements in the performance of color correction centered on memory colors) have increased user awareness of the color information, and in cases where color information is to be corrected, color correction that is more natural and compatible with human visual characteristics is desirable.

For example, one image processing method takes into account the color contrast characteristics of human vision. With this image processing method, the foreground and the background of an image are extracted based on the hue histogram and the pixel area of the image, and the hue of the background with respect to the foreground is corrected uniformly (for example, see Patent Document 1). Here, the goal is to keep a low level of color in the background with respect to the foreground, in consideration of human color contrast characteristics.

An image processing device that achieves this image processing method is described using FIG. 30. FIG. 30 is a block diagram of a color correction determination portion 2005 that performs color correction determination in the image processing device. As shown in FIG. 30, the color correction determination portion 2005 is furnished with an image memory 2000, a solid image determination portion 2001, a histogram creation portion 2002, a foreground/background discrimination portion 2003, and a color number discrimination portion 2004. The image memory 2000 holds the images. The solid image determination portion 2001 determines whether an image is a solid image based on whether or not a number of hue regions that is equal to or greater than a certain threshold value are continuous over at least a predetermined number of pixels in a predetermined hue histogram. The histogram creation portion 2002 creates histograms of the hue, color saturation, and color value of the solid image. The foreground/background discrimination portion 2003 determines the foreground, background, and others based on the histograms that have been created. The color number discrimination portion 2004 determines whether or not the image is a full-color image.

FIG. 31 shows a flowchart of the image processing method achieved by this image processing device, and FIG. 32 shows a flowchart of hue correction.

The image processing method shown in FIG. 31 is described. In the image processing method, first the color number is ascertained (S100), and then whether or not the color number exceeds a threshold value Th1 that indicates "full color" is determined (S101), and if the image is full color, then the procedure advances to S102, and if it is not full color, then the procedure is ended.

In S102, the solid image portions are determined, and in S103, histograms H(h), H(v), and H(s) of the hue h, the color value v, and the color saturation s of the solid image portions are created. Next it is determined whether the values of the histograms exceed a threshold value Th2 (S104). If the result of this determination is yes, then this determination is continued until it has been performed for all the values (S105). It should be noted that FIG. 31 shows only the hue h and the histogram H(h), but this determination is also performed for H(v) and H(s) as well. When the determination has been performed for all values (S105), it is determined whether there is more than one H(h), etc., that exceeds the threshold value (S106).

If the result of this determination is yes, then it is determined whether those belong to the foreground, the background, or to another region that is neither the foreground nor the background (S107). If the result of this determination is yes, then the color correction process S108 shown in FIG. 32 is executed. This process is not executed if the result of any one of the determinations in S101, S104, S106, or S107 is no. Due to this processing, if the area occupied by a foreground color and a background color is equal to or greater than a predetermined size, then the appropriate color correction is performed, whereas color correction is not performed if this is smaller than the predetermined size.

The color correction process shown in FIG. 32 is described.

First, the hue (ha) of the background color is extracted (S200) and the correction level Aha of ha in the color difference axis direction is extracted (S201). Next, in S202, the hue (hf) of the foreground color is extracted, and hf+Aha is set as the new hue hf of the foreground color (S203).

By performing this process, the goal of the above conventional technology is to nullify the effects of the foreground portion taking on color in the direction that the background portion is corrected due to hue contrast phenomena, and thereby faithfully make the color reproduction.

With this conventional technology, it is necessary to accurately extract the solid image regions that have a predetermined pixel size and that are included in a particular hue region, and it is also necessary to accurately determine whether or not the solid image regions are in the foreground or in the background.

[Patent Document 1] JP 2001-292333A

DISCLOSURE OF THE INVENTION

Problem to be Solved by the Invention

This conventional image processing method requires a process for extracting the foreground and the background using histograms of the hue, color saturation, and color value. The extraction process includes a determination that is based on the pixel area. Thus, to extract the foreground and the background, the foreground and the background each must have a sufficient pixel area. The conventional technology therefore often was not suited for extraction in natural images. The extraction process also inevitably includes extraction error, which may lead to correction mistakes at boundaries, for example. Additionally, the correction amount that is used to correct color in the extracted background is set to a correction amount that is uniform throughout the background. Areas in a background that are changing may therefore be overcorrected, and thus processing to inhibit this becomes necessary.

Thus, there is a need for conventional image processing methods to more readily perform natural color correction on image signals.

Accordingly, it is an aim of the invention to achieve an image processing method with which color correction is performed in images more naturally using a simple configuration.

Means for Solving Problem

A first aspect of the invention is an image processing method that performs a color information correction of image data that have been input, and includes an image calculation step, a characteristic calculation step, a color information correction step, and an output step. The information calculation step calculates the color information of an image signal. The characteristic calculation step compares the color information of a first region that is included in a two-dimensional image region created by the image signal, with the color information of a second region that is present in an area around the first region, and calculates the contrast amount. The color information correction step uses the contrast that was calculated in the characteristic calculation step to correct the color information of the first region so that the ratio with respect to the color information of the second region is enhanced. The output step outputs an image signal that includes the corrected first region.

The characteristic calculation step includes color contrast processing of comparing the color information of the target pixels or region with surrounding color information that is representative of the color information in the surrounding region. The first region can be a region made of a single pixel or a plurality of pixels. If the first region is a single pixel, then the second region is constructed from the pixels present around that pixel, such as the pixels adjacent above, below, left, and right of that pixel. If the first pixel belongs to a region made of a plurality of pixels, then the second region is constructed from regions that surround the first region, such as a region made of a plurality of pixels adjacent above, below, left, and right of that region.

With this aspect of the invention, it is possible to correct the color information of the target pixel or target region through color contrast processing in which the color information (color difference, color saturation, hue, etc.) of the target pixel or target region is compared with the representative color that is representative of the color information in the region surrounding the target pixel or target region (such as within the region of the field of view). In this invention, correction is performed so as to enhance the color contrast, and thus it is possible to perform color information correction that is suited to human visual characteristics. Further, it is not necessary to perform processing to extract an object, and this eliminates the impact of extraction error. Thus, it is possible to achieve color information correction that is suited to human visual characteristics and that has a simple configuration.

A second aspect of the invention is the first aspect, further including a region selection step of selecting a plurality of target regions, each of which includes at least one pixel, to become the targets of the first color information correction. The information calculation step calculates the color information and the brightness information of the image signal that has been input. The characteristic calculation step compares the color information and the brightness information of the plurality of target regions that have been selected in the region selection step, with the color information and the brightness information of a plurality of surrounding regions that are present in the areas surrounding the plurality of target regions, to calculate a contrast amount. The color information correction step includes a first color information correction step and a second color information correction step. The first color information correction step uses the contrast amount that has been calculated in the characteristic calculation step to correct the color information so that the contrast with the plurality of surrounding regions that surround the selected target regions is enhanced. The second color information correction step uses information related to the first color information correction to perform a second color information correction on regions other than the selected target regions. The output step outputs an image signal that includes the regions corrected in the first color information correction step and the second color information correction step.

The characteristic calculation step includes brightness contrast processing and color contrast processing of comparing the brightness information and the color information of the target pixels with surrounding brightness information and surrounding color information, which are representative of the brightness information and the color information in the surrounding region.

In one example of this aspect of the invention, a plurality of pixels are selected based on a predetermined reference. Then, the color information of the selected pixels is corrected based on color contrast information that is obtained by comparing the color information (e.g. color difference, color saturation, hue) of the selected pixels and the representative color that is representative of the color information in the surrounding region that has been set around those pixels (such as within the region of the field of view). Next, to the surrounding pixels that surround the selected pixels, the color information of the reference pixel is propagated to the surrounding pixels in accord with the distance to the reference pixel in the color space (colorization), for example, to correct the color information of the entire image.

In another example of this aspect of the invention, brightness contrast information that is obtained by comparing the brightness information of target pixels and the representative brightness that is representative of the brightness information in a surrounding region that has been set around the target pixels (such as within the region of the field of view) is found. Also, color contrast information that is obtained by comparing the color information (e.g. color difference, color saturation, hue) of the target pixels and the representative color that is representative of the color information in the surrounding region that has been set around the target pixels (such as within the region of the field of view) is found. Then, the pixels to be subjected to color information correction are determined based on the two types of contrast information. Further, color information correction is performed on the pixels that have been determined, based on the color contrast information, and taking the plurality of corrected pixels as the reference pixels, the color information is propagated to the surrounding pixels, and thus the color information of the entire image is corrected.

In the second aspect of the invention, the processing can use pixels as the processing unit or can use blocks that are obtained by dividing the pixels into a plurality of components as the processing unit. If blocks serve as the unit, then the second aspect of the invention can be further provided with an image subdividing step of subdividing the image. In this case, the amount of processing can be reduced compared to a case in which processing is performed for every pixel.

With the above second aspect of the invention, color information correction of regions that likely will be of interest to humans is performed based on the color contrast. Further, it is possible to perform color information correction of the entire image while retaining the overall balance of the image through colorization, for example. Thus, it is possible to achieve high accuracy color information correction without causing color information correction error at boundaries.

The third aspect of the invention is the second aspect of the invention, in which the region selection step includes a step of selecting regions that are located a predetermined spacing from the positions of the regions targeted for the first color information correction.

The fourth aspect of the invention is the second aspect of the invention, in which the region selection step includes a step of selecting a plurality of target regions to become targets for the first color information correction, using visual characteristic information relating to the brightness information and the color information, or visual characteristic information relating to only the brightness information, of the regions.

The fifth aspect of the invention is the second aspect of the invention, in which the second color information correction step propagates color information in order to the regions surrounding the plurality of target regions, based on the color information of the plurality of target regions that has been corrected in the first color information correction step, performing correction of the color information of the surrounding regions.

The sixth aspect of the invention includes a processing mode reception step, an image processing execution step, and a display step. The processing mode reception step receives selection of a processing mode through input portion. The image processing execution step executes the image processing method according to the first aspect or the second aspect of the invention, in accord with the processing mode that has been obtained in the processing mode reception step. The display step displays on display means an image signal after color information correction that is output in the image processing execution step.

With this invention, the user can select a processing mode such as the strength of the color information correction while confirming the effect of the color information correction on a display device, for example. Thus, it is possible to perform color information correction that increases the visibility according to a demand of each user.

The seventh aspect of the invention includes an ambient light detection step, a processing mode determination step, an image processing execution step, and a display step. The ambient light detection step detects ambient light that is irradiated on display means for displaying an image signal after color information correction. The processing mode determination step determines a processing mode according to the ambient light that is detected in the ambient light detection step. The image processing execution step executes the image processing method according to the first aspect or the second aspect of the invention, in accord with the processing mode that has been determined in the processing mode determination step. The display step displays on display means an image signal after color information correction that is output in the image processing execution step.

With this invention, it is possible to control the strength of the color information correction based on the ambient light level (or the contrast ratio in the usage environment, for example) detected by an ambient light detection portion such as a sensor. That is, it is possible to automatically change the strength of the color information correction taking into account the effects of the ambient light in the environment in which the device is to be used. Further, providing the processing mode reception step of the sixth aspect of the invention allows the strength of the color information correction to be changed automatically according to the usage environment, and also allows the user to confirm the effects of the color information correction on a display device, for example, and to select the correction strength again.

The eighth aspect of the invention is the sixth aspect of the invention, in which the processing mode reception step selects the strength with which to correct the color information from a plurality of preset strengths.

The ninth aspect of the invention is the seventh aspect of the invention, in which the processing mode determination step is performed in such a manner that the processing to correct the color information is activated in a case where the strength of the ambient light that has been obtained in the ambient light detection step exceeds a predetermined threshold value.

The tenth aspect of the invention is the seventh aspect of the invention, in which the processing mode determination step is performed in such a manner that the strength with which to correct the color information is changed by a predetermined function according to the strength of the ambient light that has been obtained in the ambient light detection step.

The eleventh aspect of the invention is the seventh aspect of the invention, in which the processing mode determination step is performed in such a manner that the strength with which to correct the color information is changed over time through a predetermined function according to the change over time in the ambient light that has been obtained in the ambient light detection step.

The twelfth aspect of the invention is the seventh aspect of the invention, in which the processing mode determination step controls the strength with which to correct the color information in each of a plurality of regions that are included in the display region, according to fluctuations in the strength of the ambient light that has been obtained in the ambient light detection step, in the plurality of regions included in the display region of the display means.

The thirteenth aspect of the invention is the first aspect of the invention, in which color information correction is carried out in such a manner that the strength of the color information correction increases and decreases according to fluctuations in the size of a predetermined pattern that generates color contrast phenomena.

With the invention, the strength of color information correction can be altered between that for a doughnut-shaped pattern A (pattern made of two concentric circles) in which the background and the coloring are different, and a pattern B in which the background and the coloring of a doughnut-shaped pattern are the same, and which is larger than the pattern A and whose shape resembles the shape of pattern A. Thus, color information correction that is strong and suited for visual characteristics can be performed on small regions in which there is a large change in the color, for example, and color information correction that is weak can be performed on large regions in which there is a small change in the color, for example.

The fourteenth and fifteenth aspects of the invention are image processing devices that exhibit the same effects as the image processing methods of the first and second aspects of the invention.

The sixteenth and seventeenth aspects of the invention are image processing programs (program products) that exhibit the same effects as the image processing methods of the first and second aspects of the invention.

The eighteenth and nineteenth aspects of the invention are integrated circuits that exhibit the same effects as the image processing methods of the first and second aspects of the invention.

Effects of the Invention

With the image processing methods, the display image processing methods, the image processing devices, the image processing programs, and the integrated circuits that include those image processing devices according to the invention, it is possible to achieve image processing with which color correction of an image is performed more naturally and which employs a simple configuration.

Figure 1:
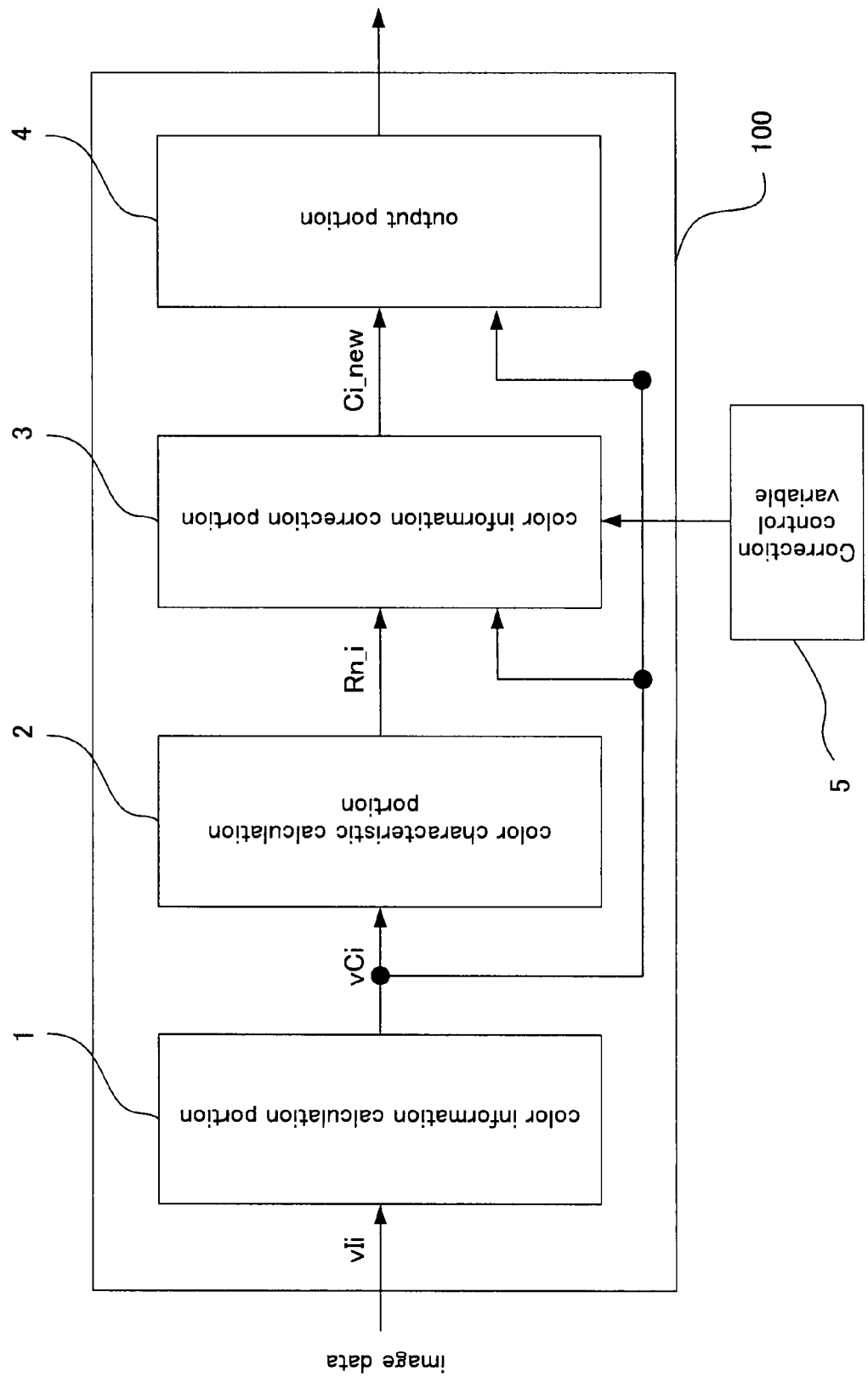
FIG. 1 is a block diagram showing the configuration of the image processing device according to a first aspect of the invention.

DESCRIPTION OF THE REFERENCE NUMERALS 1 color information calculation portion
2 color characteristic calculation portion
3 color information correction portion
4 output portion
5 correction control variable
100 image processing device
6 surrounding representative color extraction portion
7 color contrast information calculation portion
10 information calculation portion
11 pixel selection portion
12 characteristic calculation portion
13 selected pixel color information correction portion
14 color information propagation correction portion
15 control variable
200 image processing device
16 reference setting portion
17 surrounding color information calculation portion
18 propagation determination portion
40 second pixel selection portion
400 image processing device
50 image partitioning portion
51 block information calculation portion
52 processing block selection portion
53 block characteristic calculation portion
54 selected block color information correction portion
55 color information block propagation correction portion
56 pixel transformation portion
500 image processing device
60 block selection portion
600 image processing device
70 estimation pixel selection portion
71 balance amount calculation portion
72 balance correction portion
73 estimation control variable
700 image processing device
80 revised color characteristic calculation portion
800 image processing device
90 second balance amount calculation portion
91 second balance correction portion
900 image processing device
1000 image processing portion
1001 user mode selection portion
1002 display device
1100 processing control portion
1101 ambient light detection portion
2000 image memory
2001 solid image discrimination portion
2002 histogram creation portion
2003 foreground/background discrimination portion
2004 color number discrimination portion

BEST MODE FOR CARRYING OUT THE INVENTION

First through eleventh embodiments are described below as the best modes of the invention.

In the first embodiment, color correction is executed using the color contrast information of the pixels.

In the second embodiment, color correction is executed using the color contrast information of the pixels selected by a predetermined method. Also, a propagation process is performed on the surrounding pixels around the selected pixels that have the color information after that correction, so as to correct the color information of the surrounding pixels. By doing this, color correction is performed on the entire image.

In the third embodiment, first the pixels to be corrected are selected using the color contrast information of the pixels and then color correction is performed on those selected pixels. Also, a propagation process is performed on the surrounding pixels around the selected pixels that have the color information after that correction, so as to execute color information correction on the surrounding pixels. By doing this, color correction is performed on the entire image.

The fourth embodiment is a modified example of the second embodiment, in which rather than executing the color contrast processing and the propagation processing on pixels serving as the processing unit, color correction is performed on subdivided blocks serving as the processing unit.

The fifth embodiment is a modified example of the third embodiment, in which rather than executing the color contrast processing and the propagation processing on pixels serving as the processing unit, color correction is performed on subdivided blocks serving as the processing unit.

In the sixth embodiment, regions that a human will perceive as bright are estimated from the brightness contrast information and the color contrast information of the target image. Further, the amount of displacement from the gray axis (non-color axis) of the color information of the region is used to correct the color balance of the overall image.

In the seventh embodiment, the color correction processing of the first embodiment is performed after the color balance correction of the sixth embodiment.

In the eighth embodiment, the color correction processing of the first embodiment is performed after the color balance correction of the sixth embodiment. In particular, the eighth embodiment is characterized in that the effects of color correction when estimating the color balance correction.

In the ninth embodiment, an image processing of the first embodiment through the eighth embodiment is used, and the user selects the processing mode, e.g. the correction level, of the image processing.

In the tenth embodiment, an image processing of the first embodiment through the eighth embodiment is used, and the processing mode, e.g. the correction level, of the image processing is controlled automatically based on detections of the ambient light.

In the eleventh embodiment, an image processing of the first embodiment through the eighth embodiment is used, and the processing mode, e.g. the correction level, of the image processing is controlled automatically based on detections of the ambient light, and using those results the user further selects the processing mode.

First Embodiment

An image processing method and an image processing device 100 that perform color information correction based on color contrast information in the pixels are described in a first embodiment of the invention using FIGS. 1 to 6.

Figure 3:
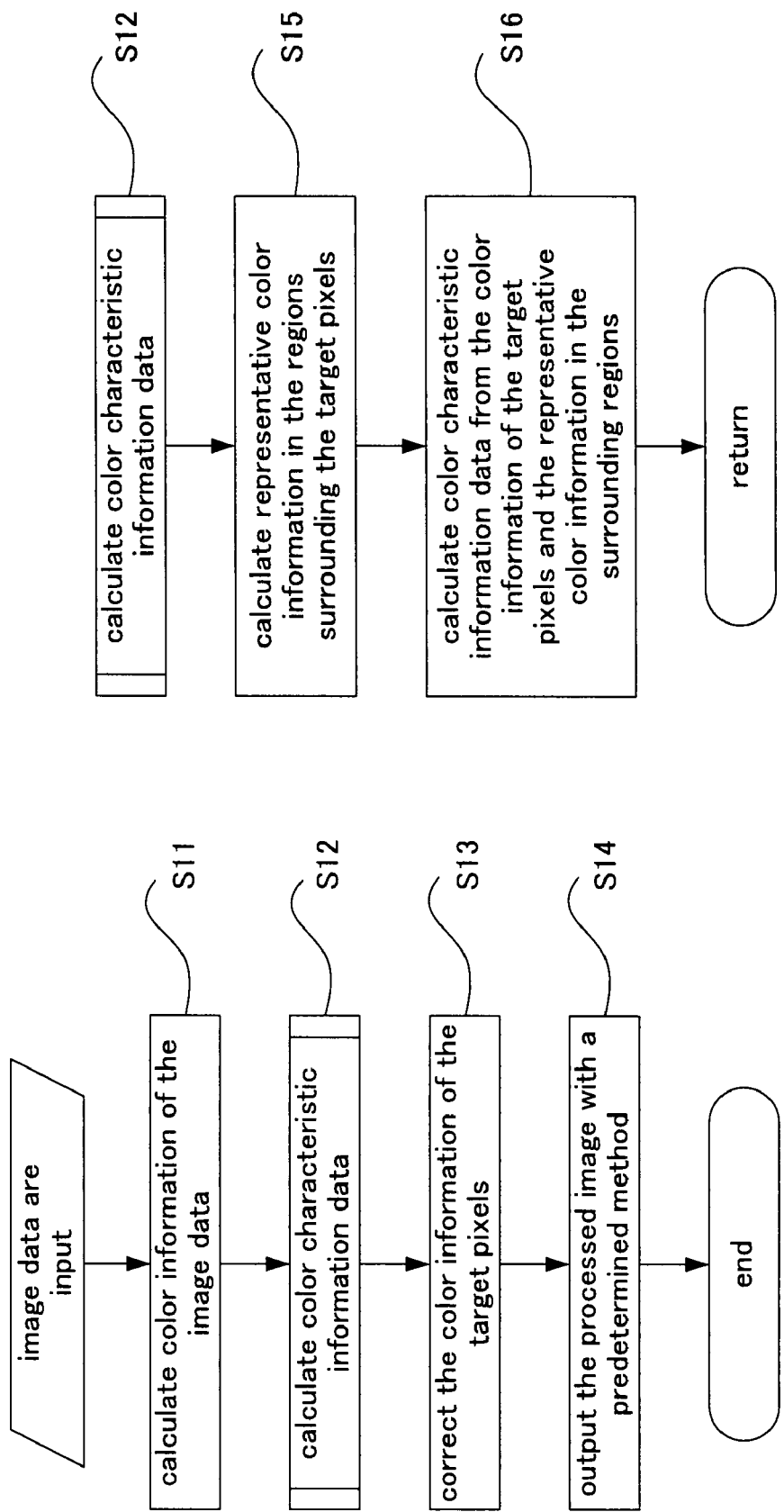
FIG. 3 is a process flowchart of the image processing method according to the first aspect of the invention.

FIG. 1 shows the configuration of the image processing device 100, which is an aspect of the first embodiment of the invention. Also, FIG. 3 shows a process flowchart of the image processing method of the first embodiment of the invention.

The invention is a device that corrects the color information of an image by processing the image data, and for example can be provided in image-capturing devices such as digital still cameras and digital video cameras, image editing devices for editing digital images, portable telephones used in a mobile environment, car mobile devices, and PDAs, or in large-size video display devices that may be used in various environments.

When image data vIi are input to the image processing device 100, color information calculation portion 1 converts the data of the pixels making up the image data vIi to predetermined color information vCi (S11). Here, the image data vIi are converted into predetermined color information vCi that are easy to handle as color information, such as HSV space data constituted by the hue H, color saturation S, and color value V, YCbCr space data constituted by the luminance Y and the color differences Cb and Cr, or La*b* space data constituted by the color value L and the colors a* and b*, but it is also possible for the image data vIi to be handed as they are.

Figure 2:
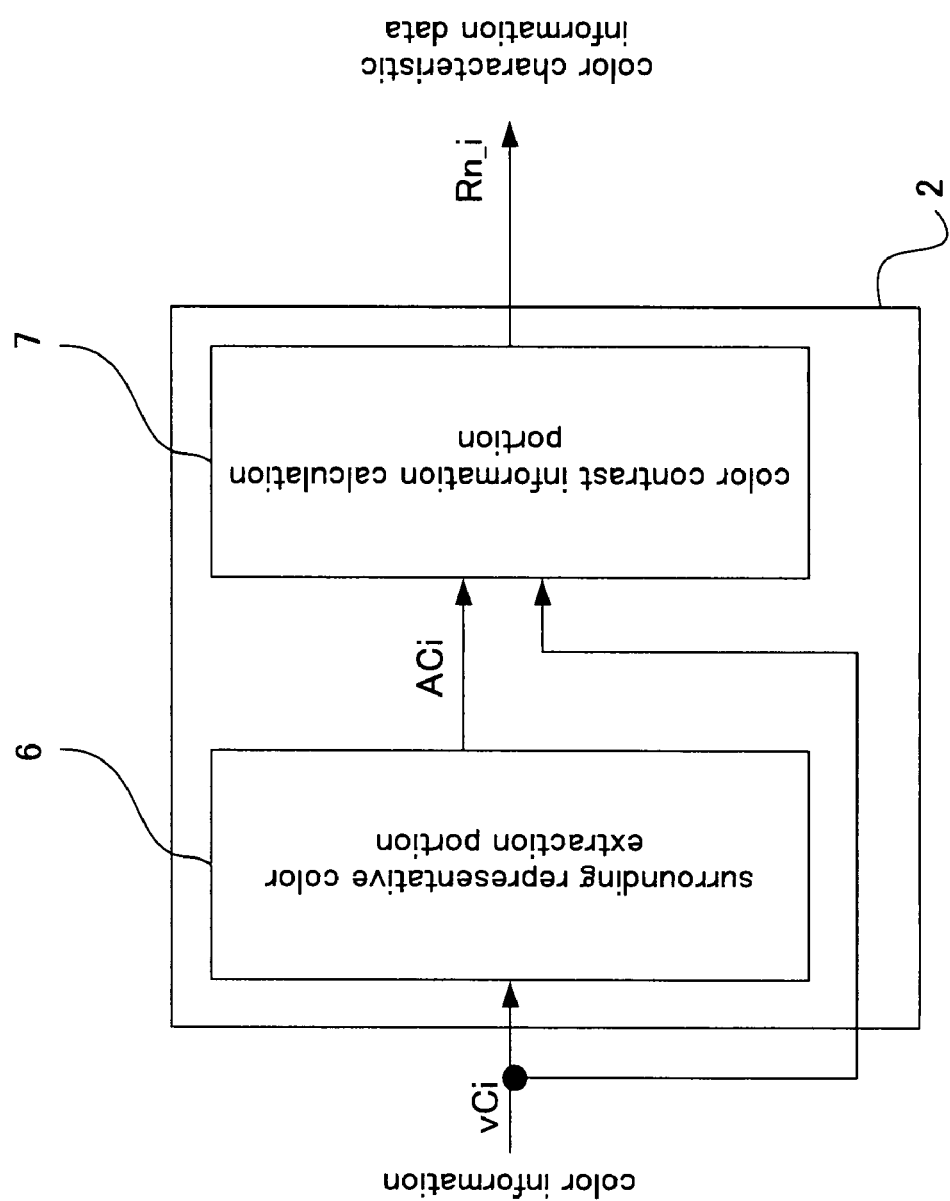
FIG. 2 is a block diagram showing the configuration of the color characteristic calculation portion of the invention.

Color characteristic calculation portion 2 calculates the color characteristic information data relating to the color information to be corrected, of the color information vCi that has been obtained by the color information calculation portion 1 (S12). For example, if the color information vCi has been converted to an HSV system and correction of the color saturation S is to be performed, then the color characteristic information data of the color saturation S are calculated. It should be noted that here Ci refers to the color information to be corrected, of the color information vCi of a pixel Pi. As shown in FIG. 2, the color characteristic calculation portion 2 creates, for each pixel, color characteristic information data Rn_i via surrounding representative color extraction portion 6 and color contrast information calculation portion 7. First, the surrounding representative color extraction portion 6 calculates the representative color information ACi of the region surrounding the target pixel Pi (S15), then the color contrast information calculation portion 7 creates color characteristic information data Rn_i from the color information Ci and the representative color information ACi of the target pixel Pi (S16).

Further, color information correction portion 3 corrects the color information Ci of the target pixel Pi (S13). Output portion 4 outputs the corrected color information, and the color information that was not targeted for correction, using a predetermined method (S14). The above processing is performed for every pixel of the image data vIi.

The processing of the color characteristic calculation portion 2, the color information correction portion 3, and the output portion 4 is described in further detail below.

There are many conceivable possibilities for the color characteristic information data Rn_i, but here, in order to achieve correction whose result is close to what would be seen by the human eye (correction that is suited to our visual characteristics), information that corresponds to human visual characteristics is used as the color characteristic information data Rn_i. Human visual characteristics include many factors, but here the color contrast characteristics relating to the color characteristics are used. It should be noted that in addition to these, it is also possible to use the brightness contrast or size or pixel characteristics, for example.

Figure 4:
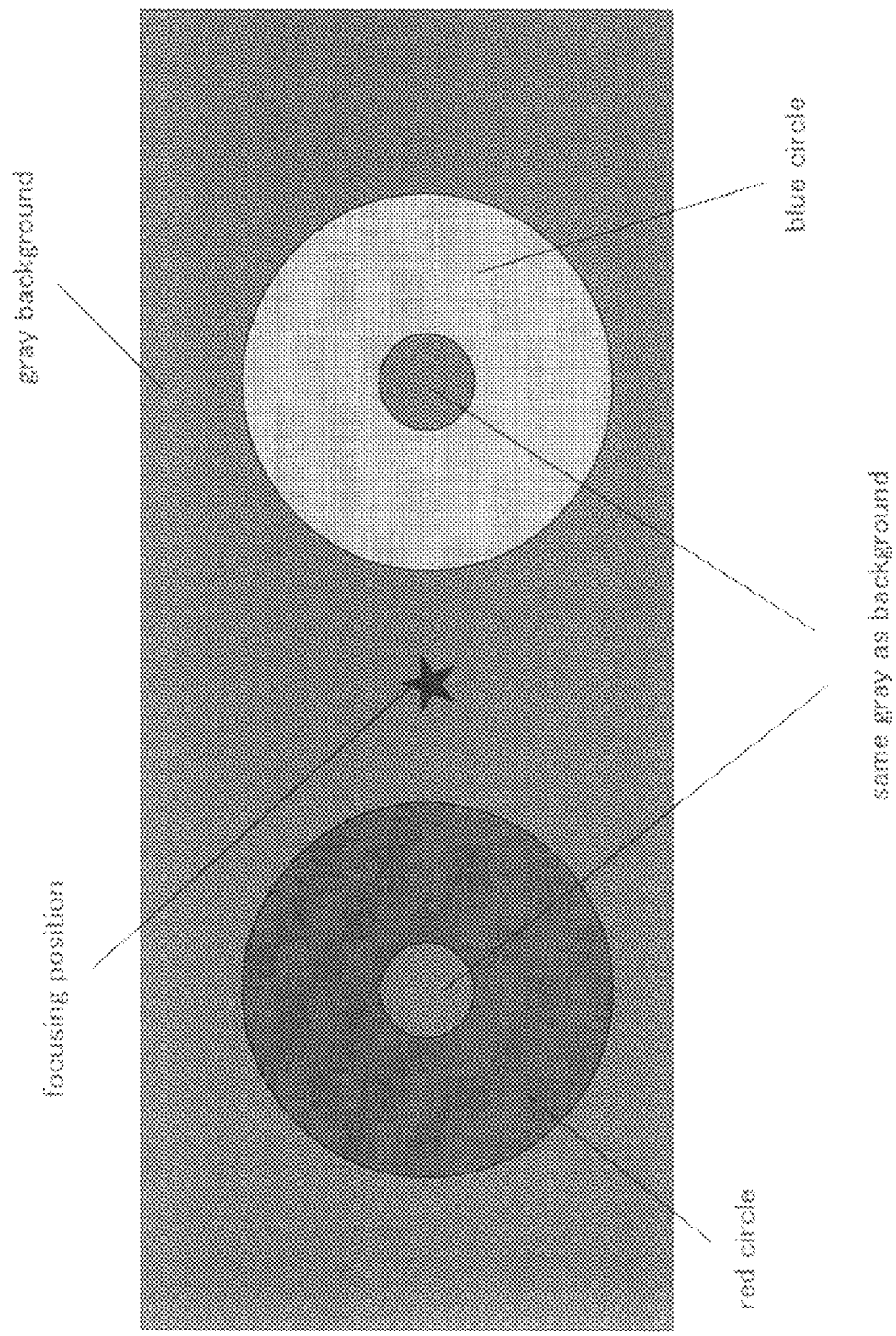
FIG. 4 is an explanatory diagram showing an overview of the color contrast phenomena in the invention.

FIG. 4 schematically shows the concept of the color contrast characteristics. FIG. 4 shows two circles, a red circle and a blue circle, with open centers on a gray background. It should be noted that the central region of the two circles is identical to the gray background. It is understood from visual psychology that when looking at these two circles and focusing on the fixation position indicated by the star mark, there is a tendency to perceive the center of the red circle as slightly blue and to perceive the center of the blue circle as slightly red. This phenomenon is the result of our color contrast characteristics. Our color contrast characteristics arise from the fact that the perceived (viewed) color saturation or hue of a target object is affected when the target object is surrounded by a region whose color saturation or hue is different. Specifically, the following effects (a) and (b) are known.

(a) When the surrounding region has a different hue, there is a feeling that the complementary colors of the surrounding hue have been added to the target object.

(b) When the color saturation of the region surrounding the target object is higher than the color saturation of the target object, the color saturation of the target object feels low. Conversely, when the color saturation of the region surrounding the target object is lower than the color saturation of the target object, the color saturation of the target object feels high.

In this invention, these color contrast characteristics are used to correct the color information of the pixels, and in doing so results in color correction that produces an impression that is closer to human vision.

Figure 5:
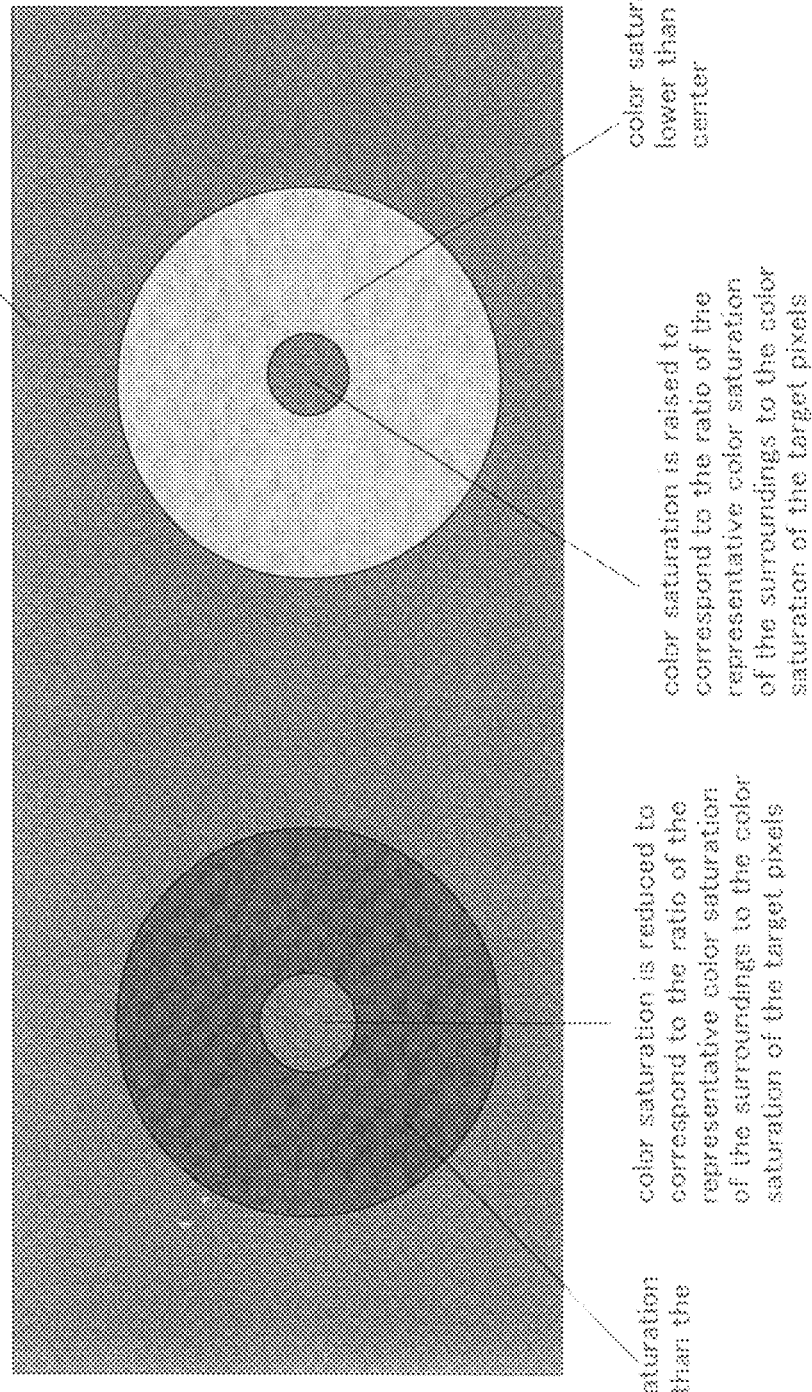
FIG. 5 is an explanatory diagram showing an overview of color saturation correction by the color information correction portion.

For example, if, of the color information vCi, the color saturation Si of the pixel Pi is taken as the color information Ci to be corrected, then, as schematically shown in FIG. 5, by performing color saturation correction it is possible to perform color correction that produces an impression that is close to human vision. The color saturation correction shown in FIG. 5 is correction in which the color saturation Si of the target pixel Pi is reduced in a case where the color saturation Si of the target pixel Pi is lower than the representative color saturation SiR of its surroundings (for example, a case where the target pixel Pi is in the center area of the left circle), and in which the color saturation Si of the target pixel Pi is increased in a case where the color saturation Si of the target pixel Pi is higher than the representative color saturation SiR of its surroundings (for example, a case where the target pixel Pi is in the center area of the right circle). It should be noted that the color saturation Si of the target pixels Pi is reduced or increased according to the ratio of the color saturation Si of the target pixels to the representative color saturation SiR of the surroundings.

As for the representative color saturation SiR surrounding the target pixel Pi, the weighted mean of the color saturation of the pixels within a pixel region $\Omega i$ that has a predetermined area corresponding to the viewing region is calculated. It should be noted that the pixel region $\Omega i$ is, for example, a circular region with the target pixels Pi at its center, whose radius is 1/5 to 1/4 the size (horizontal direction size or vertical direction size) of the image data vIi that are input. It should be noted that in addition to this, as the representative color saturation SiR of the surroundings it is also possible to use the color saturation value with the highest frequency in the color saturation histogram in the viewing region, a representative color saturation obtained by clustering based on the statistical distribution within the viewing region, or the mean color saturation value in the viewing region. In this case, the color information other than the color saturation in the pixels Pi is saved and is not changed. It is thus possible to retain the balance of the image.

Figure 6:
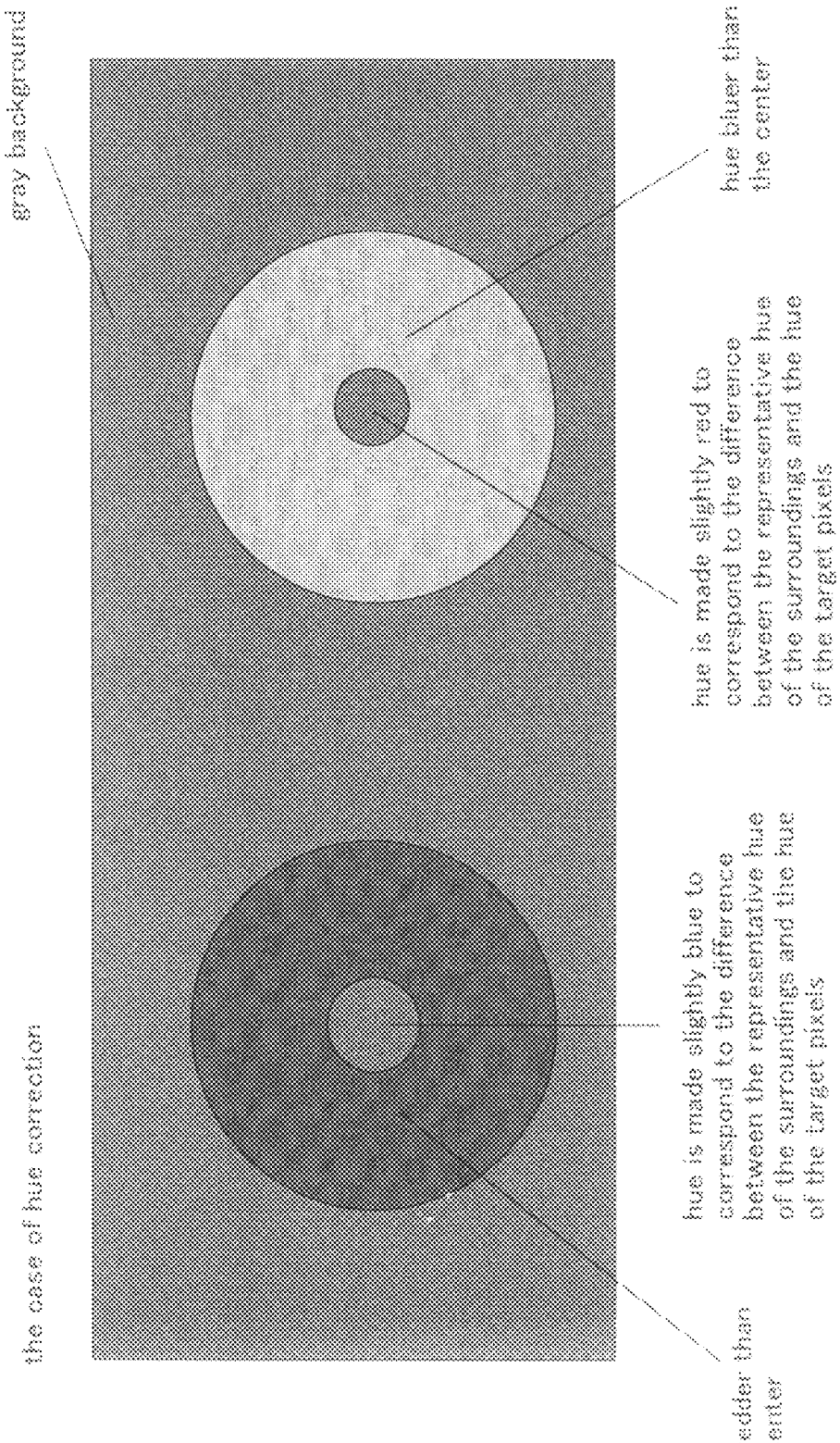
FIG. 6 is an explanatory diagram showing an overview of hue correction by the color information correction portion.

Also, for example if the hue Hi of the pixels Pi of the color information vCi is regarded as the color information Ci to be corrected, then, as shown schematically in FIG. 6, it is possible to perform color correction that gives an impression that is close to human vision by performing hue correction. The hue correction shown in FIG. 6 is correction of the hue Hi of the target pixels Pi in the blue direction if the representative hue HiR of the surroundings is more red then the hue Hi of the target pixels Pi (for example, if the target pixels Pi are in the center of the left circle). It should be noted that when correcting in the blue direction, the correction amount is determined according to the difference between the hue Hi of the target pixels Pi and the representative hue HiR. At this time, the color information other than the hue is saved. Also, to suppress the negative effects of creating a sudden change in the hue, the movement amount (correction amount) of the hue can be suppressed so as to retain the image balance as much as possible. On the other hand, in a case where the representative hue HiR of the surroundings is more blue then the hue Hi of the target pixel Pi (for example, if the target pixels Pi are in the center of the right circle), the hue Hi of the target pixels Pi is corrected in the red direction.

As for the representative hue HiR surrounding the target pixels Pi, the weighted mean of the hue of the pixels within a pixel region Ωi having a predetermined area corresponding to the viewing region is calculated. The pixel region Ωi is determined in the same way as above. It should be noted that in addition to this, as the representative hue HiR of the surroundings it is also possible to use the hue value with the highest frequency in the hue histogram in the viewing region, a representative hue obtained through clustering based on the statistical distribution within the viewing region, or the mean hue value in the viewing region. It should be noted that here the hue Hi is described as being moved in a predetermined direction, but it is also possible to move the hue by moving the color differences Cb and Cr in the YCbCr color space. In this case, qualitatively, a blue component is produced by increasing the color difference Cb and a red component is produced by moving the color difference Cr.

Based on this approach, the color characteristic calculation portion 2 calculates the color characteristic information data Rn_i of the pixels, and the color information correction portion 3 corrects the target color information Ci of the pixels. An example of this can be expressed through Formula I and Formula II.

[Formula I]

$$Ci\_new = Ci + \eta \times G\left(\frac{Ci}{ACi} - 1.0\right) \wedge\wedge \quad (1)$$

[Formula II]

$$G(x) = \begin{cases} Gmax(x > TH0) \\ \mu \times x(|x| < TH0) \\ -Gmax(x < -TH0) \end{cases} \wedge\wedge\wedge \quad (2)$$

The color information correction portion 3 corrects the target color information Ci of the target pixels Pi according to Formula I. In Formula I, Ci_new refers to the target color information of the pixels Pi that have been corrected based on the color contrast, and ACi refers to the representative color information surrounding the pixels Pi (for example, the representative color saturation SiR or the representative hue HiR), and the information η calculated by the surrounding representative color extraction portion 6 is a positive constant. Also, in Formula II, TH0 and Gmax are predetermined positive constants, and μ is a predetermined positive constant that satisfies the relationship 0<μ<1.

In Formula I, Ci/ACi is the color characteristic information data Rn_i that is calculated by the color contrast information calculation portion 7.

It should be noted that in addition to correction using Formula I and Formula II, it is also possible to perform correction that uses a Formula III and a Formula IV.

[Formula III]

$$Ci\_new = Ci + F((Ci - ACi)) \wedge\wedge\wedge \quad (3)$$

[Formula IV]

$$F(x) = \begin{cases} Fmax(x > TH1) \\ F1(x)(TH2 \leq x \leq TH1) \\ \alpha \times x(-TH2 < x < TH2) \\ F2(x)(-TH1 \leq x \leq -TH2) \\ Fmin(x < -TH1) \end{cases} \wedge\wedge\wedge \quad (4)$$

Here, the color characteristic information data Rn_i is defined by (Ci−ACi), and correction of the color information Ci of the target pixels Pi is executed by enhancing the value that is obtained by transforming the color contrast with a predetermined function It should be noted that in Formula IV, TH1, TH2, Fmax, Fmin, and α are constants that satisfy the conditions TH1>TH2, TH1>0, TH2>0, Fmax>0.0, Fmin<0.0, and 0<α<1.0. This equation sets the upper and lower limits of the correction value, and linearly suppresses the color characteristic information data Rn_i. These are not limitations for this equation, and it is also possible to use other linear functions or nonlinear functions.

It should be noted that in Formula IV, $F1(x)$ and $F2(x)$ represent nonlinear functions that are determined such that the region defined by x is continuous, and for example, if $F1(x)$ or $F2(x)$ are quadratic functions, then the function F1 of the region (TH2≦x≦TH1) is $F1(x)=((\alpha \cdot TH2-Fmax)/(TH2-TH1)^2) \cdot (x-TH1)^2 + Fmax$, and the function F2 of (−TH2 ≦x≦−TH1) is $F2(x)=(-(\alpha \cdot TH2+Fmin)/(-TH2+TH1)^2) \cdot (x+TH1)^2 + Fmin$.

The correction control variable 5 (see FIG. 1) is a data table that holds the positive constants that are used in Formula I through Formula IV, for example. It should be noted that it is also possible to change the correction strength by controlling this data table.

Lastly, the output portion 4 outputs the correction value Ci_new of the target color information Ci of the pixels Pi obtained by the color information correction portion 3, and the other color information vCi (the color information that is not targeted for correction), as they are. It should be noted that the output portion 4 also can convert the correction value Ci_new of the target color information Ci of the pixels Pi obtained by the color information correction portion 3, and the other color information vCi, to an image format that can be handled by the device to be used and then output those processed image data.

By using the color contrast to correct only target color information in the target pixels, it is possible to perform color correction using a simple configuration without performing region extraction, and it is possible to perform color correction with which it is possible give an impression that is close to that of human vision. Furthermore, since region extraction is not performed, color correction error that is caused by region extraction error can be suppressed.

The description in this embodiment was made regarding a case in which there is a single target color information field, but it is also possible to combine the correction of two color information fields, such as color saturation and hue. In such a case, the respective color characteristic information data are found from the corresponding color information, and the color information correction portion 3 sets a correction function that is suited for the corresponding color information and then performs color correction.

It should be noted that Formula I and Formula II also can be altered as shown by Formula V and Formula VI.

[Formula V]

$$Ci\_new = Ci + \eta \times Ci \times H\left(\frac{Ci}{ACi} - 1.0\right) \wedge\wedge \quad (5)$$

[Formula VI]

$$H(x) = \begin{cases} H\max(x > TH3) \\ \sigma \times x(|x| < TH3) \\ -H\max(x < -TH3) \end{cases} \wedge\wedge\wedge \quad (6)$$

Here, $0.0 \leq H\max \leq 1.0$, $0.0 \leq TH3$, $0.0 \leq \eta 1.0$, $0.0 \leq \sigma \leq 1.0$, and $\sigma \times TH3 = H\max$.

In this case, if the pixel to be corrected is colorless, e.g. gray, then correction is not performed (being colorless, no color is present). On the other hand, if the pixel is colored and has color that causes a contrast, then correction is executed.

The H(Ci/ACi−1.0) part of Formula V corresponds to the degree of change with respect to the Ci prior to correction, due to the amount of change in the color characteristic information data (color contrast amount) Rn_i. Thus, it becomes possible to perform correction that is correlated with the size of the color data Ci prior to correction, and accordingly it is possible to keep low density color data from experiencing sudden large changes in color contrast, for example, thereby allowing correction to be achieved with a more natural color contrast.

Second Embodiment

An image processing method and an image processing device 200 that perform color information correction based on color contrast information in the pixels are described as a second embodiment of the invention using FIGS. 7 to 11. It should be noted that structural features that are the same as those already described in the above embodiment are assigned the same reference numerals and will not be described.

Figure 7:
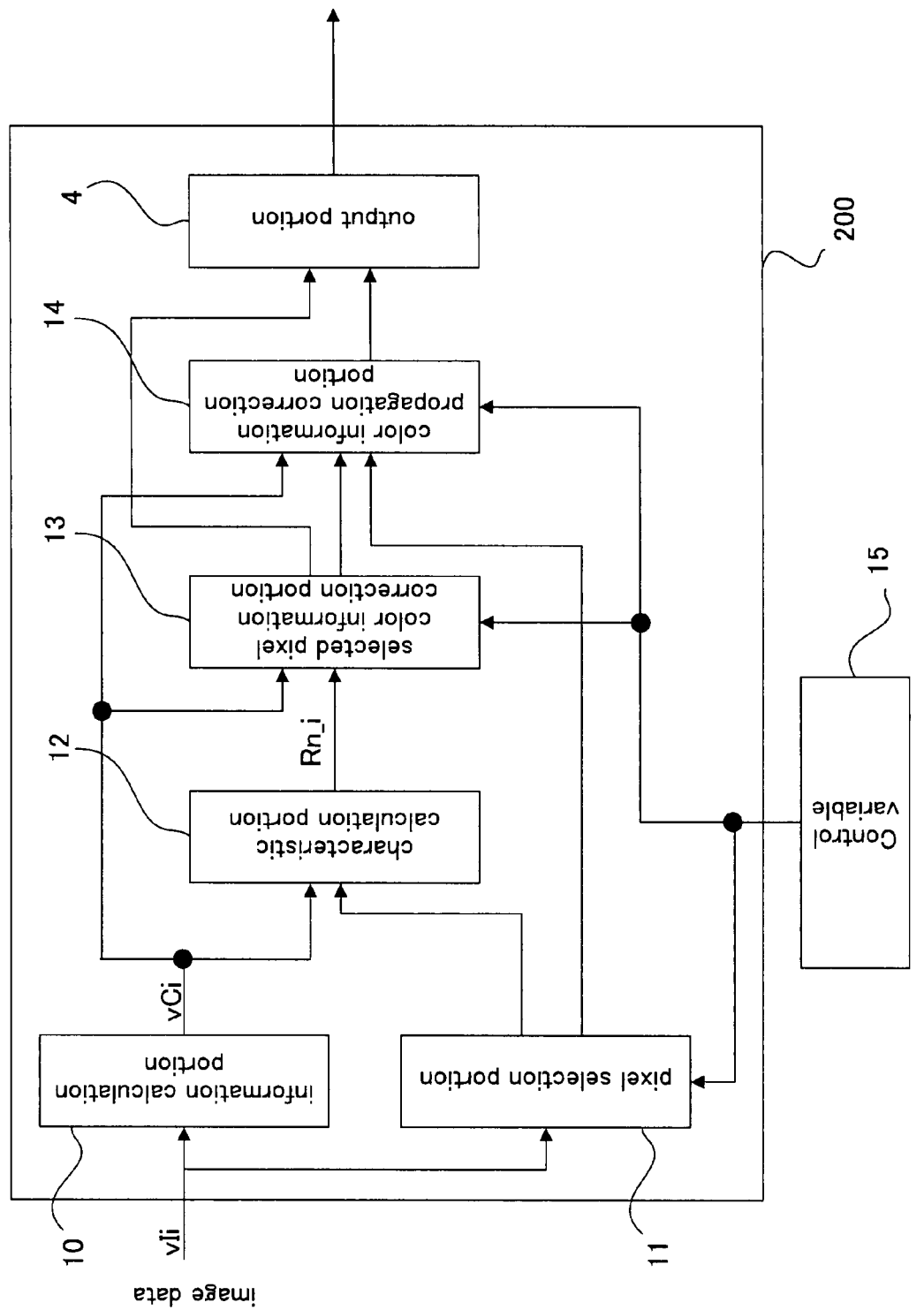
FIG. 7 is a block diagram showing the configuration of the image processing device according to a second aspect of the invention.
Figure 8:
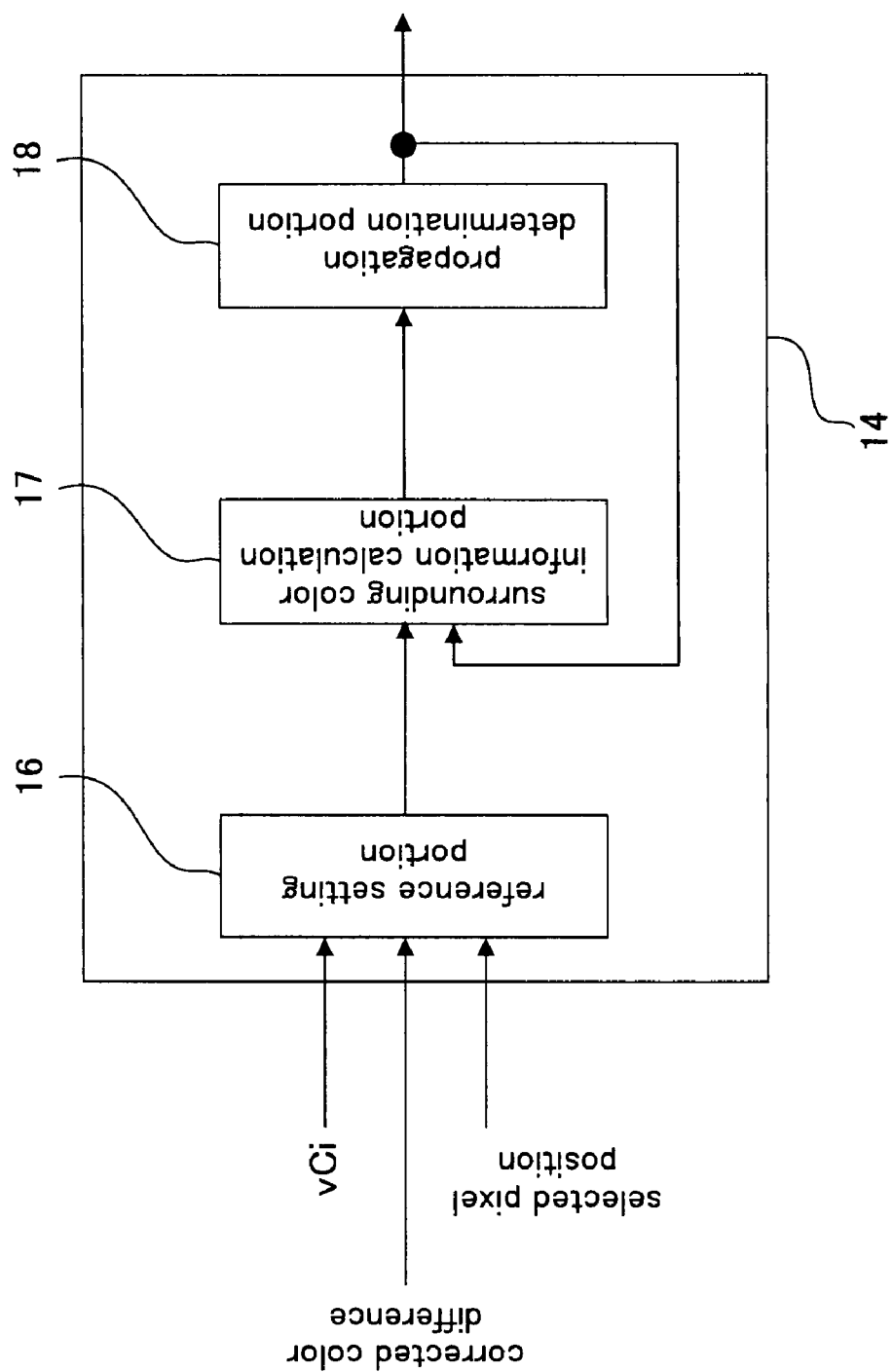
FIG. 8 is a block diagram showing the configuration of the color information propagation correction portion of the invention.

FIG. 7 shows the configuration of the image processing device 200 of the second embodiment of the invention. FIG. 8 shows the configuration of color information propagation correction portion 14.

Figure 9:
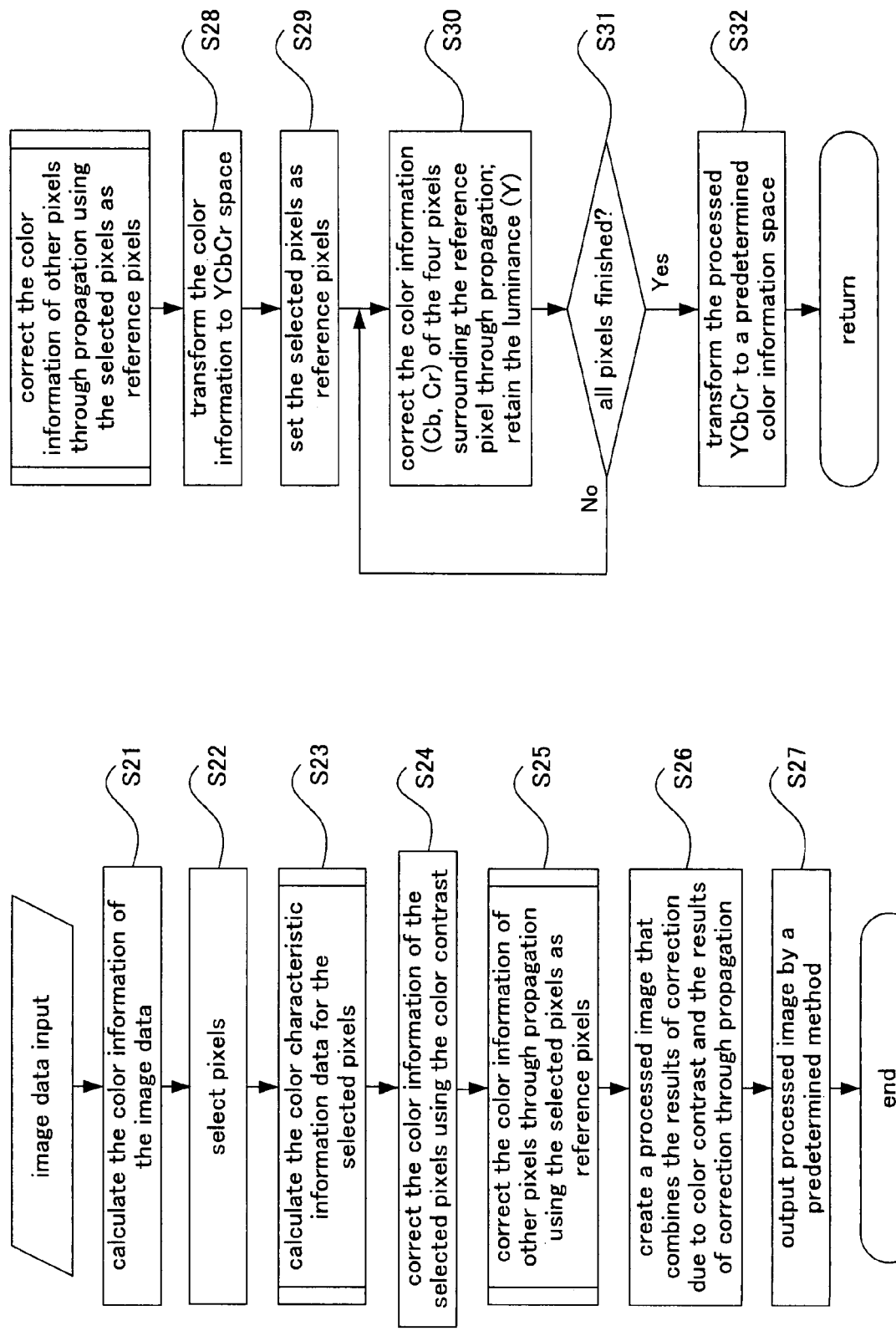
FIG. 9 is a process flowchart of the image processing method according to the second aspect of the invention.

FIG. 9 shows a process flowchart of the image processing method of the third embodiment of the invention.

This implementation of the invention is a device that corrects the color information in an image by processing the image data, and for example can be provided in image-capturing devices such as digital still cameras or digital video cameras, image editing devices for editing digital images, portable telephones used in a mobile environment, car mobile devices, and PDAs, or in large-size video display devices that may be used in various environments.

When image data vIi are input to the image processing device 200, information calculation portion 10 converts the data of the pixels making up the image data vIi into predetermined color information vCi (S21). It should be noted that this color information shall include information Ki on the brightness, such as the luminance. Here, the image data vIi are converted into predetermined color information vCi that are easy to handle as color information, such as HSV space data constituted by the hue H, color saturation S, and color value V, YCbCr space data constituted by the luminance Y and the color differences Cb and Cr, or La*b* space data constituted by the color value L and the colors a* and b*, but it is also possible to use the image data vIi as they are.

Pixel selection portion 11 selects pixels to be processed by characteristic calculation portion 12 in a predetermined order (S22). With the image processing device 200, instead of correcting all of the pixels of the image based on the color contrast, only selected pixels to be focused on are corrected based on the color contrast and then the remaining pixels are corrected based on the color information of the selected pixels that have been corrected. By doing this, it is possible to retain the balance of the overall image as much as possible while performing more accurate color correction. It should be noted that the reference for pixel selection is set in advance according to the nature of the image to be handled, and can be a simple reference such as selecting the center pixel in the blocks that are produced in a case where the image is XSTEP divided in the horizontal direction and YSTEP divided in the vertical direction. In this case, it is necessary to choose the XSTEP and the YSTEP in accordance with the processing time and the processing precision. The pixel group that has been selected by the pixel selection portion 11 is referred to as the selected pixel group Φ.

The characteristic calculation portion 12 calculates the color characteristic information data Rn_i (Pi∈Φ) using the color information of the pixel Pi in the selected pixel group Φ, of the color information vCi obtained by the information calculation portion 10 (S23). It should be noted that Ci denotes the color information to be corrected, of the color information vCi in the pixels Pi.

The characteristic calculation portion 12, like the color characteristic calculation portion 2 (see FIG. 1), creates color characteristic information data data Rn_i for the color information and the brightness information. The data are created in the same manner as in the first embodiment of the invention. For example, the color characteristic data Rn_i are created using the ratio of the color information Ci in the pixels Pi to the weighted mean ACi of the color information of the pixels in the pixel region Ωi, which has a predetermined area that corresponds to the viewing region.

Selected pixel color information correction portion 13 then executes color correction of the color information Ci to be corrected, using the color characteristic information data Rn_i created by the characteristic calculation portion 12, in the pixel Pi of the selected pixel group Φ (S24). This method is the same as that of the first embodiment.

Next, using the pixels Pi in the selected pixel group Φ obtained by the selected pixel color information correction portion 13, the color information propagation correction portion 14 performs color correction on the color information Cj of the remaining pixels Pj (Pj do not belong to the selected pixel group Φ) (S25). There are many methods that conceivably could be used for this, but here colorization is adopted. Colorization is a process by which color is added to monochrome image data based on the color information of numerous preset points, in such a manner that the overall balance of the image is not disrupted.

The color information propagation correction portion 14 employs this processing to execute color correction without disrupting the balance of the overall image, taking the color information Ci that has been corrected by the selected pixel color information correction portion 13 as the initial setting point (hereafter, referred to as the reference pixel). As shown in FIG. 8, the color information propagation correction portion 14 is made of reference setting portion 16, surrounding color information calculation portion 17, and propagation determination portion 18.

Figure 10:
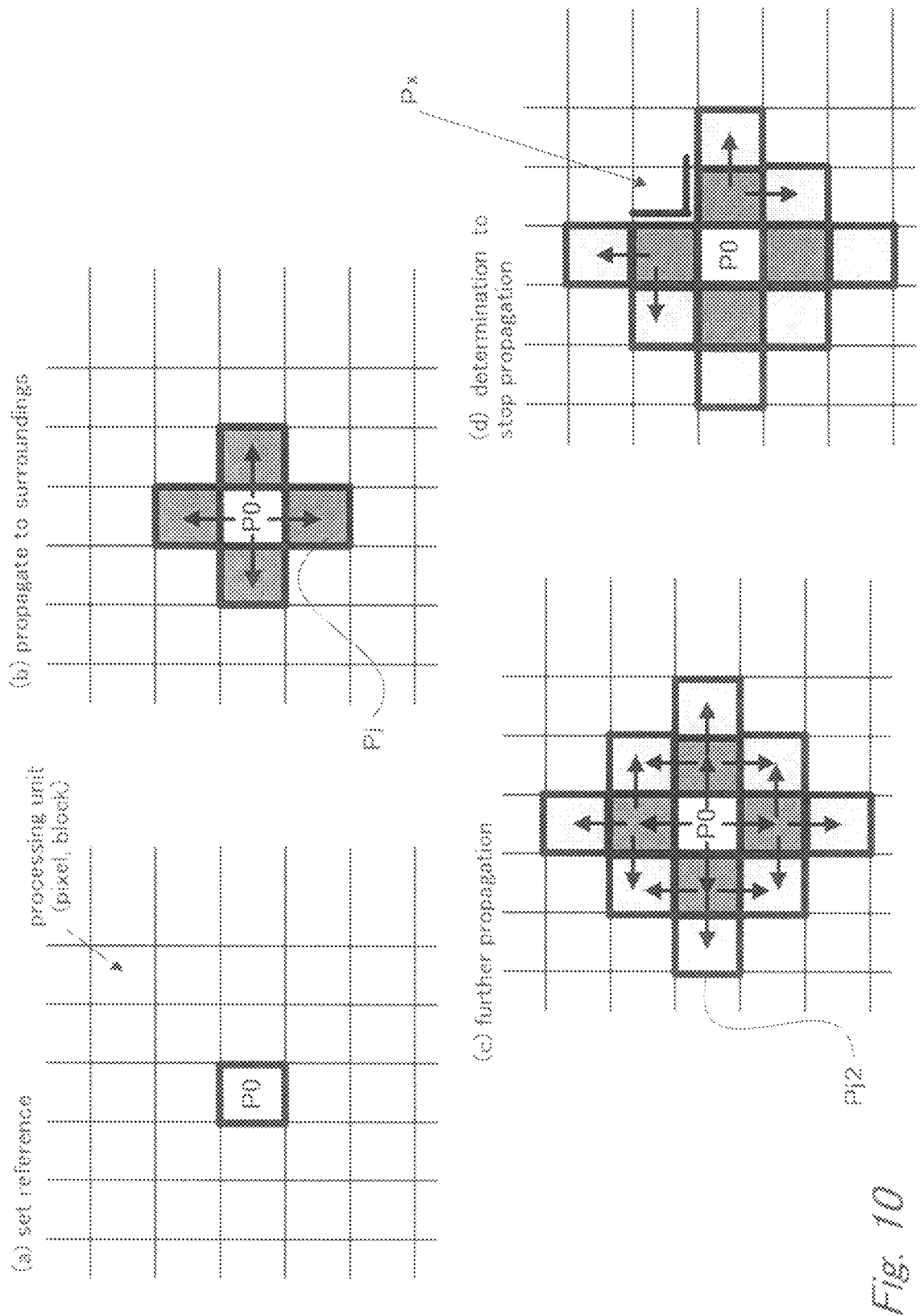
FIG. 10 is an explanatory diagram of an overview of the processing in the color information propagation correction portion of the invention.

The propagation process is described using FIG. 10.

It should be noted that in FIG. 10, the luminance Yi and color differences Cbi and Cri have been calculated for the pixel Pi (S28), and the color correction targets the color differences Cbi and Cri. Further, the color differences Cbai and Crai denote the color differences after correction (hereinafter, referred to as corrected color difference) of the pixels Pi in the selected pixel group Φ.

The reference setting portion 16 sets a pixel P0 in the selected pixel group Φ as the reference pixel (see S29 and FIG. 10(a)).

The surrounding color information calculation portion 17 propagates the corrected color differences Cba0 and Cra0 of the reference pixel P0 to the four pixels Pj surrounding the reference pixel P0 (see S29 to S31 and FIG. 10(b)).

In this processing, the luminance Kj of each surrounding pixel Pj is saved. Thus, of the color difference candidates Cbj_1, Crj_1 of a pixel Pj that satisfies this luminance Kj, the color difference group Cbaj, Craj that has the smallest difference with respect to the corrected color differences Cba0, Cra0 of the reference pixel P0 is obtained (S30).

Various methods for choosing color difference candidates exist. Ordinarily, the luminance Kj and the color differences Cbj_1 and Crj_1 are defined by 8-bit integers, and thus in simple cases the combination of integers of the color differences Cbj_1 and Crj_1 that satisfy the method of linear conversion to the luminance Kj becomes the color difference candidate. In this case there is a possibility that the processing time will increase significantly, and thus one conceivable approach is to provide a predetermined error function E, and, under conditions in which the method of linear conversion to the luminance Kj is valid, to adopt as a candidate the combination of color differences that reduces the error function E.

When this propagation process to the four pixels is over, then propagation to the surrounding pixels Pj2 is carried out (see FIG. 10(c)). This propagation process is executed with all the reference pixels P0 serving as the referent. It should be noted that if color information is propagated from a plurality of reference pixels, then the color information in which the difference with respect to the plurality of propagated color information is smallest is selected in the pixels to be corrected.

As shown in FIG. 10(d), the propagation determination portion 18 compares the difference between the corrected color information Cbaj and Craj in the pixels to which propagation is to occur and the color information Cbj and Crj before propagation in each of these pixels with a predetermined threshold value. Specifically, if the difference in the color information is greater than predetermined threshold values ThresCb and ThresCr, then propagation based on that pixel (for example, Px) is ended, and the corrected color information Cbaj and Craj is set to Cbaj=Cbj and Craj=Crj. That is to say, the propagation determination portion 18 executes a propagation stop determination.

The above processing is performed until the color information of every pixel has been determined (S31).

The propagation determination portion 18 also converts the YCbCr space data that have been color corrected and propagated into their color space before the processing of S28 was performed.

Also, the output portion 4 outputs the color information of the pixels thus color corrected in the same manner as described in the first embodiment (S26 to S27).

By doing this, the luminance (brightness) of the pixels is maintained, and if the luminance is close between the reference pixel and the nearby pixels, then the color information of the nearby pixels is corrected to a value that is close to the color information of the reference pixel. Further, executing the propagation stop determination ensures that the color information does not significantly change between and after propagation. By doing this, color information that has been corrected based on the color contrast can be transmitted without disrupting the balance of the overall image, and color correction can be performed.

Figure 11:
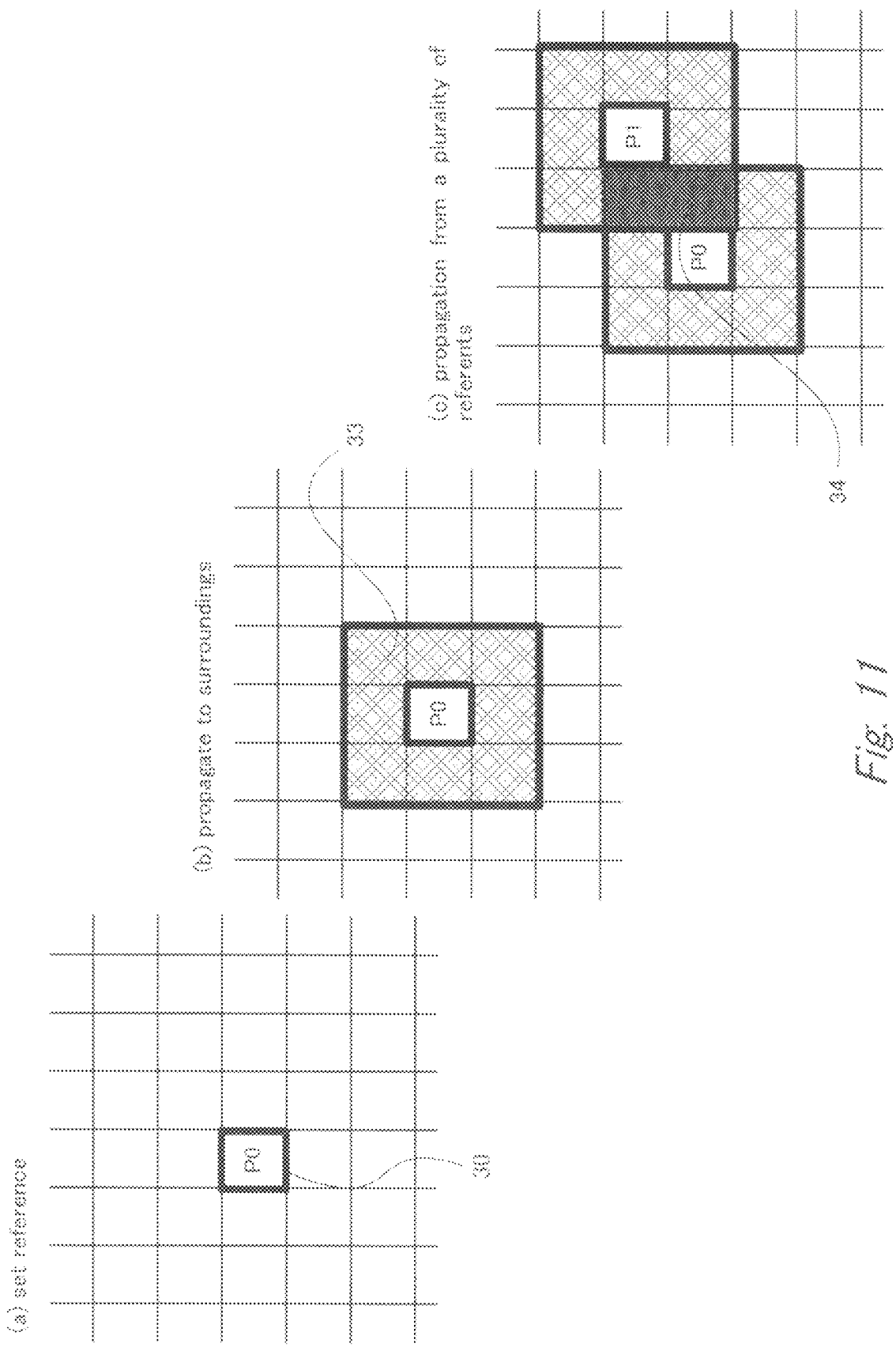
FIG. 11 is an explanatory diagram of an overview of second processing in the color information propagation correction portion of the invention.

It should be noted that the propagation processing also can be the method shown in FIG. 11.

First, a reference pixel P0 in the selected pixel group Φ is set (see FIG. 11(a)).

Next, it is assumed that in a region 33 surrounding the reference pixels P0, the color information Cb0 and Cr0 of the reference pixels P0 can be approximated through linear transformation using the luminance Y0 as a variable, and the same transformation is adopted for the surrounding region 33. Here, the linear transformation is determined so that the difference between the corrected color information Cba0 and Cra0, which are obtained by color correcting the color information Cb0 and Cr0 of a plurality of reference pixels P0, and the color information of the reference pixels that have been approximated through linear transformation, becomes small.

The undetermined coefficients in the linear transformation method are defined by only the region 33 surrounding the reference pixels P0, and thus the greater the number of reference pixels P0, the greater the number of coefficients of the linear transformation that must be adjusted. Accordingly, the linear transformation specifically is determined using a multivariate nonlinear estimation approach for multivariate coefficients that employs the method of least squares or a genetic algorithm, for example.

It should be noted that the color information of the pixels 34 that are included in the region surrounding the plurality of pixels P0 and P1 (see FIG. 11(c)) has been set to values that are arrived at by averaging the linear transformations for the plurality of reference pixels P0 and P1.

Thus, the color information of the pixels that are not corrected based on the color contrast is calculated by adopting the luminance of the pixels in the linear transformation corresponding to the region around the reference pixels to which the pixels belong.

With this method, the luminance of each pixel is saved, and the closer the luminance values of the pixels are near the reference pixels, the closer the color information that is set. Also, the coefficients, etc., of the linear transformation in the surrounding region are determined so that the color information in the reference pixels becomes small, and if a first-order linear approach that causes a gentle fluctuation in the surrounding region is used, then it becomes possible to suppress fluctuations in the color information in regions where the fluctuation in luminance is small. Thus, it is possible to perform color correction by propagating color information that has been corrected based on the color contrast, without disrupting the balance of the overall image.

It should be noted that the control variable 15 stores the parameters for when selecting pixels, the parameters for correcting the selected pixels, and the parameters for color information propagation, for example.

Third Embodiment

Figure 12:
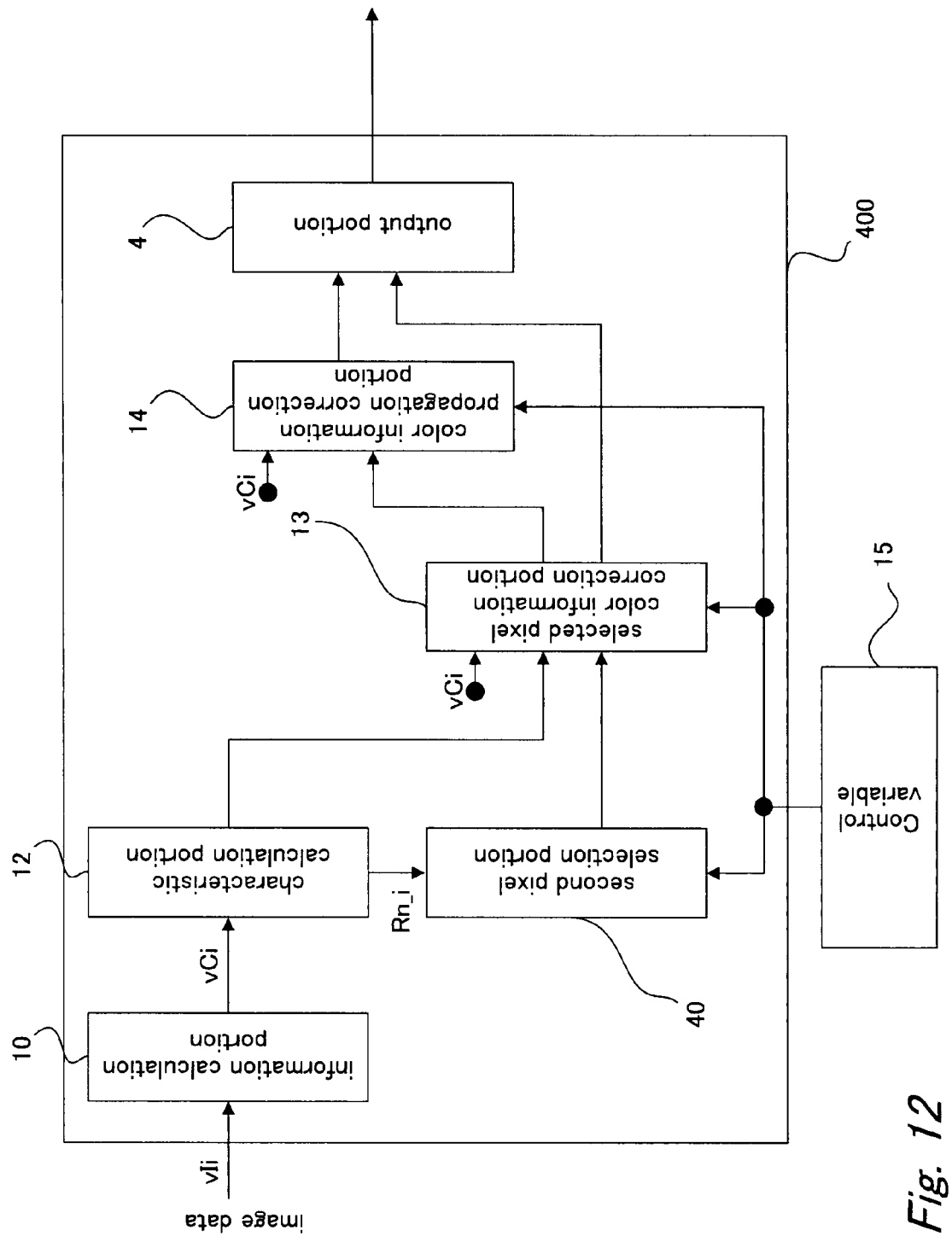
FIG. 12 is a block diagram showing the configuration of the image processing device according to a third aspect of the invention.
Figure 13:
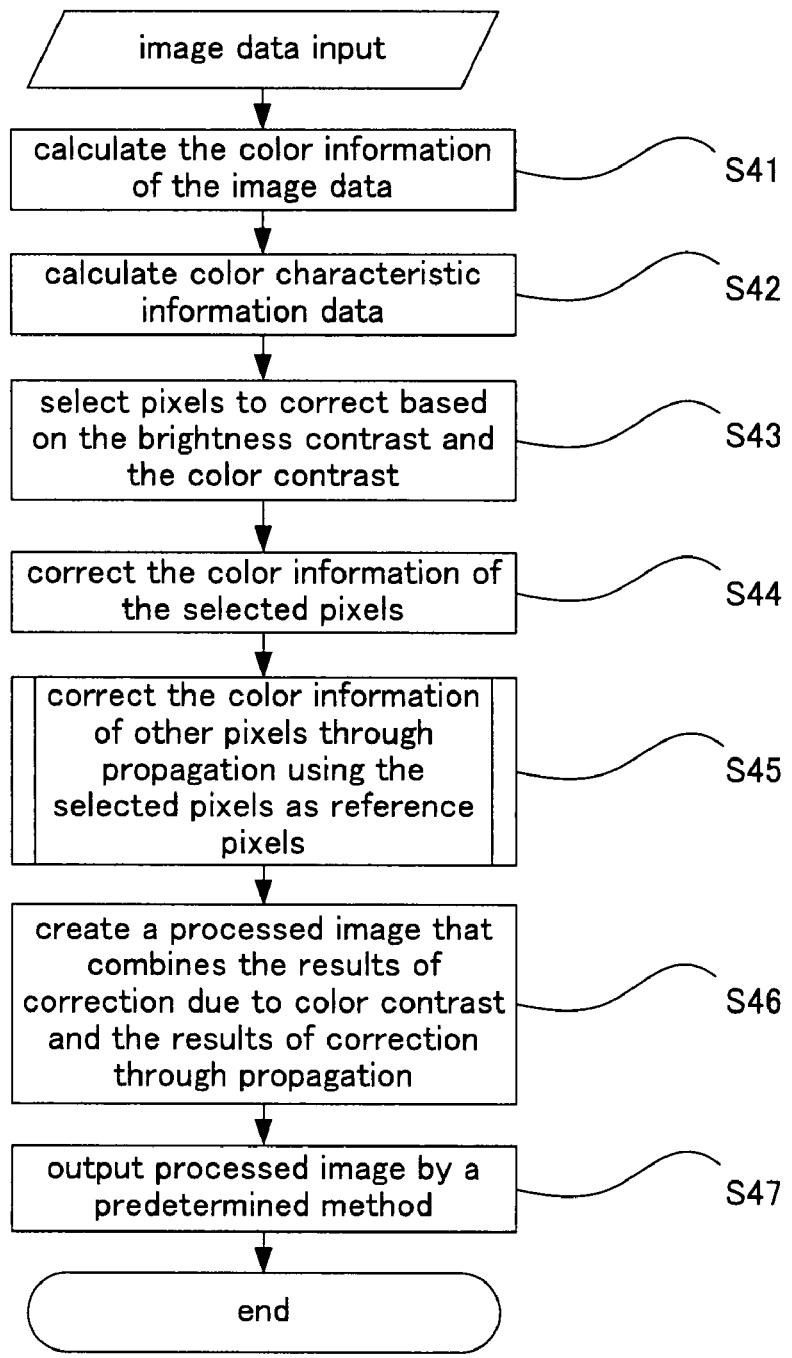
FIG. 13 is a process flowchart of the image processing method according to the third aspect of the invention.

An image processing method and an image processing device 400 that perform color information correction based on color contrast information in the pixels are described as a third embodiment of the invention using FIGS. 12 and 13. It should be noted that structural features that are the same as those already described in the above embodiments are assigned the same reference numerals and will not be described.

FIG. 12 shows the configuration of the image processing device 400 of the third embodiment of the invention. FIG. 13 shows a process flowchart of the image processing method of the third embodiment of the invention.

This implementation of the invention is a device that corrects the color information within an image by processing the image data, and for example can be provided in image-capturing devices such as digital still cameras or digital video cameras, image editing devices for editing digital images, portable telephones used in a mobile environment, car mobile devices, and PDAs, or in large-size video display devices that may be used in various environments.

When image data vIi are input to the image processing device 400, the information calculation portion 10 converts the data of the pixels making up the image data vIi into predetermined color information vCi (S41). It should be noted that this color information shall also include information Ki on the brightness, such as the luminance. Here, the image data vIi are converted into predetermined color information vCi that are easy to handle as color information, such as HSV space data constituted by the hue H, color saturation S, and color value V, YCbCr space data constituted by the luminance Y and the color differences Cb and Cr, or La*b* space data constituted by the color value L and the colors a* and b*, but it is also possible to use the image data vIi as they are.

The characteristic calculation portion 12 calculates the characteristic information data (color contrast information $RnC\_i$) and the characteristic information for the brightness (brightness contrast information $RnK\_i$) for the color information of the color information vCi to be corrected, obtained by the information calculation portion 10. Here, Ci denotes the color information to be corrected, and Ki denotes the brightness information, of the color information vCi in the pixels Pi.

The characteristic calculation portion 12, like the color characteristic calculation portion 2 (see FIG. 1), creates color characteristic data $Rn\_i$ (color contrast information $RnC\_i$, brightness contrast information $RnK\_i$) for the color information and the brightness information of the pixel Pi (S42). The data are created in the same manner as in the first embodiment. That is, the color characteristic information $RnC\_i$ is calculated using the ratio of the color information Ci in the pixels Pi to the weighted mean ACi of the color information of the pixels in the pixel region Ωi, which has a predetermined area that corresponds to the viewing region, and the brightness characteristic information $RnK\_i$ is calculated using the ratio of the luminance information Ki of the pixels Pi to the weighted mean AKi of the luminance of the pixels in the pixel region Ωi, which has a predetermined area that corresponds to the viewing region. It should be noted that the brightness contrast information $RnK\_i$ is defined by replacing Ci with Ki and ACi with AKi in the equation that defines the color contrast information $RnC\_i$ in the first embodiment, for example.

Second pixel selection portion 40 uses the $RnK\_i$ and the $RnC\_i$ to determine whether or not to perform color correction that utilizes the color contrast phenomena on the pixels Pi, and selects a pixel region to be subjected to color correction (S43). Various methods may be used to make this determination, but here, pixels that satisfy the conditions of Formula VII below are selected. It should be noted that in Formula VII, ThC and ThK are positive constants that are stored in the control variable 15.

[Formula VII]

$$\{Pi||RnC\_i-1|<ThC,|RnK\_i|>ThK\}\wedge\wedge\wedge \quad (7)$$

One tendency of the characteristics of human vision is to feel a strong contrast in regions where the absolute value of the brightness contrast is large. Pixels whose color contrast value is close to 1 belong to a pixel region in which there is relatively little fluctuation in the color information. Taking these two factors into account, in this invention, color correction that employs color contrast phenomena is performed by selecting, using Formula VII, regions that are of interest in terms of human vision characteristics and that experience a comparatively small fluctuation in color information.

It should be noted that if the color contrast information $RnC\_i$ is defined as the difference between the color information Ci in the pixels Pi and the weighted mean ACi of the color information in the pixels in a pixel region Ωi that has a predetermined area corresponding to the viewing region, then it is also possible to select pixels using Formula VIII. In Formula VIII, a color contrast close to zero indicates that there is little fluctuation in the color information.

[Formula VIII]

$$\{Pi||RnC\_i|<ThC',|RnK\_i|>ThK\}\wedge\wedge\wedge \quad (8)$$

The features of the third embodiment are described below. In the second embodiment of the invention, the pixel selection portion 11 of FIG. 7 employs the color contrast phenomena to choose the pixels to be color corrected. In the third embodiment, however, first the pixel regions that are of greater interest to humans are selected, and then color correction is performed based on the color contrast phenomena (S44). Then, with the selected pixels serving as the reference pixels, the corrected color information of the reference pixels is propagated by colorization, and by propagating the color information to the surrounding pixels, color correction is performed (S45). By doing this, the results of correction in those pixels that likely will be of interest humans are utilized so that color correction can be executed while retaining the balance of the overall image as much as possible. Thus, compared to a case in which every pixel is corrected using the color contrast, it is possible is curtail over-correction near the boundary of objects in the image, for example.

It should be noted that the output portion 4 processes and outputs the color information of the pixels thus color corrected in the same manner as in the first embodiment (S46 to S47).

Fourth Embodiment

Figure 14:
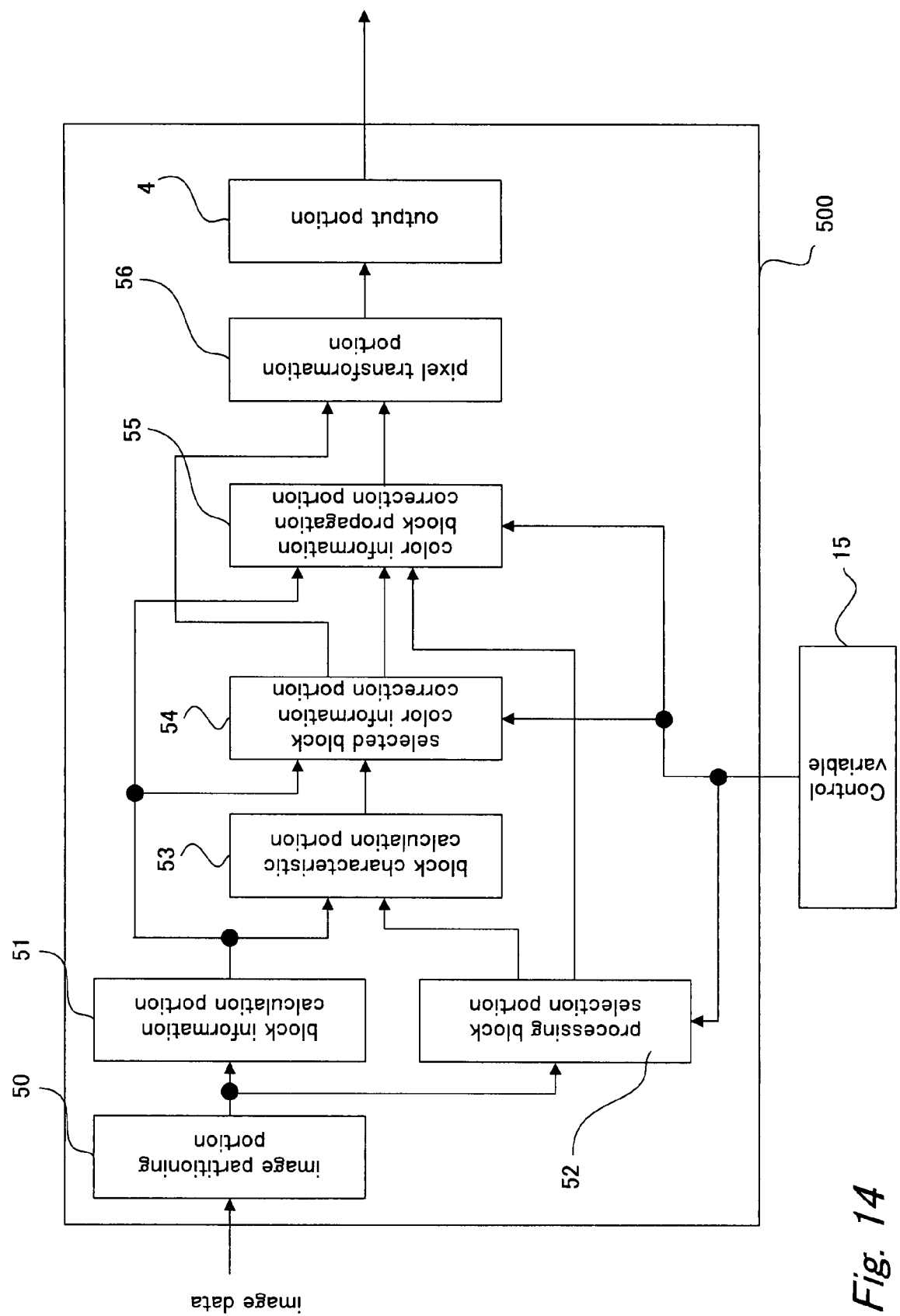
FIG. 14 is a block diagram showing the configuration of the image processing device according to the fourth aspect of the invention.
Figure 15:
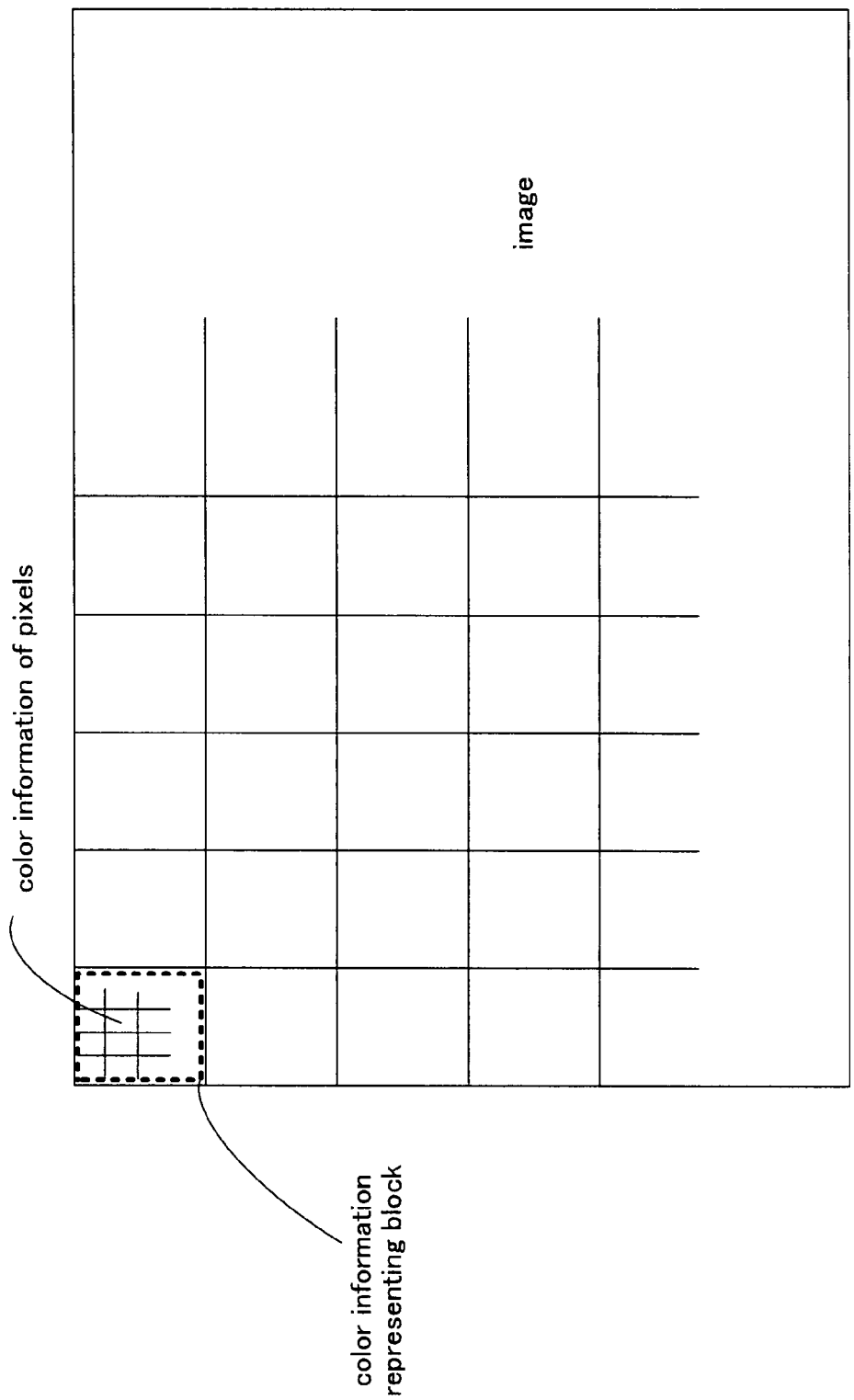
FIG. 15 shows the target unit in the image processing device according to a fourth aspect of the invention.

An image processing method and an image processing device 500 that perform color information correction based on color contrast information in the pixels, are described as a fourth embodiment of the invention using FIGS. 14 and 15. It should be noted that structural elements that are the same as those already described in the above embodiments are assigned the same reference numerals and will not be described.

FIG. 14 shows the configuration of the image processing device 500 of the fourth embodiment of the invention.

The image processing device 500 is made of image partitioning portion 50, block information calculation portion 51, processing block selection portion 52, block characteristic calculation portion 53, selected block color information correction portion 54, color information block propagation correction portion 55, pixel transformation portion 56, and the output portion 4.

This aspect of the invention is characterized in that processing is performed in block units such as those shown conceptually in FIG. 15, rather than in pixel units like with the image processing device 200 of the second embodiment of the invention.

More specifically, the image partitioning portion 50 in the image processing device 500 partitions the image data that have been input into blocks, and those blocks are regarded as the processing units.

The block information calculation portion 51 calculates representative color information that represents the inside of the blocks as the color information of that block, as shown in FIG. 15. Specifically, it calculates the mean value of the color information in the block, the most frequent value in the histogram, or a value obtained by a statistical method such as clustering, as the representative color information.

The image processing device 500 performs the same processing as in the second embodiment, except that the representative color information BCk of a block k replaces the color information Ci of a pixel in the second embodiment of the invention.

It should be noted that in this case, prior to the output portion 4 converting the corrected color information to a predetermined image format, the pixel transformation portion 56 calculates the corrected color information of the pixels in the block k through interpolation using the corrected representative information of the block k+1 after the block k and the block k+Bwidth one below the block k (a block adjacent in the vertical direction). Here, Bwidth represents the number of blocks in the horizontal direction, and is defined by a row of consecutive block numbers from the image upper left toward the right.

It should be noted that interpolation is not limited to this method, and it is also possible to adopt an interpolation method that employs the corrected color information values of the block k−1 before the block k and the block k−Bwidth above the block k. Further, it is also possible to adopt an interpolation method that employs the corrected representative color information values of a total of five blocks, the target block and the four blocks in front of, behind, above, and below the target block.

It should be noted that rectangular blocks of a uniform size are used in FIG. 15, but it is possible to change the block size or shape according to the image content.

With this configuration and method, it is possible to reduce the amount of processing that is required when the image size is large. In particular, by setting a fixed number of blocks obtained by partitioning regardless of the image size, it is possible to curtail increases and decreases in the amount of color correction processing that is performed on the representative color information of the blocks, and it is possible to inhibit significant fluctuations in the processing time due to the size of the image that is input.

Fifth Embodiment

Figure 16:
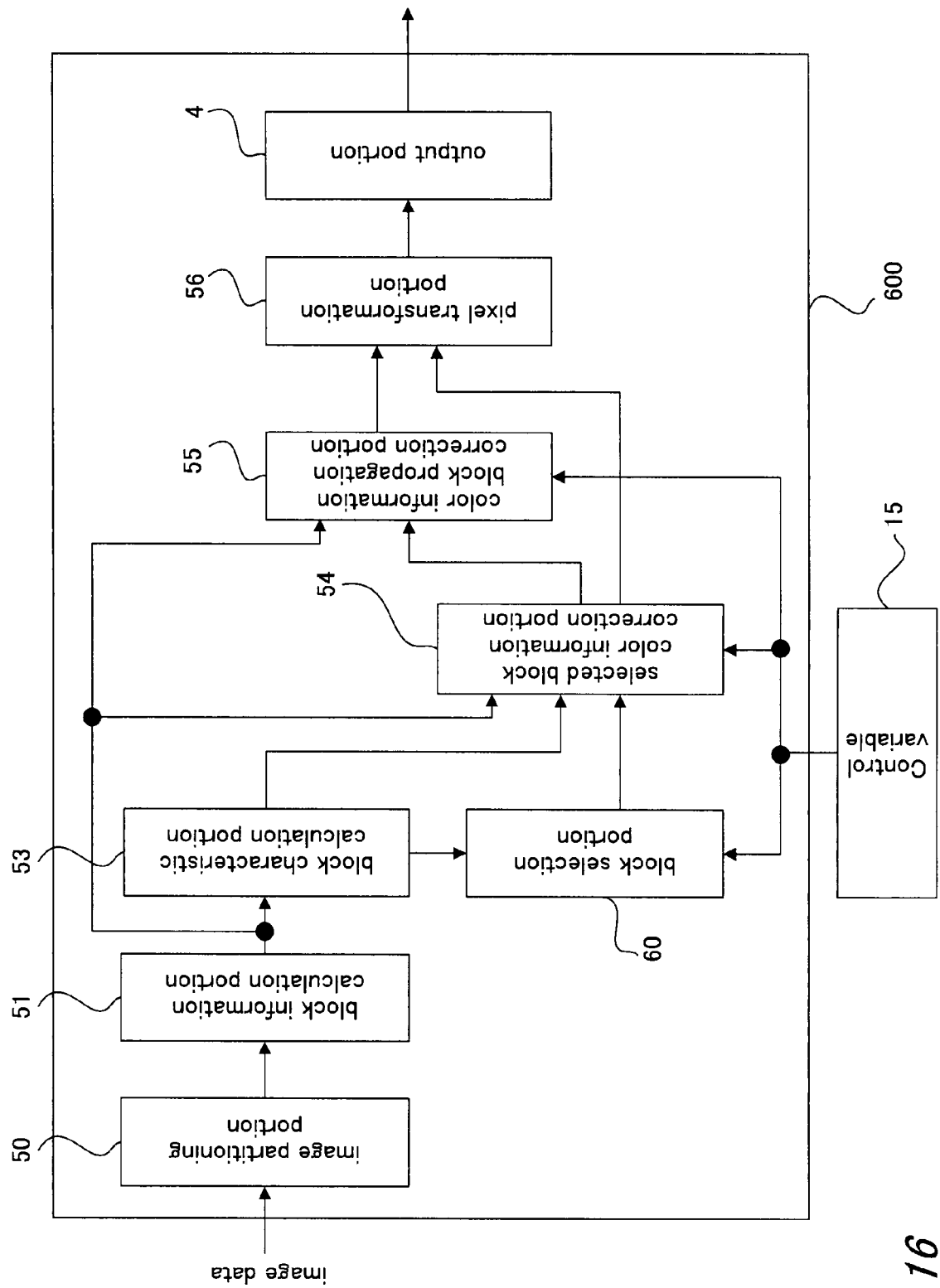
FIG. 16 is a block diagram showing the configuration of the image processing device according to a fifth aspect of the invention.

An image processing method and an image processing device 600 that perform color information correction based on color contrast information in the pixels are described as a fifth embodiment of the invention using FIG. 16. It should be noted that structural elements that are the same as those already described in the above embodiments are assigned the same reference numerals and will not be described.

FIG. 16 shows the configuration of the image processing device 600 of the fifth embodiment of the invention.

The image processing device 600 is made of image partitioning portion 50, block information calculation portion 51, block characteristic calculation portion 53, block selection portion 60, selected block color information correction portion 54, color information block propagation correction portion 55, pixel transformation portion 56, and output portion 4.

This aspect of the invention is characterized in that processing is performed in block units such as those shown conceptually in FIG. 15, rather than in pixel units, as with the image processing device 400 of the third embodiment of the invention.

More specifically, the image partitioning portion 50 in the image processing device 600 partitions the image data that have been input into blocks, and those blocks are regarded as the processing units.

The block information calculation portion 51 calculates representative color information that represents the blocks as the color information of that block, as illustrated in FIG. 15. Specifically, it calculates the mean value of the color information in the block, the most frequent value in the histogram, or a value obtained by a statistical method such as clustering, as the representative color information.

The image processing device 500 regards the representative color information BCk in the blocks k as the color information Ci of the pixels in the third embodiment of the invention. It should be noted that in the third embodiment, processing was performed in pixel units, and the pixels on which to execute color correction using the color contrast were selected using the brightness contrast information, the color contrast information, and the luminance, which are characteristic information of the pixels. On the other hand, in this aspect of the invention, the block characteristic calculation portion 53 uses the representative color information BCk and the representative luminance BYk, which are representative of the block k, to calculate the brightness contrast information and the color contrast information. Further, the block selection portion 60 uses this information to select blocks that have the representative color information to be corrected with the color contrast.

Prior to the output portion 4 transforming the corrected color information to a predetermined image format, the pixel transformation portion 56 calculates the corrected color information of the pixels in the block k through interpolation using the corrected representative color information values of the block k+1 after the block k and the block k+Bwidth one below the block k. Here, Bwidth represents the number of blocks in the horizontal direction, and is defined by a row of consecutive block numbers from the image upper left toward the right.

It should be noted that interpolation is not limited to this method, and it is also possible to adopt an interpolation method that employs the corrected representative color information values of the block k−1 before the block k and the block k−Bwidth above the block k. Further, it is also possible to adopt an interpolation method that employs the corrected representative color information values of a total of five blocks, the target block and the four blocks in front of, behind, above, and below the target block.

It should be noted that rectangular blocks of a uniform size are used in FIG. 15, but it is possible to change the block size or shape according to the image content.

With this configuration and method, it is possible to reduce the amount of processing that is required when the image size is large. In particular, by setting a fixed number of blocks that are obtained through partitioning regardless of the image size, it is possible to inhibit increases and decreases in the amount of color correction processing that is performed on the representative color information of each block, and it is possible to inhibit significant fluctuations in the processing time due to the size of the image that is input.

Sixth Embodiment

Figure 17:
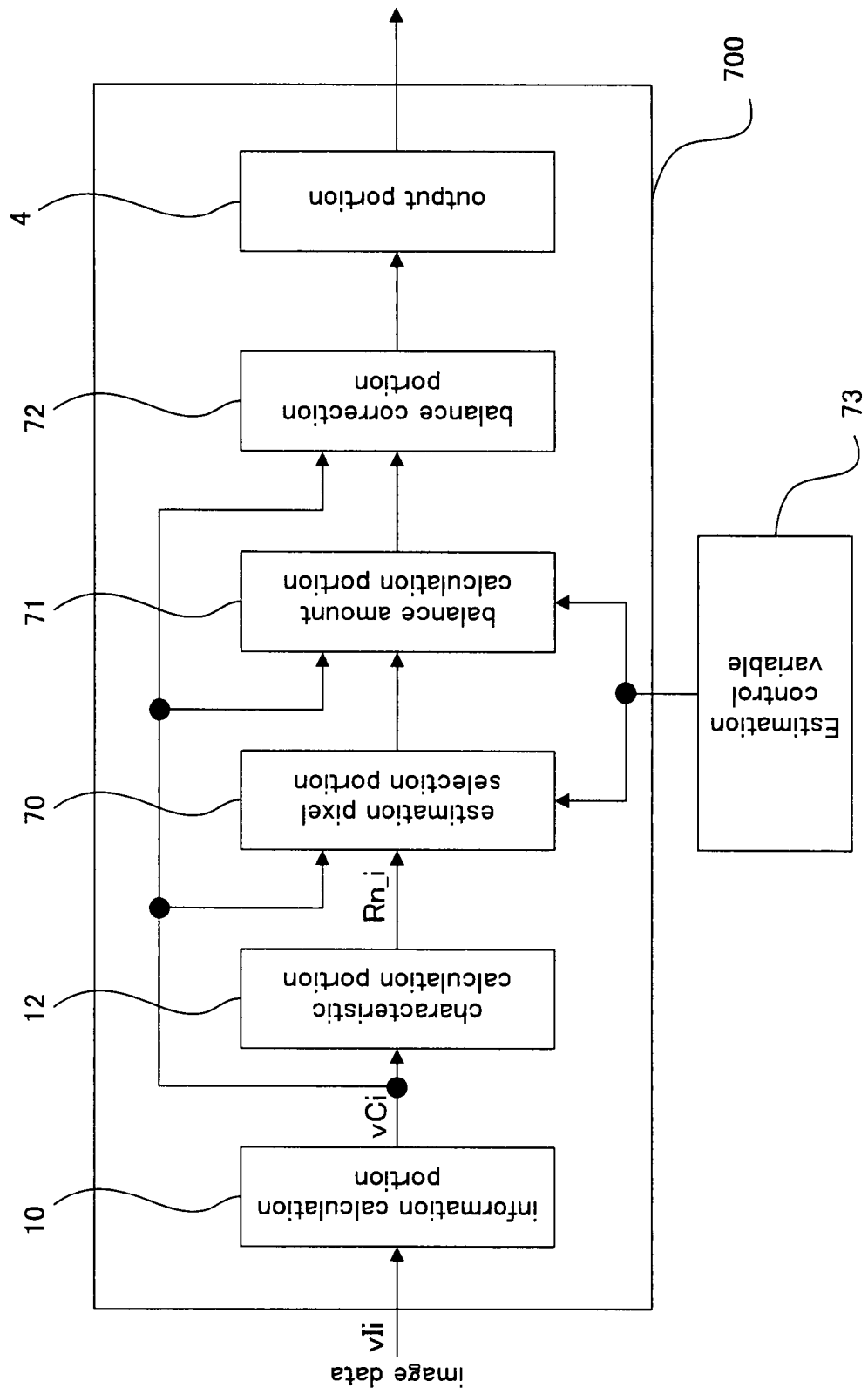
FIG. 17 is a block diagram showing the configuration of the image processing device according to the sixth aspect of the invention.
Figure 18:
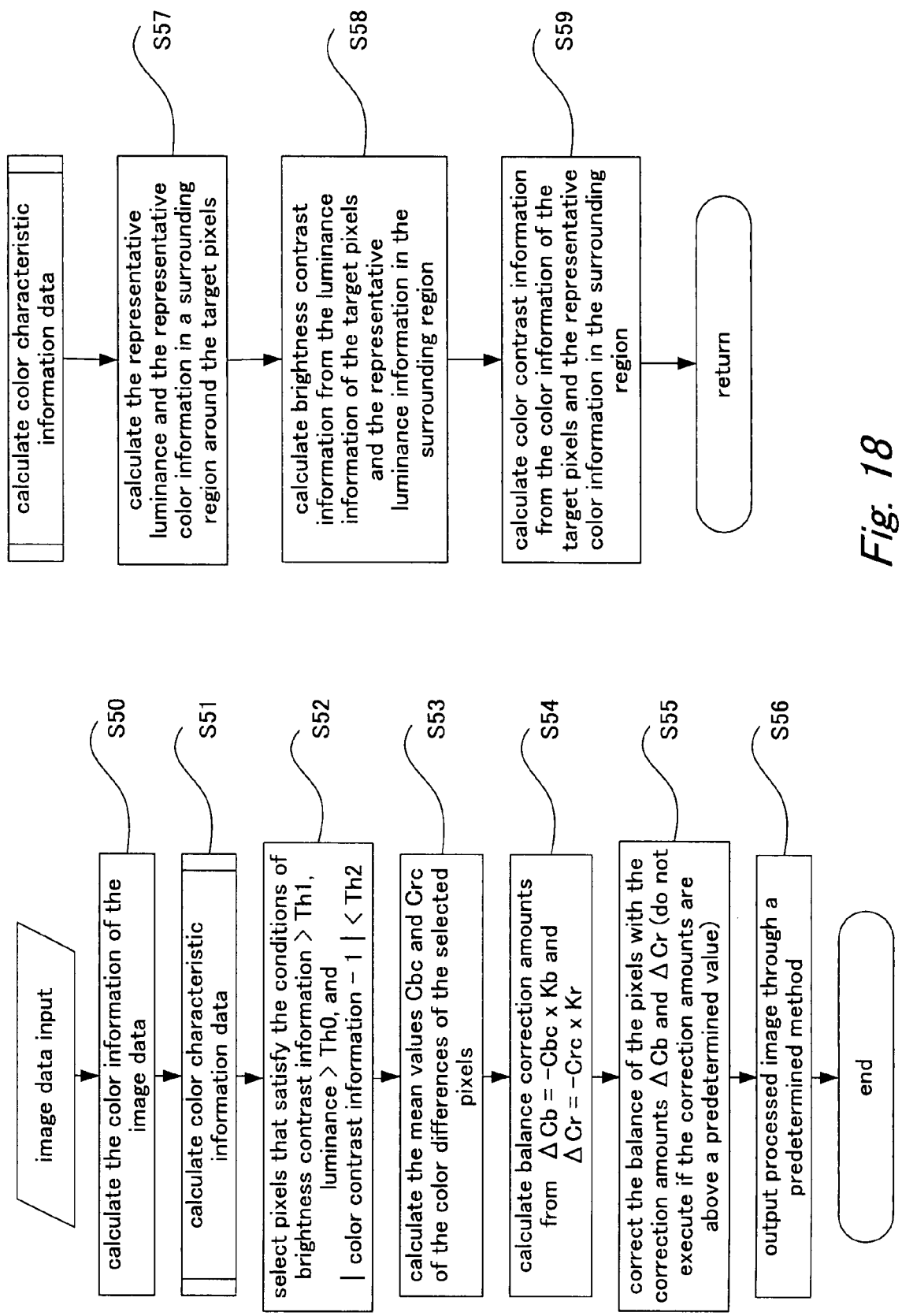
FIG. 18 is a process flowchart of the image processing method according to a sixth aspect of the invention.
Figure 19:
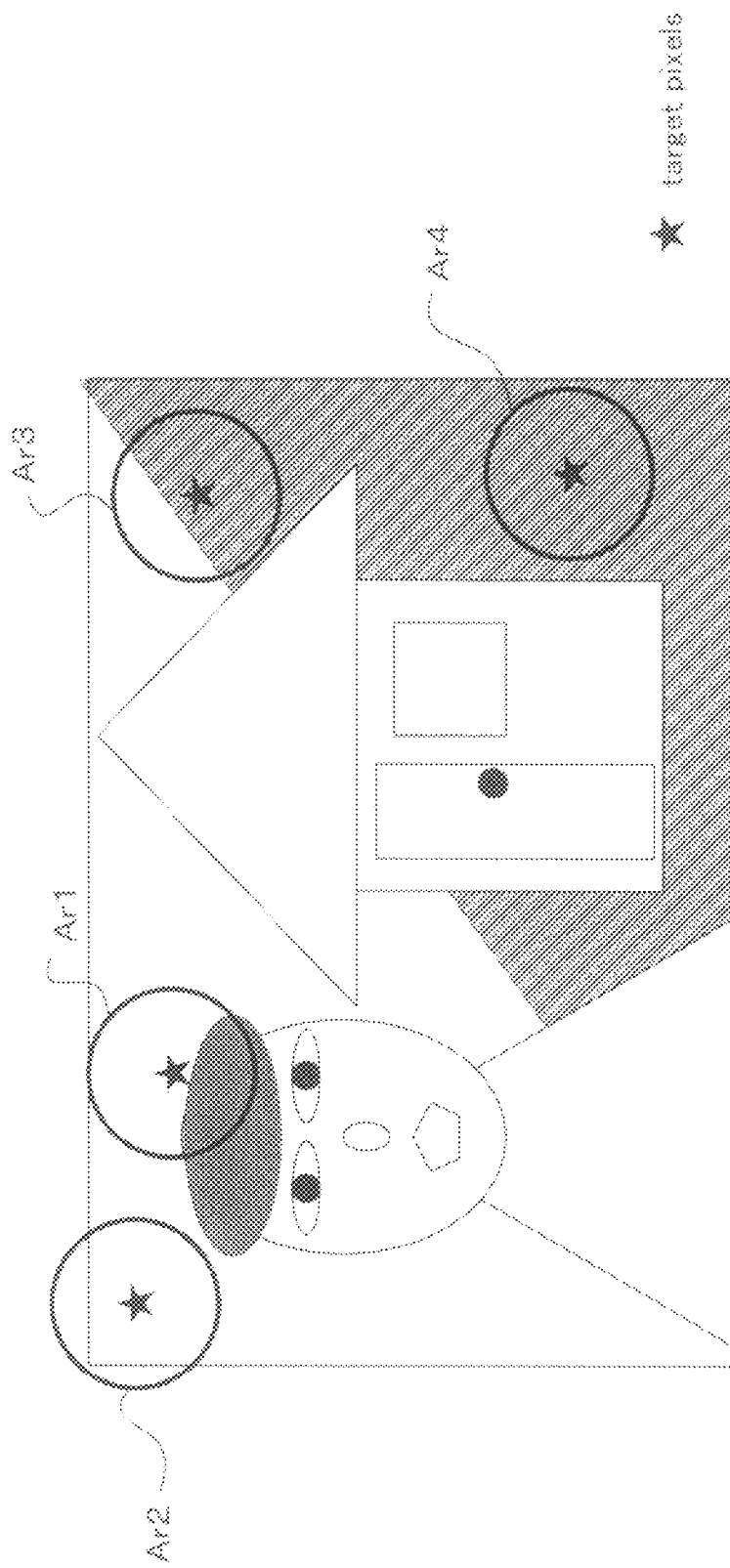
FIG. 19 is an explanatory diagram showing the color balance estimation by the image processing device according to the sixth aspect of the invention.

An image processing method and an image processing device 700 that perform color balance correction based on color contrast information in the pixels are described as a sixth embodiment of the invention using FIGS. 17 to 19. It should be noted that structural elements that are the same as those already described in the above embodiments are assigned the same reference numerals and will not be described.

FIG. 17 shows the configuration of the image processing device 700 of the sixth embodiment of the invention. FIG. 18 shows a process flowchart of the image processing method of the sixth embodiment of the invention.

This implementation of the invention is a device that corrects color information within an image by processing the image data, and for example can be provided in image-capturing devices such as digital still cameras or digital video cameras, image editing devices for editing digital images, portable telephones used in a mobile environment, car mobile devices, and PDAs, or in large-size video display devices that may be used in various environments.

The image processing device 700 is made of information calculation portion 10, characteristic calculation portion 12, estimation pixel selection portion 70, balance amount calculation portion 71, balance correction portion 72, output portion 4, and an estimation control variable 73. The information calculation portion 10 transforms image data vIi into predetermined color information. The characteristic calculation portion 12 calculates characteristic information on the targeted color information and characteristic information on the brightness, from the predetermined color information that have been obtained by transformation. The estimation pixel selection portion 70 selects estimation pixels that can be used to estimate white points from the characteristic information calculated by the characteristic calculation portion 12. When selecting pixels, the table data stored in the estimation control variable 73 are used. The balance amount calculation portion 71 calculates the amount of shifting from the gray axis of the estimation pixels obtained by the estimation pixel selection portion 70. The balance correction portion 72 applies the balance shift amount that is obtained by the balance amount calculation portion 71 to correct the balance of the color information of the pixels. The output portion 4 outputs the balance-corrected image in a predetermined format.

When image data vIi are input to the device, the information calculation portion 10 converts the data of the pixels making up the image data vIi into predetermined color information vCi (S50). It should be noted that this color information shall also include information Ki on the brightness, such as the luminance. Here, the image data vIi are converted into predetermined color information vCi that are easy to handle as color information, such as HSV space data constituted by the hue H, color saturation S, and color value V, YCbCr space data constituted by the luminance Y and the color differences Cb and Cr, or La*b* space data constituted by the color value L and the colors a* and b*, but it is also possible to use the image data vIi as they are.

The characteristic calculation portion 12 calculates the characteristic information for the color information (color contrast information $RnC\_i$) to be corrected, of the color information vCi obtained by the information calculation portion 10, and the characteristic information for the brightness (brightness contrast information $RnK\_i$). It should be noted that Ci denotes the color information of the color information vCi in the pixel Pi to be corrected, and Ki denotes the brightness information.

The characteristic calculation portion 12, like the color characteristic calculation portion 2 (see FIG. 1), creates color characteristic data $Rn\_i$ (color contrast information $RnC\_i$, brightness contrast information $RnK\_i$) for the color information and the brightness information of the pixel Pi (S51). The data are created in the same manner as in the first embodiment. That is, the characteristic calculation portion 12 calculates the color contrast information $RnC\_i$ using the ratio of the color information Ci in the pixels Pi to the weighted mean ACi (representative color information) of the color information of the pixels in the pixel region $\Omega i$, which has a predetermined area that corresponds to the viewing region (S57, S59), and calculates the brightness contrast information $RnK\_i$ using the ratio of the brightness information Ki of the pixels Pi to the weighted mean AKi (representative luminance information) of the luminance of the pixels in the pixel region $\Omega i$, which has a predetermined area that corresponds to the viewing region (S57, S58). It should be noted that the brightness contrast information $RnK\_i$ is defined by substituting Ci with Ki and ACi with AKi in the equation that defines the color contrast information $RnC\_i$ in the first embodiment, for example.

The estimation pixel selection portion 70 uses the color contrast information $RnC\_i$, the brightness contrast information $RnK\_i$, and the luminance Ki to determine whether the pixel Pi belongs to a region that humans will perceive as bright (white region), such as lighting, and if this is the case, then it selects that pixel Pi (S52). This processing is performed for all of the pixels Pi, and the group of selected pixels is regarded as a white region $\Psi$. Various methods may be used to perform this determination, but here, pixels that satisfy the following (Formula IX) are selected. It should be noted that in (Formula IX), Th0, Th1, and Th2 are positive integers, and are stored in the estimation control variable 73.

[Formula IX]

$$\{Pi||RnC\_i-1|<Th2, RnK\_i>Th1, Ki>Th0\} \wedge \wedge \wedge \qquad (9)$$

One tendency of the characteristics of human vision is to feel a strong contrast in regions where the absolute value of the brightness contrast is large. If, in addition to this, the brightness contrast is large and the luminance exceeds a predetermined value, then it is conceivable that humans will feel that the region is even brighter. Further, pixels whose color contrast value is close to 1 likely are pixels in which there is relatively little fluctuation in the color information. From these observations, in this aspect of the invention, regions that humans will perceive as bright and in which there is comparatively little change in color information are regarded as white regions that have lighting, for example, using (Formula IX). This corresponds to optically extracting the mirror reflecting regions as "white regions."

The white regions that are selected with Formula IX are described using FIG. 19. If the target pixel is in the region Ar1 in FIG. 19, then the target pixel is determined to belong to the white region. This is because the target pixel has high luminance and its brightness contrast with the surroundings also is large.

On the other hand, if the target pixel is in regions Ar2 to Ar4, then the target pixel will not be determined to belong to the white region. Specifically, if the target pixel is in the region Ar2, then the target pixel luminance is high but its brightness contrast with the surroundings is small. If the target pixel is in the region Ar3, then the brightness contrast with the surroundings is large but the target pixel has low luminance. Further, if the target pixel is in the region Ar4, then the luminance of the target pixel is low and the brightness contrast with its surroundings is small. Thus, target pixels in these regions are not determined to belong to the white region.

It should be noted that if the color contrast information $RnC\_i$ is defined as the difference between the color information $Ci$ of the pixel $Pi$ and the weighted mean $ACi$ of the color information in the pixel region $\Omega i$ having a predetermined area that corresponds to that viewing region, then it is also possible to perform the selection of pixels using Formula X. In Formula X, a color contrast close to zero indicates that there is little fluctuation in the color information.

[Formula X]

$$\{Pi||RnC\_i|<Th2', RnK\_i>Th1, Ki>Th0\}\wedge\wedge\wedge \quad (10)$$

The balance amount calculation portion 71 finds the extent of the shift from of the gray axis of the color information in the white region $\Psi$ that is obtained with Formula IX or Formula X (S53). Here, to calculate the shift amount, the mean values (Cbc, Crc) of the color differences Cb, Cr of the pixels in the white region $\Psi$ are calculated and these mean values are taken as the amount of the shift from the gray axis.

Here, the reason for normalizing with the luminance Ki is to increase the accuracy of the estimated balance shift amount. Aside from the mean value of the values obtained by normalizing Cr, Cb of the pixels in the white region $\Psi$ with the luminance Ki, it is also possible to use the most frequent normalized Cr, Cb values or to use the largest Cb, Cr.

It should be noted that as the shift amount, in addition to the mean value of the color difference of the pixels in the white region $\Psi$, it is also possible to user the values of Cb, Cr appearing most frequently in the pixels in the white region $\Psi$.

Next, the balance amount calculation portion 71 calculates the balance correction amounts $\Delta Cb$, $\Delta Cr$ using Formula XI (S54).

[Formula XI]

$$\Delta Cb=-Cbc\times Kb\times Kt,\ \Delta Cr=-Crc\times Kr\times Kt\wedge\wedge\wedge \quad (11)$$

In Formula XI, Kb and Kr are positive integers, and are stored in the estimation control variable 73.

The balance correction portion 72 performs correction of the calculated balance correction amounts $\Delta Cb$, $\Delta Cr$ in addition to the color differences of the pixels (S55). Kt represents the luminance of the pixel for which correction is to be performed. It should be noted that if this correction value exceeds a predetermined value, then it is also possible to not execute correction, or to change (e.g. suppress) the positive integers Kb and Kr in Formula XI. By doing this, it is possible to inhibit color balance correction that is abrupt.

It should be noted that although Kb and Kr have been positive integers, it is also possible to use values that have been converted by a predetermined function according to the values of the balance shift amounts Cbc, Crc. It is also possible to use a nonlinear function, such as one that inhibits abrupt color balance correction, as the Formula XI. The luminance term Kt in Formula XI is for suppressing a drop in picture quality due to sudden balance corrections as the result of the luminance Kt of the target pixel.

This embodiment is characterized in that regions that humans tend to perceive as bright are extracted and the balance shift amount in those regions is found, and color balance correction of the image is executed in such a manner that this balance shift amount is corrected. Thus, the embodiment can be achieved by a simple configuration in which it is not necessary to perform complicated determinations. Further, by correcting primarily the balance in those regions that humans perceive as bright, it is also possible to reduce the negative effects on the processed image.

It should be noted that here the color differences Cb and Cr were the target for the balance shift amount, but aside from these it is also possible to use the hue H and color saturation S in an HSV system or the color information a* and b* of a La*b* system.

Further, in the course of selecting estimation pixels using Formula X or Formula XI, it is not absolutely necessary to perform the determination $|RnC\_i-1|<Th2$, or $|RnC\_i-1|<Th2'$, relating to the color contrast information. In this case, it is possible to perform the selection of estimation pixels under the condition that only those regions that will draw considerable interest due to their brightness are focused on, allowing a wider pixel region than under the conditions described above to be selected as the target for estimation.

Seventh Embodiment

Figure 20:
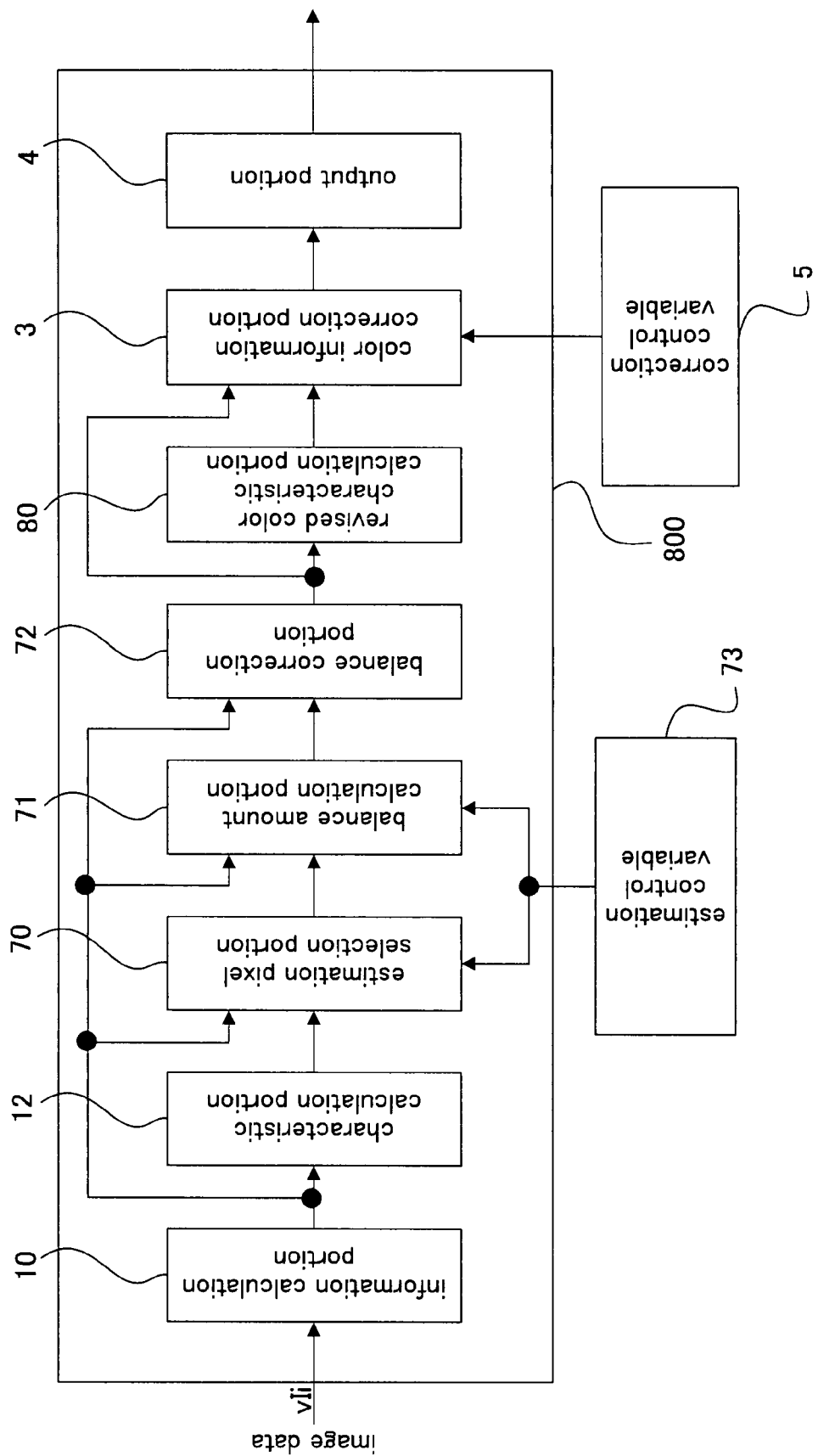
FIG. 20 is a block diagram showing the configuration of the image processing device according to a seventh aspect of the invention.

An image processing method and an image processing device 800 that perform color balance correction and color correction based on color contrast information in the pixels are described as a seventh embodiment of the invention using FIG. 20. It should be noted that structural elements that are the same as those already described in previous embodiments are assigned the same reference numerals and will not be described.

FIG. 20 shows the configuration of the image processing device 800 of the seventh embodiment of the invention.

This aspect of the invention is characterized in that a device for performing image processing by processing image data has the features of the device of the sixth embodiment of the invention, which performs color balance correction of an image based on the brightness contrast information and the color contrast information, as well as the features of the device of the first embodiment of the invention, which performs color correction for each pixel based on the color contrast.

As shown in FIG. 20, the image processing device 800 is characterized in that it is furnished with revised color characteristic calculation portion 80, color information correction portion 3, and a correction control variable 5.

The revised color characteristic calculation portion 80 recalculates the color characteristic information data after color balance correction by the balance correction portion 72 is over. Thus, the color characteristic information data of the target color information is extracted from color information that has been updated through color balance correction.

It should be noted in the image processing device 800, the color characteristic information data $Rn\_i$ for the pixel $Pi$ that are obtained by the characteristic calculation portion 12 and the color characteristic information data $dRn\_i$ that are obtained by the revised color characteristic calculation portion 80 can be contrast information relating to the same color information or color contrast information that relates to different color information.

As shown in FIG. 20, the estimation pixel selection portion 70 extracts regions that humans will perceive as bright (white point regions) from the brightness contrast information $RnK\_i$, the luminance information Ki, and the color contrast information $RnC\_i$. The balance amount calculation portion 71 calculates the amount of shift in the color balance. The balance correction portion 72 performs balance correction so as to correct this shift amount. The revised color characteristic calculation portion 80 recalculates the color characteristic information data $dRn\_i$ of the target color information in the pixels. Here, this is performed in the same manner as described for the characteristic calculation portion 12. The color information correction portion 3 executes color correction of the pixels. Thus, the structure of the image processing device 800 is such that a processed image is obtained.

By adopting this configuration, the image processing device 800 can have both the function of color balance correction, which is a feature of the sixth embodiment of the invention, and the function of color correction toward human visual characteristics, which is a feature of the first embodiment of the invention.

It should be noted that here the sixth embodiment and the first embodiment of the invention have been combined, but it is also possible to combine the sixth embodiment of the invention with any one of the second through fifth embodiments of the invention. If the second embodiment or the third embodiment of the invention is combined with the sixth embodiment of the invention, then, based on the results of color correction in the selected pixels, the color correction of the other pixels is estimated through propagation, and it is possible to achieve more accurate color correction in which the balance of the overall image is retained. If the fourth embodiment or the fifth embodiment of the invention is combined with the sixth embodiment of the invention, then, by changing the target for color correction from a pixel unit to a block pixel unit, it is possible to reduce the amount of processing.

Eighth Embodiment

Figure 21:
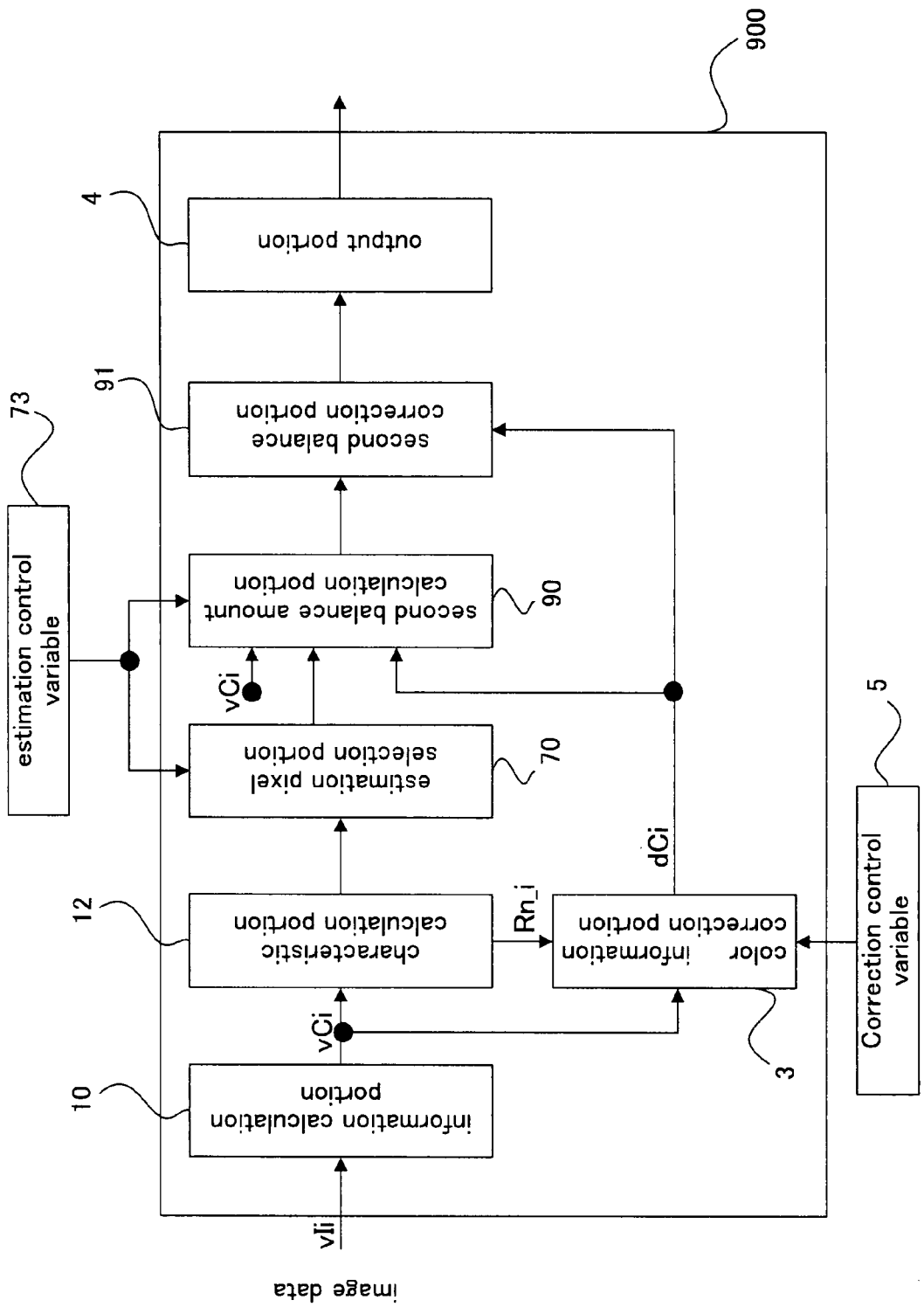
FIG. 21 is a block diagram showing the configuration of the image processing device according to an eighth aspect of the invention.

An image processing method and an image processing device 900 that perform color balance correction and color correction based on color contrast information in the pixels are described as an eighth embodiment of the invention using FIG. 21.

FIG. 21 shows the configuration of the image processing device 900 of the eighth embodiment of the invention.

This aspect of the invention is characterized in that a device that performs image processing by processing image data has both the features of the device of the sixth embodiment of the invention, which performs color balance correction of an image based on the brightness contrast information and the color contrast information, and the features of the device of the first embodiment of the invention, which performs color correction for each pixel based on the color contrast.

As shown in FIG. 21, the image processing device 900 is characterized in that it is furnished with second balance amount calculation portion 90 and second balance correction portion 91.

The second balance amount calculation portion 90 uses the correction amount of the color information of the target pixels that has been obtained by the color information correction portion 3 to calculate the amount of shifting from the gray axis of the color information of the estimation pixels obtained by the estimation pixel selection portion 70. The second balance correction portion 91 adds the balance correction amount that is obtained by the second balance amount calculation portion 90 to the correction amount of the color information of the pixels obtained by the color information correction portion 3.

In the seventh embodiment, the color characteristic information data is recalculated after the color balance correction by the balance correction portion 72 is over and that value is used to execute color correction. By contrast, in the eighth embodiment, color balance correction is performed on the color information dCi, which has been corrected using the color characteristic information data Rn_i obtained by the characteristic calculation portion 12, without again extracting the color characteristic information data.

Hereinafter is described an example in which the color differences Cbi and Cri of the pixel Pi are used as the color information that is targeted by the color information correction portion 3 and the second balance amount calculation portion 90.

First, the information calculation portion 10 calculates the color differences Cbi and Cri of the pixel Pi. Next, the characteristic calculation portion 12 calculates the color characteristic information data Rncb_i and Rncr_i for the color differences Cbi and Cri. In this case, the color characteristic information data Rncb_i and Rncr_i are calculated by performing the same procedure as that described in the first embodiment with respect to the color differences.

The color information correction portion 3 uses the color characteristic information data Rncb_i and Rncr_i to execute correction of the color difference. If the corrected color differences dCi are regarded as Cbi_new and Cri_new, then the color difference correction amounts $\Delta Cbi$ and $\Delta Cri$ are found by $\Delta Cbi=Cbi\_new-Cbi$ and $\Delta Cri=Cri\_new-Cri$.

The second balance amount calculation portion 90 calculates the color difference correction amounts $\Delta Cbi$ and $\Delta Cri$. It also adds the color difference correction amounts $\Delta Cbi$ and $\Delta Cri$ to the mean values Cbc, Crc of the color differences of the estimation pixels that have been selected by the estimation pixel selection portion 70, and estimates the balance shift amount taking into account the color difference correction by the color information correction portion 3.

Further, with the image processing device 900, a predetermined coefficient Kr is used when calculating the balance correction amount, as in step S54 of FIG. 18. Here, if Kr is determined by a function that takes into account the original color difference, then preferably the amount of color difference correction performed by the color information correction portion 3 is taken into account.

Also, with the image processing device 900, balance correction is executed in step S55 of FIG. 18 after determining whether the color correction amounts $\Delta Cb$ and $\Delta Cr$ are equal to or greater than a predetermined value, and when determining in step S55 whether or perform that balance correction, it is necessary to take into account the amount of color correction executed by the color information correction portion 3 to which has been added the color difference component of the input image.

When calculating the color correction color balance shift amount, if a pixel region that a person will perceive as bright is selected as in S52 of FIG. 18, then the brightness contrast information and the brightness of the pixels are used, however, the color information correction portion 3 is set to that it does not execute correction of the brightness contrast information. On the other hand, it is possible that the values of the color contrast information have been changed due to correction, but since it is assumed that color correction based on the color contrast is performed, there is no significant impact on the detection of the balance amount by the second balance amount calculation portion 90. Further, if a pixel region that a person will perceive as bright is selected as in S52 of FIG. 18, then the conditions for the color contrast information data Rncb_i and Rncr_i have lower priority than the brightness contrast information. It is also possible for the color contrast information of the characteristic calculation portion 12 to be used by the estimation pixel selection portion 70 to select the estimation pixels.

It should be noted that here the description was made under the assumption that the color information Ci targeted for correction by the color information correction portion 3 and the color information serving as the target for the balance correction amount performed by the second balance amount calculation portion 90 are the same color information Ci. On the other hand, it is also possible for different color information to be targeted, such as the color saturation Si serving as the target color information of the color information correction portion 3 and the color differences Cri, Cbi serving as the color information targeted by the second balance amount calculation portion 90. In this case, it is necessary for the information calculation portion 10 to calculate the color information that is used by the color information correction portion 3 and by the second balance amount calculation portion for each pixel, and it also is necessary for the color information correction portion 3 to have the function of converting the target color information to the color information to be used by the second balance amount calculation portion 90 after correction of the target color information has been executed.

By adopting this configuration for the image processing device 900, it can have both the function of color balance correction, which is the characteristic of the sixth embodiment of the invention, and the function of color correction toward human visual characteristics, which is the characteristic of the first embodiment of the invention. Further, the amount of processing is reduced due to the fact that it is not necessary to recalculate the color characteristic information data for color correction.

It should be noted that here the sixth embodiment and the first embodiment of the invention have been combined, but it is also possible to combine the sixth embodiment of the invention with any one of the second through fifth embodiments of the invention. If the second embodiment or the third embodiment of the invention is combined with the sixth embodiment of the invention, then, based on the result of color correction of the selected pixels, the color correction of the other pixels is estimated through propagation, and it is possible to achieve more accurate color correction in which the balance of the overall image is retained. If the fourth embodiment or the fifth embodiment of the invention is combined with the sixth embodiment of the invention, then, by changing the target for color correction from pixel units to block pixel units, it is possible to reduce the amount of processing.

Ninth Embodiment

Figure 22:
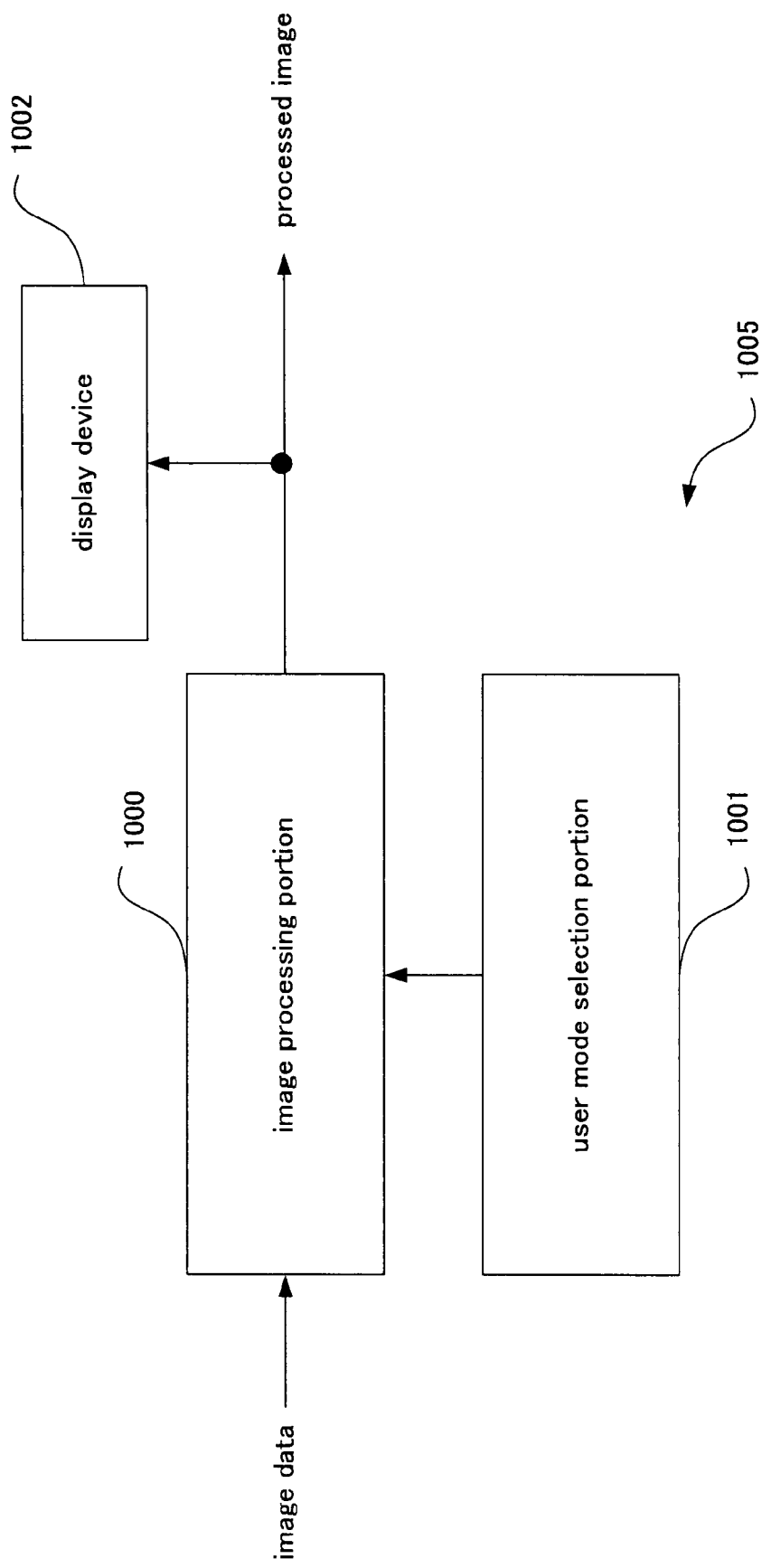
FIG. 22 is a block diagram showing the configuration of the image processing device according to a ninth aspect of the invention.
Figure 23:
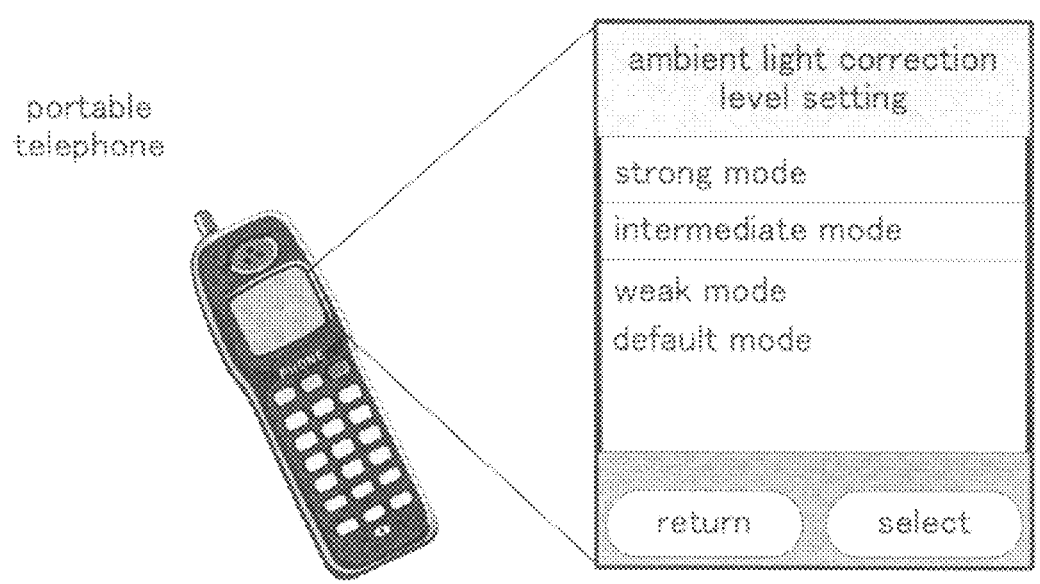
FIG. 23 illustrates an overview of user selection on the image processing device according to the ninth aspect of the invention.

An image processing method and an image processing device 1005 that perform color information correction based on color contrast information in the pixels are described as a ninth embodiment of the invention using FIGS. 22 and 23.

FIG. 22 shows the configuration of the image processing device 1005 of the ninth embodiment of the invention. FIG. 23 shows an example in which the user mode selection portion of the image processing method according to the ninth embodiment of the invention is adopted.

This aspect of the invention is a device for correcting color information in an image by processing image data, in which the device includes means for the user to select the processing mode.

As shown in FIG. 22, the image processing device 1005 is made of image processing portion 1000, which serves as the image processing device according to any of the first through eighth embodiments of the invention, a display device 1002 for displaying the result of processing by the image processing portion 1000, and user mode selection portion 1001 for the user to select the processing mode.

In this aspect of the invention, the processed image that has been subjected to color correction by the image processing portion 1000 is displayed on the display device 1002. The user visually confirms the processed image on the display device 1002 and selects the processing mode with the user mode selection portion 1001. Thus, it is possible to achieve color correction that fits individual user characteristics.

Examples of the display device 1002 include the display devices of image-capturing devices such as digital still cameras or digital video cameras, the display screen of image editing devices for editing digital images, and the display screens of portable telephones used in mobile environments, car mobile devices, and PDAs, or large-size video display devices that may be used in various environments. Examples of the display screen of portable telephones include not only the main screen of the portable telephone for display electronic mail and images, but also the sub-screens that perform a display of the time in folding portable telephones.

FIG. 23 shows an example of the user mode selection portion 1001. FIG. 23 shows a method of user mode selection through the menu screen of a portable telephone.

In this case, the user views the display device 1002 and selects any one of (1) strong mode, (2) intermediate mode, (3) weak mode, and (4) default mode on the menu "Ambient Light Correction Level Setting," as shown in FIG. 23.

Here, the default mode corresponds to a mode in which the default values for the correction strength or estimation strength in the table data shown in the correction control variable 5, the control variable 15, or the estimation control variable 73 of in the processing devices are used as they are.

By selecting the processing mode, the strength level of the color correction processing that is adopted by the image processing device 1000 is controlled using the user mode selection portion 1001. That is, control of the processing level is performed by controlling the correction strength or the estimation strength in the table data included in the correction control variable 5, the control variable 15, or the estimation control variable 73 in the processing devices. For example, in the case of the strong mode, the strength of color correction is increased (the amount of correction is increased), and in the case of the weak mode, the strength of the color correction is decreased (the amount of correction is decreased). By doing this, it becomes possible to not only carry out color correction processing that yields an impression close to human visual characteristics, but also the level can be controlled in accordance with what each individual person sees.

It should be noted that although FIG. 23 shows an example of menu selection through a menu display, it is also possible to use switches or buttons that correspond to the various processing modes. Also, a default mode is shown in FIG. 23, but it is also possible for the intermediate mode in the menu to be the mode in which the default values in the correction control variable 5, the control variable 15, or the estimation control variable 73 of the processing devices are used as they are.

Tenth Embodiment

Figure 24:
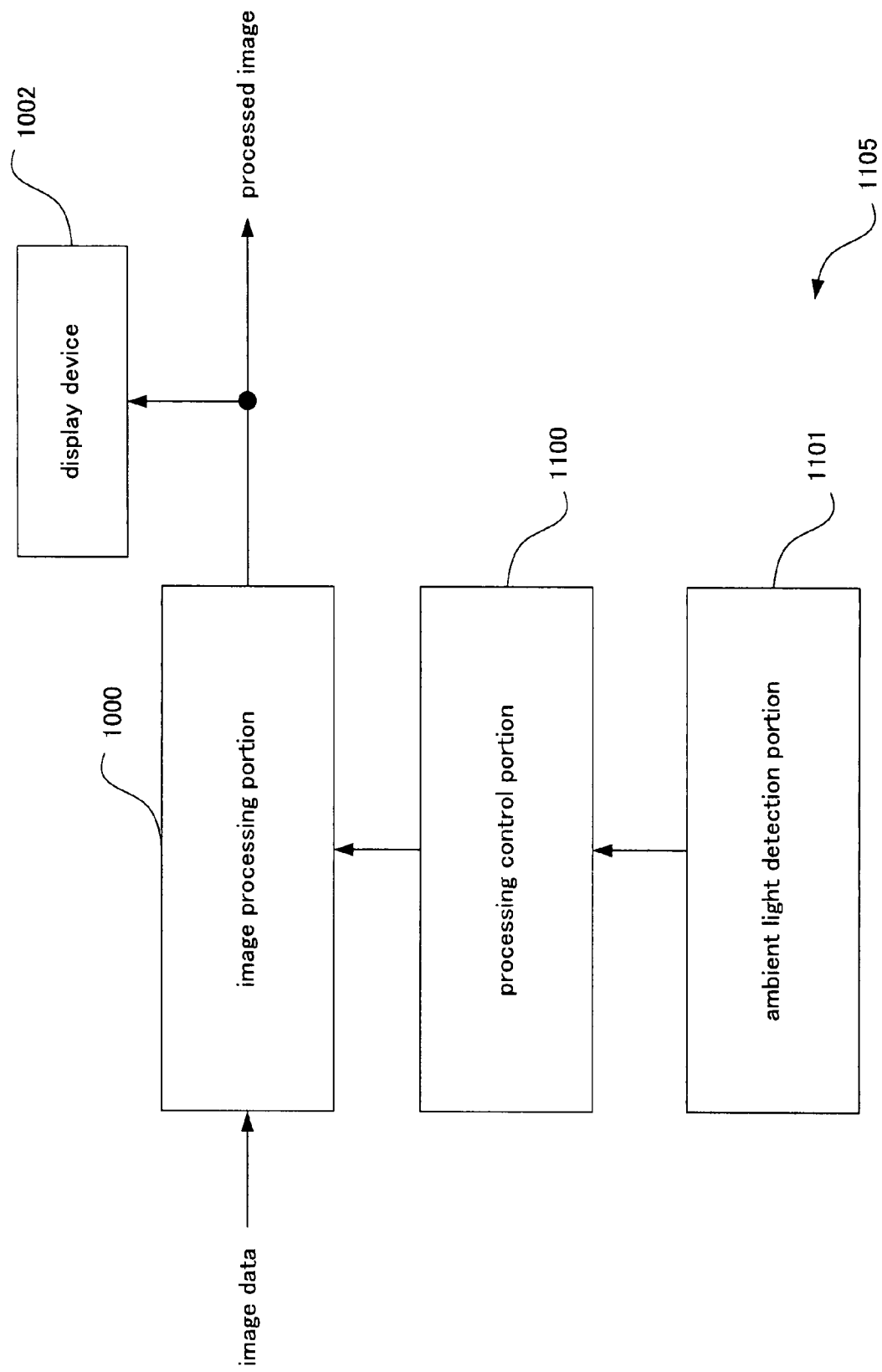
FIG. 24 is a block diagram showing the configuration of the image processing device according to a tenth aspect of the invention.
Figure 26:
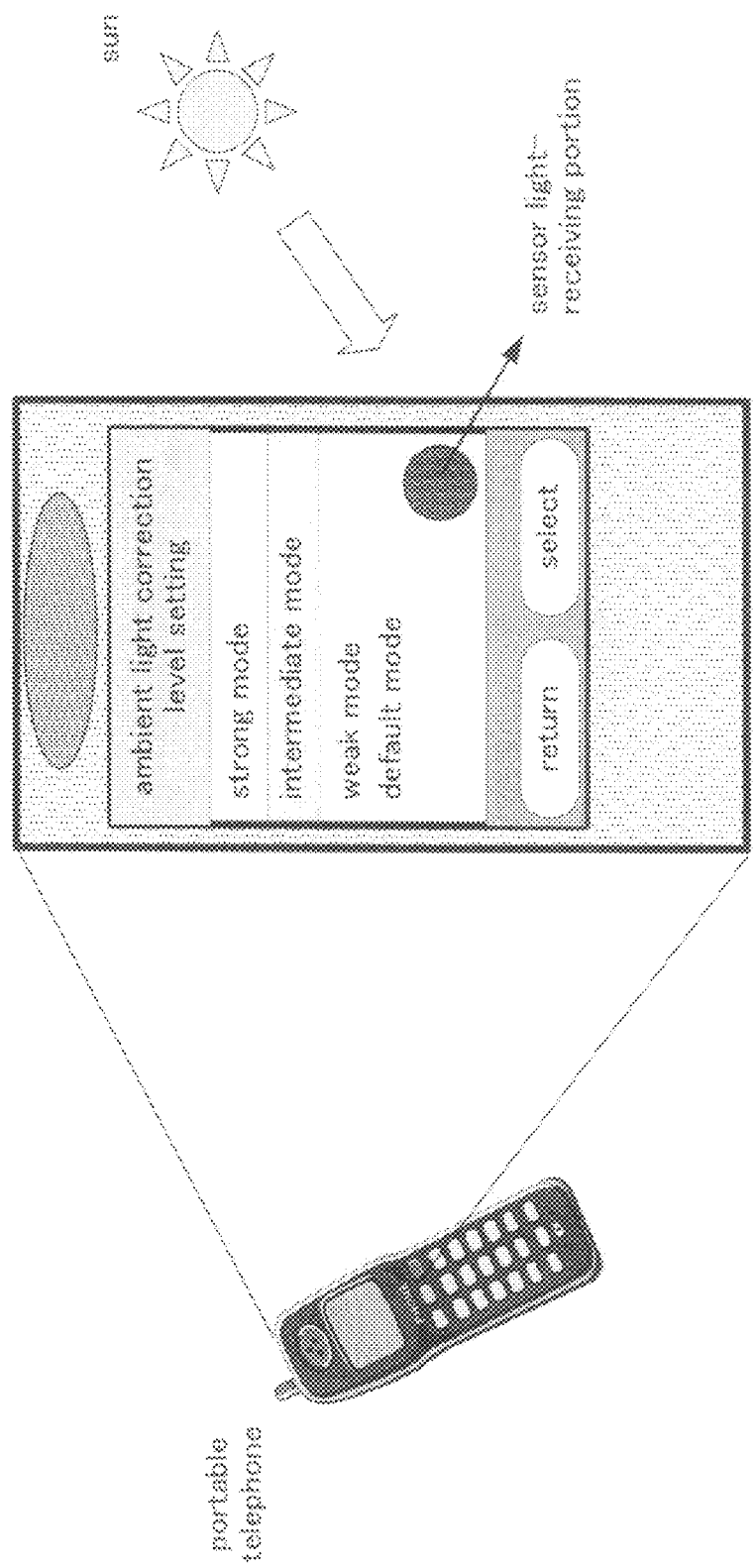
FIG. 26 is an explanatory diagram showing the concept of the processing control in the image processing devices of the tenth and eleventh aspects of the invention.
Figure 27:
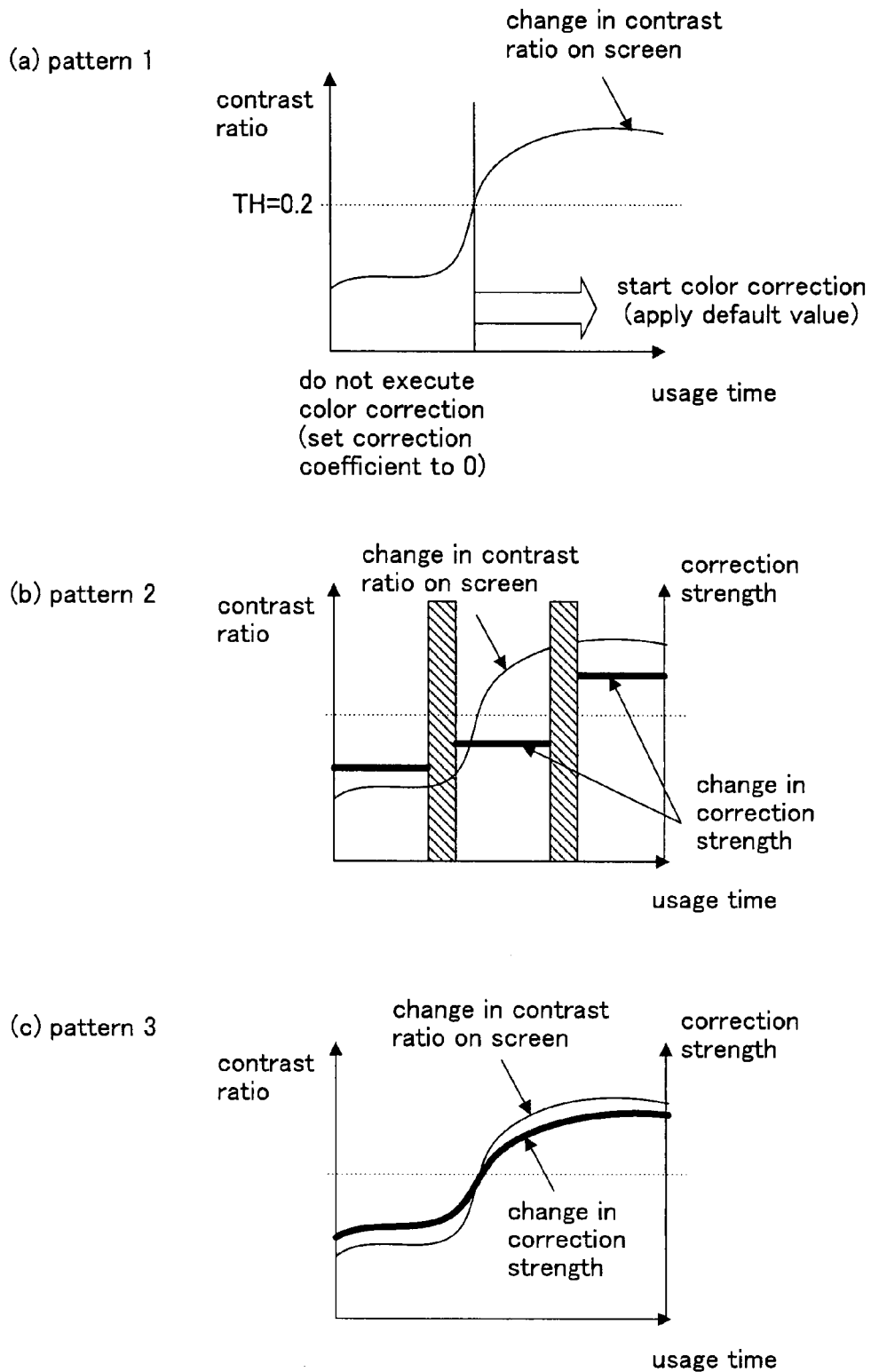
FIG. 27 is an explanatory diagram showing the concept of the processing control in the image processing devices of the tenth and eleventh aspects of the invention.

An image processing method and an image processing device 1105 that perform a correction of color information based on color contrast information in the pixels are described as a tenth embodiment of the invention using FIGS. 24, 26 and 27.

FIG. 24 shows the configuration of the image processing device 1105 of the tenth embodiment of the invention. FIG. 26 shows an example in which the processing control portion of the image processing method according to the tenth embodiment of the invention is adopted.

This aspect of the invention is a device for correcting color information in an image by processing the image data, in which the device includes ambient light detection portion 1101 for detecting the ambient light level of the environment in which the device is used, and processing control portion 1100 for automatically controlling the color correction strength according to the ambient light level that has been detected.

As shown in FIG. 24, the image processing device 1105 is made of image processing portion 1000 that serves as the image processing device according to any of the first through eighth embodiments of the invention, a display device 1002 for displaying the result of processing by the image processing portion 1000, the ambient light detection portion 1101 for detecting the ambient light level of the environment in which the device is used, and the processing control portion 1100 for determining the strength of color correction to be executed by the image processing portion 1000 in accordance with the ambient light level that has been detected by the ambient light detection portion 1101.

As shown in FIG. 26, the ambient light detection portion 1101 conceivably can employ a method of detecting ambient light, such as sunlight, with a sensor light-receiving portion in a predetermined location, but in portable telephones with cameras, for example, this can be substituted by a CCD camera light-receiving portion. In the ambient light detection portion 1101, the contrast ratio ERatio of black data to white data is found from the luminance when displaying black data, that is, the lowest density pattern, to the luminance when displaying white data, that is, the highest density pattern. It should be noted that an approach in which the brightness of the ambient light level is sensed and from that value the contrast ratio ERatio of black data, that is, the lowest density pattern, to white data, that is, the highest density pattern, is converted from table data that have been readied in the device in advance (this can be the table data indicated in the correction control variable 5, the control variable 15, or the estimation control variable 73 of the processing devices), also is possible.

The processing control portion 1100 uses the contrast ratio ERatio that has been calculated to automatically find the control strength or the estimation strength of the table data included in the correction control variable 5, the control variable 15, or the estimation control variable 73 of the processing devices.

This method is illustratively described using (a) pattern 1, (b) pattern 2, and (c) pattern 3 in FIG. 27.

In the pattern 1 shown in (a), color processing is performed using the processing strength, such as the correction strength or the estimation strength, at the point that the white-to-black contrast ratio ERatio exceeds a predetermined value (in FIG. 27, TH=0.2) as the default strength. Conversely, the processing strength is set to 0 (processing is not executed) when the ERatio does not exceed the predetermined value TH.

In the pattern 2 shown in (b), the mean value of the ERatio is calculated each predetermined usage time interval (the regions shaded by oblique lines in FIG. 26(b), and based on this mean value, the next processing strength is changed linearly. Here, it is also possible to adopt a nonlinear function rather than a linear function. Further, it is also possible to change the correction strength using the value of the ERatio every predetermined time interval. By doing this, it is possible to more appropriately control the processing strength with respect to fluctuations in the ambient light than in pattern 1.

Pattern 3 shown in (c) is for changing the correction strength in real time with respect to fluctuations in the contrast ratio ERatio of white to black versus the usage time, and allows the viewability in mobile environments to be improved even further.

In addition to these, by giving the device a sensing function of sensing the ambient light of the entire display image, and then changing the processing strength in each region of the display device, it is possible to achieve a display in which a constant viewability is retained over the entire image even if light is incident on only one part of the display.

Eleventh Embodiment

Figure 25:
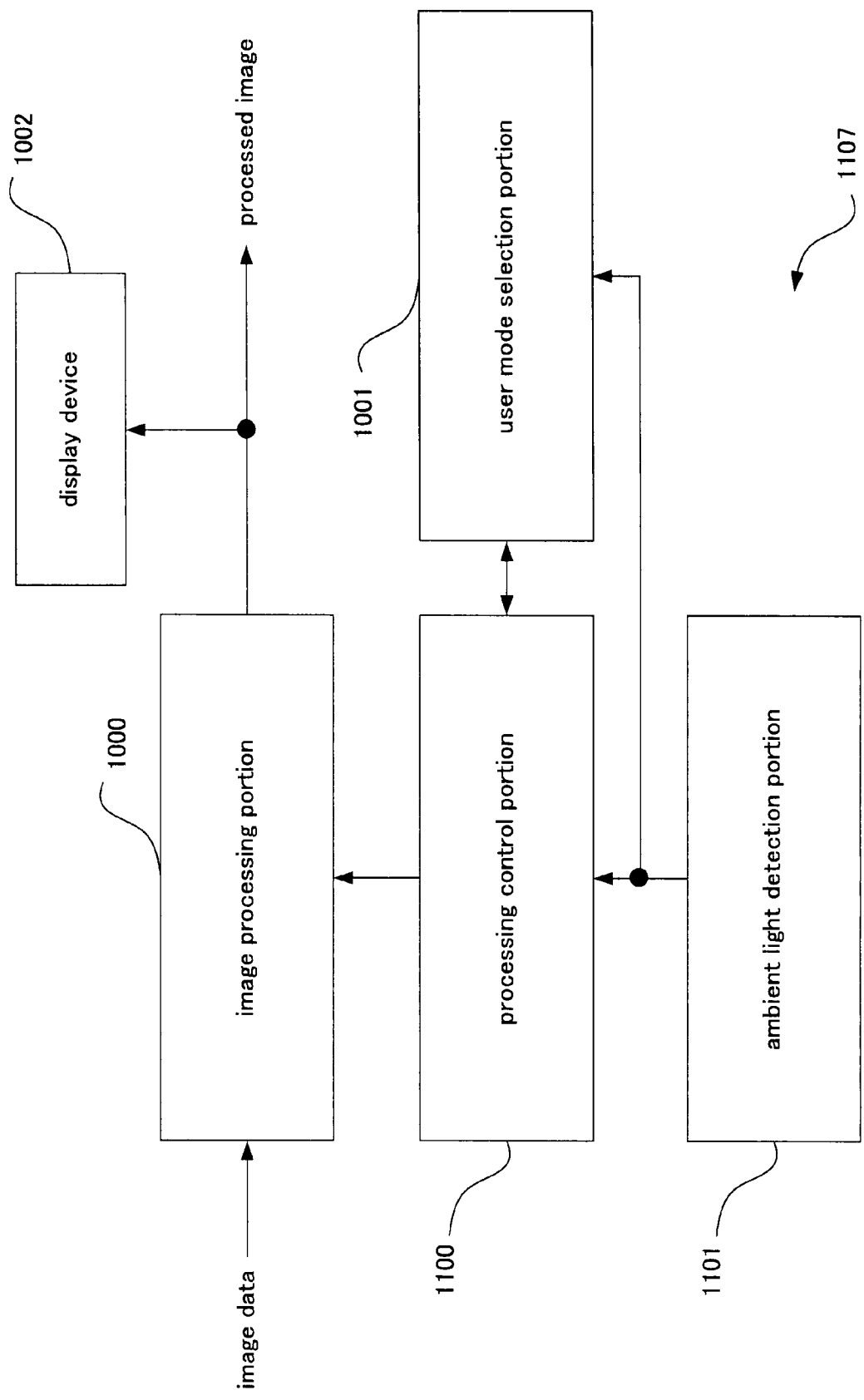
FIG. 25 is a block diagram showing the configuration of the image processing device according to an eleventh aspect of the invention.

An image processing method and an image processing device 1107 that perform a correction of color information based on color contrast information in the pixels are described as an eleventh embodiment of the invention using FIGS. 25, 26 and 27.

FIG. 25 shows the configuration of the image processing device 1107 of the eleventh embodiment of the invention. FIG. 26 shows an example in which the processing control portion of the image processing method according to the tenth embodiment of the invention is adopted.

This aspect of the invention is a device for correcting color information in an image by processing the image data, in which the device includes ambient light detection portion 1101 for detecting an ambient light level in the environment in which the device is used, processing control portion 1100 for automatically controlling the color correction strength according to the ambient light level that has been detected, and user mode selection portion, which is a characteristic of the ninth embodiment of the invention.

As shown in FIG. 25, the image processing device 1107 is made of image processing portion 1000 serving as the image processing device according to any of the first through eighth embodiments of the invention, a display device 1002 for displaying the result of processing by the image processing portion 1000, the ambient light detection portion 1101 for detecting the ambient light level in the environment in which the device is used, the processing control portion 1100 for determining the strength of the color correction to be executed by the image processing portion 1000 in accord with the ambient light level that has been detected by the ambient light detection portion 1101, and user mode selection portion 1001 for allowing a user to select the processing mode.

As shown in FIG. 26, the ambient light detection portion 1101 conceivably employs a method of detecting ambient light, such as sunlight, with a sensor light-receiving portion in a predetermined location, but in portable telephones with cameras, for example, this can be substituted by a CCD camera light-receiving portion. With the ambient light detection portion 1101, the contrast ratio ERatio of black data to white data is found from the luminance when displaying black data, that is, the lowest density pattern, to the luminance when displaying white data, that is, the highest density pattern. It should be noted that an approach in which the brightness of the ambient light level is sensed and from that value the contrast ratio ERatio of black data, that is, the lowest density pattern, to white data, that is, the highest density pattern, is converted from table data that have been readied in the device in advance (this can be the table data indicated in the correction control variable 5, the control variable 15, or the estimation control variable 73 of the processing devices), also is possible.

The processing control portion 1100 uses the contrast ratio ERatio that has been calculated to automatically find the control strength or the estimation strength of the table data included in the correction control variable 5, the control variable 15, or the estimation control variable 73 of the processing devices.

For this method, the same processing as that illustrated in FIG. 27 is performed.

The user uses the display device 1002 to view the processed image, which is automatically controlled. The user also may change the processing mode using the user mode selection portion 1001, that is, he may change the data in the table data included in the correction control variable 5, the control variable 15, or the estimation control variable 73 of the processing devices. Thus, the processing strength can be changed automatically in correspondence with the ambient light, and it is also possible to find a better match with each individual user's visual characteristics.

Effects of the Embodiments (1) With the foregoing embodiments, it is possible to correct the color information of, in particular, saturated images of sky, etc., and images in which color information has been lost due to strong ambient light, based on human visual characteristics, and it is possible to achieve an increase in the visibility of the displayed image.

(2) With the image processing of the foregoing embodiments, region extraction such as that performed in conventional technologies when selecting a target to be corrected with color correction is not performed. Thus, it is possible to inhibit the occurrence of color correction error that is caused by region extraction error.

Figure 28:
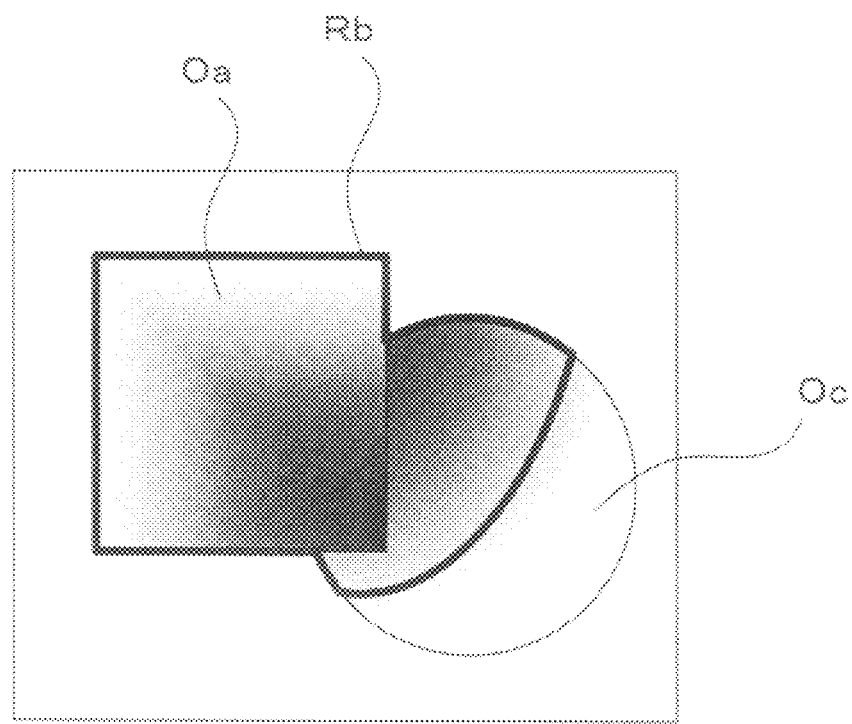
FIG. 28 is an explanatory diagram describing the effects of the image processing devices according to the first through eleventh aspects of the invention.

Specifically, in an image in which objects having similar color information overlap as in FIG. 28, it is difficult to appropriately extract the target object Oa using conventional region extraction technology, and this example results in a region Rb that includes the target object Oa and an object Oc that is located at the periphery of the object Oa being extracted. Further, in the conventional technology, color correction is performed on that extracted region Rb and thus color correction error occurs at the border of the target object Oa, resulting in color correction of the target object Oa not being suitably performed.

On the other hand, region extraction is not performed in this invention, and thus it is possible to keep such color correction errors from occurring.

(3) With the image processing of the embodiments, it is possible to improve visibility particularly under ambient light conditions when there is a need for brightness correction and color correction.

For example, when images that are to be viewed at a ratio (the contrast ratio) of white pixels, which have the highest luminance, to black pixels, which have the lowest luminance, of about 100:1 to 40:1 in an inside environment are viewed under strong ambient light conditions such as in the presence of sunlight, for example, it is known that the contrast ratio drops to about 3:1 to 2:1.

Conventionally, brightness correction that employs a gamma function for improving visibility in ambient light has been known. Specifically, brightness correction is performed using a gamma function (convex) such that black density inhibition is performed in images viewed in a bright environment.

Further, when performing color correction, conventionally one of the following color corrections (a) to (c) was adopted.

(a) Color correction in which color saturation correction (color saturation up correction) is executed over the entire image In this case, it is possible to increase the color saturation of the overall image, but overcorrection of the color saturation occurs in some areas.

(b) Color correction in which a target for correction is extracted (a person serving as the central object is cut out) and then color saturation correction (color saturation up correction) is executed on the target for correction that has been extracted.

In this case, distortion of the color saturation after correction (discontinuities of the correction color saturation) caused by extraction error occurs.

(c) Color correction in which color saturation correction is executed linearly controlling the color saturation correction amount based on the ratio of the brightness before and after correction.

In this case, a drop in color saturation occurs in conjunction with inhibition of the black density. Further, if the color saturation correction amount is linearly controlled in accord with the reciprocal of the ratio of the brightness, then it is possible to suppress a drop in the color saturation. However, performing linear control results in little improvement with regard to the loss of the color saturation component due to strong ambient light.

Thus, it was difficult to achieve sufficient correction by performing a conventional color correction (a) to (c) together with brightness correction.

Accordingly, when color saturation correction is executed as the color correction through the color contrast correction of the embodiments, then color saturation correction is executed in a manner that further increase the color contrast, allowing the visibility to be increased.

[Others]

The image processing methods and the image processing devices of the invention that have been described in the foregoing embodiments are image processing methods and image processing devices that utilize the color contrast characteristics that were described using FIG. 4. Thus, the processing of the invention is affected by the color contrast characteristics.

Figure 29:
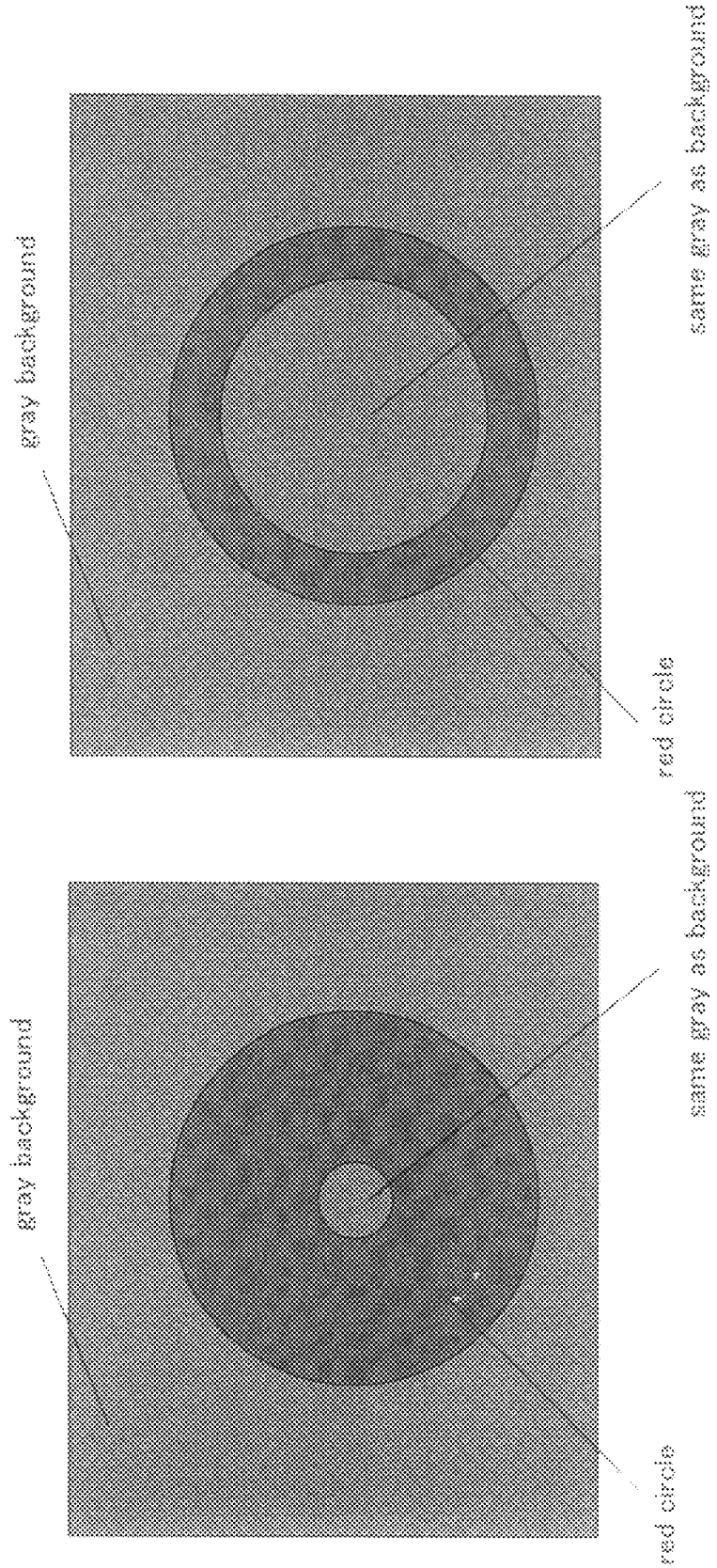
FIG. 29 is an explanatory diagram relating to the change in the color contrast effect, which is a feature of the image processing devices of the first through eleventh aspects of the invention.
Figure 30:
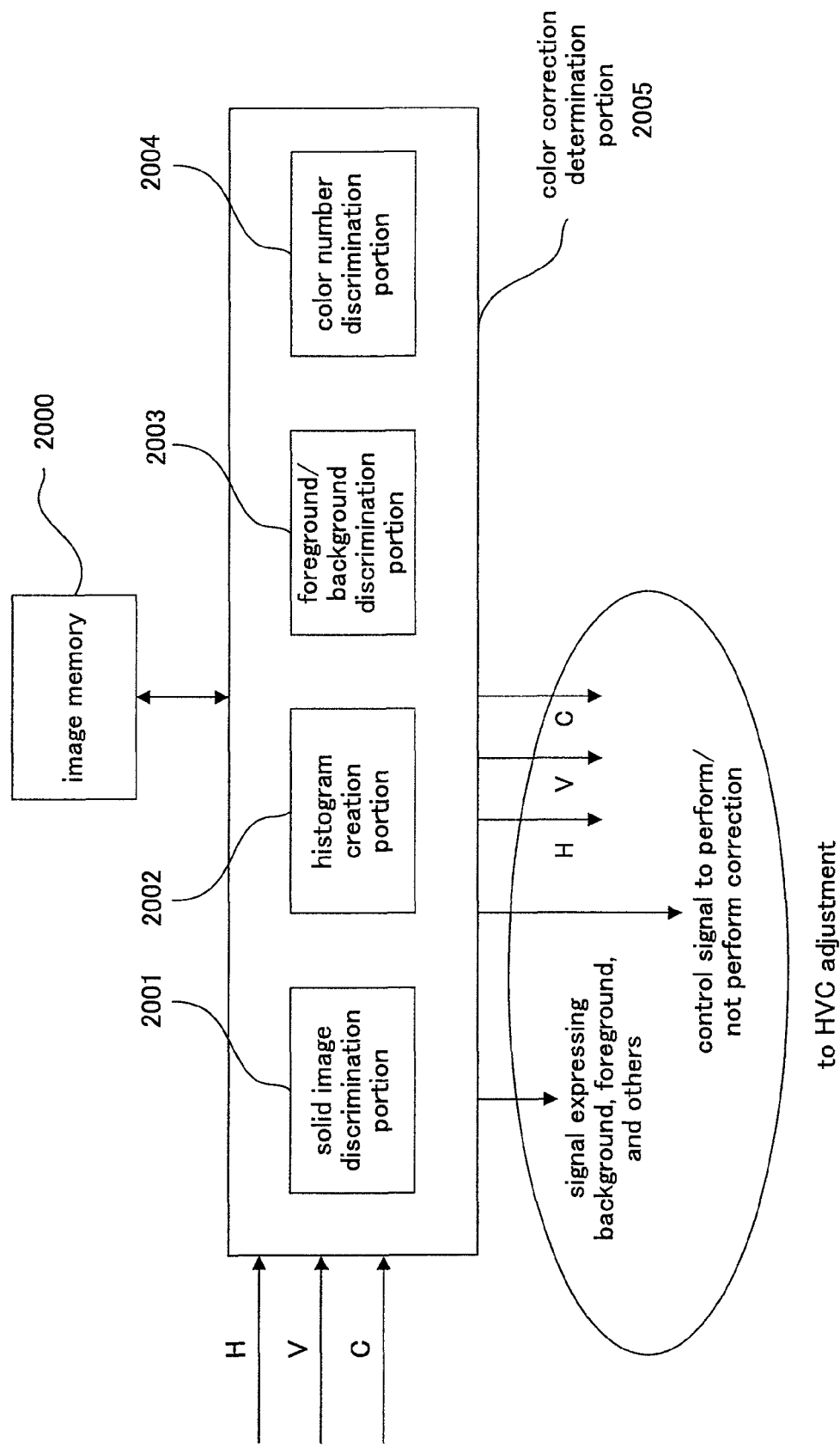
FIG. 30 is a block diagram showing the configuration of the color control discrimination portion in a conventional image processing device.
Figure 31:
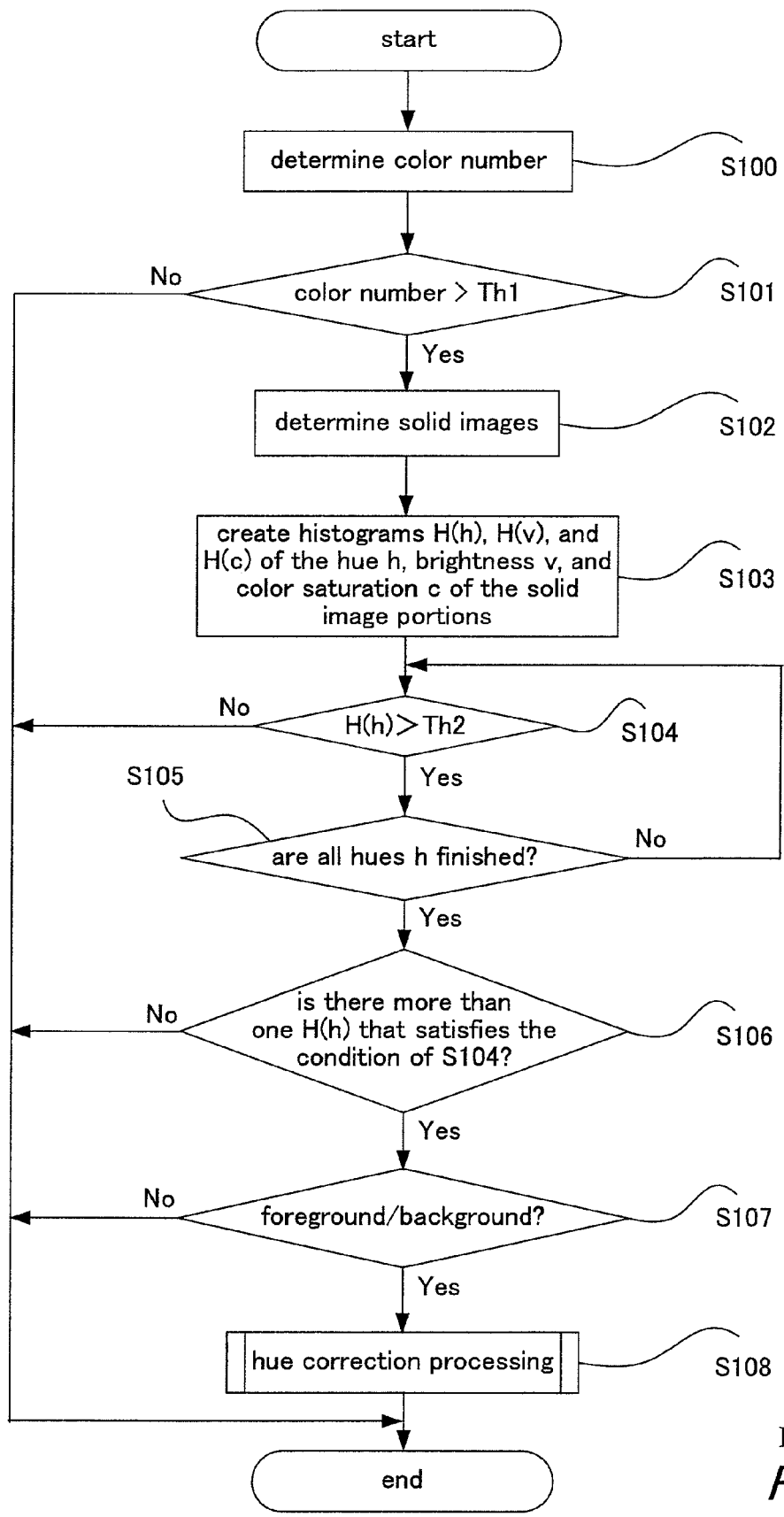
FIG. 31 is a processing flowchart of the conventional image processing method.
Figure 32:
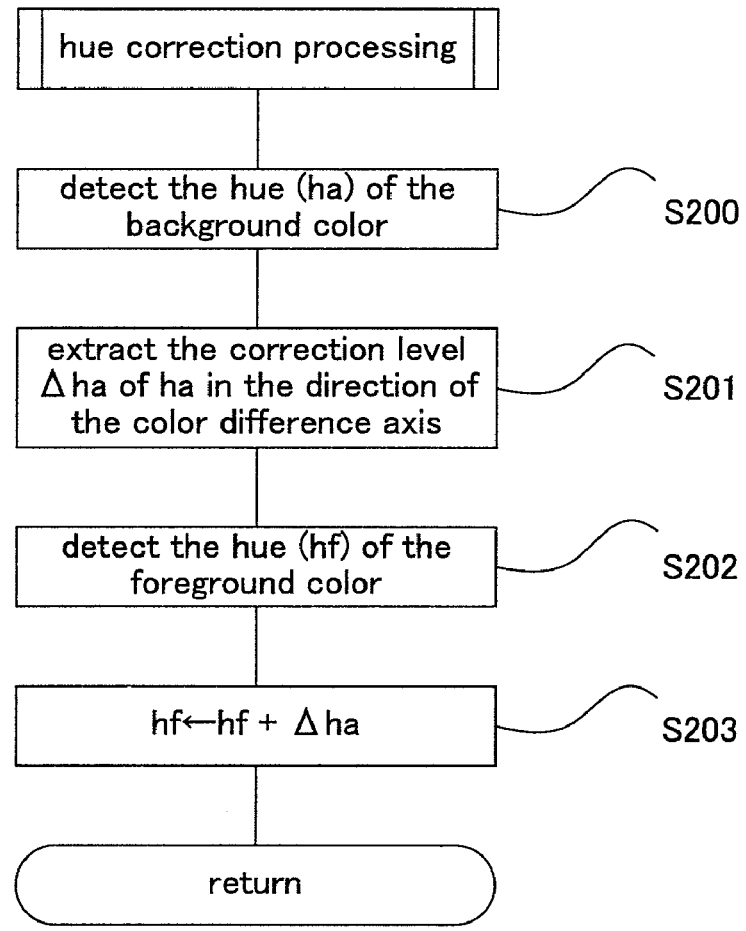
FIG. 32 is a flowchart of color correction in the conventional image processing method.

FIG. 29 shows the color contrast characteristics, and the effect changes depending on the size of the gray circle in the center of the red circle on the gray background. For example, if the radius of the gray circle in the middle is smaller than the red circle, then the color contrast phenomenon that leads the gray circle in the center of the red circle being perceived as blue becomes stronger (see FIG. 29(*a*)). By contrast, as the radius of the gray circle in the middle increases and approaches that of the red circle, color contrast phenomenon that causes the gray circle in the center of the red circle to be perceived as blue becomes weaker (see FIG. 29(*b*)).

Thus, the image processing methods and the image processing devices of the invention have that characteristic that the effect of color correction changes when simple patterns of different sizes, such as those illustrated in FIG. 29, are processed.

As for the color characteristic information data $Rn\_i$ of the target color information, in addition to being (1) the ratio of the color information of the target pixel with respect to the representative color information of its surroundings as described in the first embodiment of the invention, or (2) the difference between the color information of the target pixel and the representative color information of the surroundings, it also can be a value that is obtained by transforming (1) and (2) using a predetermined function.

The correction control variable 5, the control variable 15, and the estimation control variable 73 or the like, which include the table data, in the processing devices can be provided in the processing devices, or alternatively can function as external memories like a RAM and store the table data or provide table data from input means from outside the device.

The image processing methods and the image processing devices of the invention that have been described in the foregoing embodiments are devices that are used provided in, or connected to, devices that handle images, such as computers, televisions, digital cameras, portable telephones, PDAs, and car TVs, and are achieved as integrated circuits such as LSIs.

More specifically, the functional blocks of the image processing devices 100, 200, 400, 500, 600, 700, 800, 900, the user mode selection portion 1001, the processing control portion 1100, and the ambient light detection portion 1101 (see FIGS. 1, 7, 12, 14, 16, 17, 20, 21, 22, 24, and 25) of the foregoing embodiments can be integrated into chips individually or can be integrated into a single chip that includes some or all of these. It should be noted that here LSI is used, but depending on the degree of integration this instead may be referred to as IC, system LSI, super LSI, or ultra LSI.

Further, the manner in which the integrated circuit is achieved is not limited to an LSI, and it is also possible to use a dedicated circuit or a general purpose processor. After LSI manufacturing, it is also possible to employ a programmable FPGA (Field Programmable Gate Array) or a reconfigurable processor in which the connections and settings of the circuit cells within the LSI can be reconfigured.

Further, if other technologies that improve upon or are derived from semiconductor technologies introduce integration technology that supplants LSIs, then naturally it is also possible to integrate the functional blocks using that technology. Biotechnology applications are one such foreseeable example.

Further, the processing of the functional blocks of the foregoing embodiments can be achieved by a program. For example, the processing of the functional blocks of FIGS. 1, 7, 12, 14, 16, 17, 20, 21, 22, 24, and 25 can be executed on a computer using a central computation device (CPU). Programs for carrying out these processes can be stored on a memory device such as a hard disk or a ROM, and can be executed on the ROM or can be read to and executed on a RAM.

[First Attachment]

The present invention can also be expressed as follows.

(Content of the First Attachment)

(Attachment 1)

An image processing method for performing color correction of an image signal that has been input, comprising:

an information calculation step of calculating color information and brightness information of the image signal;

a characteristic calculation step of calculating visual characteristic information in accord with the brightness information and the color information;

a pixel selection step of selecting a plurality of pixels, from the image signal, to become the targets for a third color information correction;

a shift amount calculation step of detecting a shift amount by which the color information of the plurality of pixels that have been selected in the pixel selection step is shifted from a predetermined reference value;

a third color information correction step of performing the third color information correction on the image signal, based on the shift amount that has been obtained in the shift amount calculation step;

a second characteristic calculation step of further calculating second visual characteristic information of the image signal after color correction that is obtained in the third color information correction step;

a fourth color information correction step of performing a fourth color information correction on the image signal after the color correction based on the second visual characteristic information obtained in the second characteristic information calculation step; and an output step of outputting the image signal after color correction based on the color information that has been corrected in the fourth color information correction step.

(Attachment 2)

An image processing method for performing color correction of an image signal that has been input, comprising:

an information calculation step of calculating color information and brightness information of the image signal;

a characteristic calculation step of calculating visual characteristic information in accord with the brightness information and the color information;

a fifth color information correction step of performing a fifth color correction of the image signal, based on the visual characteristic information;

a pixel selection step of selecting a plurality of pixels, from the image signal, based on the visual characteristic information;

a shift amount calculation step of detecting a shift amount by which the color information of the plurality of pixels that have been selected in the pixel selection step is shifted from a predetermined reference value, in the image signal after the fifth color information correction;

a sixth color information correction step of performing a sixth color information correction on the image signal after the fifth color information correction based on the shift amount obtained in the shift amount calculation step; and an output step of outputting the image signal after color correction based on the color information that has been corrected in the sixth color information correction step.

(Attachment 3)

The image processing method according to attachment 1 or 2, wherein the characteristic calculation step includes a brightness contrast process and a color contrast process of comparing the brightness information and the color information of the target pixels with surrounding brightness information and surrounding color information that are representative of the brightness information and the color information of the surrounding region.

(Attachment 4)

An image processing device for performing color correction of an image signal that has been input, comprising:

an information calculation portion for calculating color information and brightness information of the image signal;

a characteristic calculation portion for calculating visual characteristic information in accord with the brightness information and the color information;

a pixel selection portion for selecting a plurality of pixels, from the image signal, to become the target of a third color information correction;

a shift amount calculation portion for detecting a shift amount by which the color information of the plurality of pixels that have been selected by the pixel selection portion is shifted from a predetermined reference value;

a third color information correction portion for performing the third color information correction of the image signal, based on the shift amount obtained by the shift amount calculation portion;

a second characteristic calculation portion for further calculating second visual characteristic information of the image signal after color correction that is obtained by the third color information correction portion;

a fourth color information correction portion for performing a fourth color information correction on the image signal after the color correction, based on the second visual characteristic information obtained by the second characteristic information calculation portion; and an output portion for outputting the image signal after color correction based on the color information that has been corrected by the fourth color information correction portion.

(Attachment 5)

An image processing device for performing color correction of an image signal that has been input, comprising:

an information calculation portion for calculating color information and brightness information of the image signal;

a characteristic calculation portion for calculating visual characteristic information in accord with the brightness information and the color information;

a fifth color information correction portion for performing a fifth color correction of the image signal, based on the visual characteristic information;

a pixel selection portion for selecting a plurality of pixels, from the image signal, based on the visual characteristic information;

a shift amount calculation portion for detecting a shift amount by which the color information of the plurality of pixels that have been selected by the pixel selection portion is shifted from a predetermined reference value, in the image signal after the fifth color information correction;

a sixth color information correction portion for performing a sixth color information correction on the image signal after the fifth color information correction, based on the shift amount obtained by the shift amount calculation portion; and an output portion for outputting the image signal after color correction based on the color information that has been corrected by the sixth color information correction portion.

(Attachment 6)

An image processing program for performing, on a computer, an image processing method that performs color correction of an image signal that has been input, wherein the image processing method comprises:

an information calculation step of calculating color information and brightness information of the image signal;

a characteristic calculation step of calculating visual characteristic information in accord with the brightness information and the color information;

a pixel selection step of selecting a plurality of pixels, from the image signal, to become the target of a third color information correction;

a shift amount calculation step of detecting a shift amount by which the color information of the plurality of pixels that have been selected in the pixel selection step is shifted from a predetermined reference value;

a third color information correction step of performing the third color information correction of the image signal, based on the shift amount obtained in the shift amount calculation step;

a second characteristic calculation step of further calculating second visual characteristic information of the image signal after color correction that is obtained in the third color information correction step;

a fourth color information correction step of performing a fourth color information correction on the image signal after the color correction based on the second visual characteristic information obtained in the second characteristic information calculation step; and an output step of outputting the image signal after color correction based on the color information that has been corrected in the fourth color information correction step.

(Attachment 7)

An image processing program for performing, on a computer, an image processing method that performs color correction of an image signal that has been input, wherein the image processing method comprises:

an information calculation step of calculating color information and brightness information of the image signal;

a characteristic calculation step of calculating visual characteristic information in accord with the brightness information and the color information;

a fifth color information correction step of performing a fifth color correction of the image signal, based on the visual characteristic information;

a pixel selection step of selecting a plurality of pixels, from the image signal, based on the visual characteristic information;

a shift amount calculation step of detecting a shift amount by which the color information of the plurality of pixels that have been selected in the pixel selection step is shifted from a predetermined reference value, in the image signal after the fifth color information correction;

a sixth color information correction step of performing a sixth color information correction on the image signal after the fifth color information correction based on the shift amount obtained in the shift amount calculation step; and an output step of outputting the image signal after color correction based on the color information that has been corrected in the sixth color information correction step.

(Attachment 8)

An integrated circuit that performs color correction of an image signal that has been input, comprising:

an information calculation portion for calculating color information and brightness information of the image signal;

a characteristic calculation portion for calculating visual characteristic information in accord with the brightness information and the color information;

a pixel selection portion for selecting a plurality of pixels, from the image signal, to become the target of a third color information correction;

a shift amount calculation portion for detecting a shift amount by which the color information of the plurality of pixels that have been selected by the pixel selection portion is shifted from a predetermined reference value;

a third color information correction portion for performing the third color information correction of the image signal, based on the shift amount obtained by the shift amount calculation portion;

a second characteristic calculation portion for further calculating second visual characteristic information of the image signal after color correction that is obtained by the third color information correction portion;

a fourth color information correction portion for performing a fourth color information correction on the image signal after the color correction, based on the second visual characteristic information obtained by the second characteristic information calculation step; and an output portion for outputting the image signal after color correction, based on the color information that has been corrected by the fourth color information correction portion.

(Attachment 9)

An integrated circuit that performs color correction of an image signal that has been input, comprising:

an information calculation portion for calculating color information and brightness information of the image signal;

a characteristic calculation portion for calculating visual characteristic information in accord with the brightness information and the color information;

a fifth color information correction portion for performing a fifth color correction of the image signal, based on the visual characteristic information;

a pixel selection portion for selecting a plurality of pixels, from the image signal, based on the visual characteristic information;

a shift amount calculation portion for detecting a shift amount by which the color information of the plurality of pixels that have been selected by the pixel selection portion is shifted from a predetermined reference value, in the image signal after the fifth color information correction;

a sixth color information correction portion for performing a sixth color information correction on the image signal after the fifth color information correction based on the shift amount obtained by the shift amount calculation portion; and an output portion for outputting the image signal after color correction based on the color information that has been corrected by the sixth color information correction portion.

(Description of the First Attachment)

The image processing method of Attachment 1 is an image processing method for performing color correction of an image signal that has been input, and includes an information calculation step, a characteristic calculation step, a pixel selection step, a shift amount calculation step, a third color information correction step, a second characteristic calculation step, a fourth color information correction step, and an output step. The information calculation step is for calculating the color information and the brightness information of the image signal. The characteristic calculation step is for calculating the visual characteristic information according to the brightness information and the color information. The pixel selection step is for selecting a plurality of pixels, from the image signal, to become the target of a third color information correction. The shift amount calculation step is for detecting a shift amount by which the color information of the plurality of pixels that have been selected in the pixel selection step is shifted from a predetermined reference value. The third color information correction step is for performing the third color information correction of the image signal, based on the shift amount obtained in the shift amount calculation step. The second characteristic calculation step is for further calculating second visual characteristic information for the image signal after color correction that is obtained in the third color information correction step. The fourth color information correction step is for performing a fourth color information correction on the image signal after color correction, based on the second visual characteristic information obtained in the second characteristic information calculation step. The output step is for outputting the image signal after color correction, based on the color information that has been corrected in the fourth color information correction step.

Here, the amount of shifting from a predetermined reference value can for example be the amount of shifting from a colorless axis or the gray axis of the color information (the same applies hereinafter). Further, the third color information correction could also be called "color balance" correction.

In an example of the image processing method of Attachment 1, a region or pixels in which humans are likely to focus on is (are) selected based on brightness contrast information that compares the luminance information of the target pixels with a representative luminance that represents the luminance of a surrounding region (for example, within the region of the field of view) that has been set surrounding the target pixels. Further, the color contrast is calculated for the pixels within the region that has been obtained, and from this color contrast the amount of shifting from the gray axis of the color information within the region is detected. Color correction of the entire image is then performed based on the shift amount that has been detected.

With the above image processing method of Attachment 1, those regions that humans perceive as bright due to the color contrast are removed, and color correction of the entire image is performed retaining the balance in that region. Thus, it is not necessary to perform image extraction, and it also possible to inhibit negative effects, such as correction error, that are caused by extraction error.

Further, with this invention, it is possible to exhibit the effects of the first aspect of the invention, allowing more appropriate color processing to be performed.

The image processing method of Attachment 2 is an image processing method for performing color correction of an image signal that has been input, and includes an information calculation step, a characteristic calculation step, a fifth color information correction step, a pixel selection step, a shift amount calculation step, a sixth color information correction step, and an output step. The information calculation step is for calculating the color information and the brightness information of the image signal. The characteristic calculation step is for calculating visual characteristic information in accord with the brightness information and the color information. The fifth color information correction step is for performing a fifth color correction of the image signal, based on the visual characteristic information. The pixel selection step is for selecting a plurality of pixels, from the image signal, based on the visual characteristic information. The shift amount calculation step is for detecting the shift amount by which the color information of the plurality of pixels that have been selected in the pixel selection step is shifted from a predetermined reference value, in the image signal after the fifth color information correction. The sixth color information correction step is for performing a sixth color information correction on the image signal after the fifth color information correction based on the shift amount that has been obtained in the shift amount calculation step. The output step is for outputting the image signal after color correction based on the color information that has been corrected in the sixth color information correction step.

In an example of this aspect of the invention, a region or pixels on which humans are likely to focus on is (are) selected based on brightness contrast information that compares the luminance information of the target pixels with a representative luminance that represents the luminance in a surrounding region (for example, within the region of the field of view) that has been set surrounding the target pixels. Further, the color contrast is calculated for the pixels within the region that has been obtained, and from this color contrast the amount of shifting from the gray axis of the color information within the region is detected. Color correction of the entire image is then performed based on the shift amount that has been detected.

With the image processing method of Attachment 2, those regions that humans perceive as bright due to the color contrast are removed, and color correction of the entire image is performed retaining the balance in that region. Thus, it is not necessary to perform image extraction, and it also possible to inhibit negative effects, such as correction error, that are caused by extraction error.

Further, with the image processing method of Attachment 2, it is possible to exhibit the effects of the image processing method of Attachment 1, allowing more appropriate color processing to be performed. Further, unlike the image processing method of Attachment 1, it is not necessary to calculate the visual characteristic information after color correction (balance correction) using the shift amount.

The image processing method of Attachment 3 is the image processing method according to either one of Attachment 1 or 2, in which the characteristic calculation step includes a brightness contrast process and a color contrast process of comparing the brightness information and the color information of the target pixels with surrounding brightness information and surrounding color information that are representative of the brightness information and the color information of the surrounding region.

The image processing devices according to Attachments 4 and 5 achieve the same effects as the image processing methods of Attachments 1 and 2.

The image processing programs according to Attachments 6 and 7 achieve the same effects as the image processing methods of Attachments 1 and 2.

The integrated circuits according to Attachments 8 and 9 achieve the same effects as the image processing methods of Attachments 1 and 2.

INDUSTRIAL APPLICABILITY

The invention is useful as an image processing method, display image processing method, image processing device, image processing program, and integrated circuit that includes that image processing device, in a field where there is a need to achieve image processing that performs color correction of an image more naturally and that has a simple configuration.

The invention claimed is:

1. An image processing method, executed with a processor, for performing color information correction of an image signal that has been input, comprising:
   an information calculation step of calculating color information of the image signal;
   a characteristic calculation step of comparing color information of a first region that is included in a two-dimensional image region created by the image signal, and color information of a second region that is present in an area around the first region, to calculate a contrast amount;
   a color information correction step of using the contrast amount to correct the color information of the first region so that the ratio with respect to the color information of the second region is enhanced; and
   an output step of outputting an image signal that includes the corrected first region.

2. The image processing method according to claim 1, further comprising:
   a region selection step of selecting, from the image signal, a plurality of target regions, each of which includes at least one pixel, to become a target of the first color information correction;
   wherein the information calculation step calculates the color information and brightness information of the image signal that has been input;
   wherein the characteristic calculation step compares the color information and the brightness information of the plurality of target regions that have been selected in the region selection step, with the color information and the brightness information of a plurality of surrounding regions that are present in the area around the plurality of target regions, to calculate a contrast amount;
   wherein the color information correction step includes a first color information correction step and a second color information correction step;
   wherein the first color information correction step performs the first color information correction using the contrast amount to correct the color information of the plurality of target regions so that the contrast with the color information of the plurality of surrounding regions is enhanced;
   wherein the second color information correction step performs a second color information correction on regions other than the plurality of target regions, using information related to the first color information correction; and
   wherein the output step outputs an image signal that includes the regions corrected in the first color information correction step and the second color information correction step.

3. The image processing method according to claim 2, wherein the region selection step includes a step of selecting regions that are located a predetermined spacing from the positions of the regions that become the target for the first color information correction.

4. The image processing method according to claim 2, wherein the region selection step includes a step of selecting a plurality of target regions to become the target for the first color information correction, using visual characteristic information related to the brightness information and the color information, or visual characteristic information related to only the brightness information, of the regions.

5. The image processing method according to claim 2, wherein the second color information correction step sequentially propagates the color information to the regions surrounding the plurality of target regions, based on the color information of the plurality of target regions that has been corrected in the first color information correction step, so as to correct the color information of the surrounding regions.

6. A display image processing method, comprising:
   a processing mode reception step of receiving a selection of a processing mode through input portion;
   an image processing execution step of executing the image processing method according to claim 1 in accord with the processing mode that has been obtained in the processing mode reception step; and
   a display step of displaying, on display means, the image signal after color information correction that is output in the image processing execution step.

7. A display image processing method, comprising:
   an ambient light detection step of detecting ambient light that is irradiated on display means for displaying an image signal;
   a processing mode determination step of determining a processing mode according to the ambient light that is detected in the ambient light detection step;
   an image processing execution step of executing the image processing method according to claim 1 in accord with the processing mode that has been determined in the processing mode determination step; and
   a display step of displaying on display means the image signal after color information correction that is output due to the image processing execution step.

8. The display image processing method according to claim 6,
   wherein the processing mode reception step selects a strength with which to correct the color information from a plurality of preset strengths.

9. The display image processing method according to claim 7,
wherein the processing mode determination step is performed in such a manner that the processing to correct the color information is valid in a case where the strength of the ambient light that has been obtained in the ambient light detection step exceeds a predetermined threshold value.

10. The display image processing method according to claim 7,
wherein the processing mode determination step is performed in such a manner that the strength with which to correct the color information is changed through a predetermined function according to the strength of the ambient light that has been obtained in the ambient light detection step.

11. The display image processing method according to claim 7,
wherein the processing mode determination step is performed in such a manner that the strength with which to correct the color information is changed over time through a predetermined function according to the change over time in the ambient light that has been obtained in the ambient light detection step.

12. The display image processing method according to claim 7,
wherein, in a plurality of regions included in the display region of the display means, the processing mode determination step controls the strength with which to correct the color information in each of the plurality of regions that are included in the display region according to the strength of the ambient light that has been obtained in the ambient light detection step.

13. The image processing method according to claim 1,
wherein correction of the color information is carried out in such a manner that the strength of the color information correction increases and decreases according to fluctuations in a size of a predetermined pattern that generates color contrast phenomena.

14. An image processing device for performing color information correction of an image signal that has been input, comprising:
an information calculation portion operable to calculate color information of the image signal;
a characteristic calculation portion operable to compare color information of a first region that is included in a two-dimensional image region created by the image signal, and color information of a second region that is present in an area around the first region, to calculate a contrast amount;
a color information correction portion operable to use the contrast amount to correct the color information of the first region so that the ratio with respect to the color information of the second region is enhanced;
an output portion operable to output an image signal that includes the corrected first region, and
a processor operable to control at least one of the information calculation portion, the characteristic calculation portion, the color information correction portion, and the output portion.

15. The image processing device according to claim 14, further comprising:
a region selection portion operable to select, from the image signal, a plurality of target regions, each of which includes at least one pixel, to become a target of the first color information correction;
wherein the information calculation portion calculates the color information and brightness information of the image signal that has been input;
wherein the characteristic calculation portion compares the color information and the brightness information of the plurality of target regions that have been selected by the region selection portion, with the color information and the brightness information of a plurality of surrounding regions that are present in the area around the plurality of target regions, to calculate a contrast amount;
wherein the color information correction portion includes a first color information correction portion and a second color information correction portion;
wherein the first color information correction portion performs the first color information correction using the contrast amount to correct the color information of the plurality of target regions so that the contrast with the color information of the plurality of surrounding regions is enhanced;
wherein the second color information correction portion performs a second color information correction on regions other than the plurality of target regions, using information related to the first color information correction; and
wherein the output portion outputs an image signal that includes the regions corrected by the first color information correction portion and the second color information correction portion.

16. In a digital computing device, a computer-readable recording medium storing an image processing program product for implementing an image processing method that performs color information correction of an image signal that has been input,
wherein the image processing method comprises:
an information calculation step of calculating color information of the image signal;
a characteristic calculation step of comparing color information of a first region that is included in a two-dimensional image region created by the image signal, and color information of a second region that is present in an area around the first region, to calculate a contrast amount;
a color information correction step of using the contrast amount to correct the color information of the first region so that the ratio with respect to the color information of the second region is enhanced, and
an output step of outputting an image signal that includes the corrected first region.

17. The image processing program product according to claim 16, further comprising:
a region selection step of selecting, from the image signal, a plurality of target regions, each of which includes at least one pixel, to become a target of the first color information correction;
wherein the information calculation step calculates the color information and brightness information of the image signal that has been input;
wherein the characteristic calculation step compares the color information and the brightness information of the plurality of target regions that have been selected in the region selection step, with the color information and the brightness information of a plurality of surrounding regions that are present in the area around the plurality of target regions, to calculate a contrast amount;
wherein the color information correction step includes a first color information correction step and a second color information correction step;

wherein the first color information correction step performs the first color information correction using the contrast amount to correct the color information of the plurality of target regions so that the contrast with the color information of the plurality of surrounding regions is enhanced;

wherein the second color information correction step performs a second color information correction on regions other than the plurality of target regions, using information related to the first color information correction; and wherein the output step outputs an image signal that includes the regions corrected in the first color information correction step and the second color information correction step.

18. An integrated circuit for performing color information correction of an image signal that has been input, comprising:

an information calculation portion operable to calculate color information of the image signal;

a characteristic calculation portion operable to compare color information of a first region that is included in a two-dimensional image region created by the image signal, and color information of a second region that is present in an area around the first region, to calculate a contrast amount;

a color information correction portion operable to use the contrast amount to correct the color information of the first region so that the ratio with respect to the color information of the second region is enhanced, and an output portion operable to output an image signal that includes the corrected first region.

19. The integrated circuit according to claim 18, further comprising:

a region selection portion operable to select, from the image signal, a plurality of target regions, each of which includes at least one pixel, to become a target of the first color information correction;

wherein the information calculation portion calculates the color information and brightness information of the image signal that has been input;

wherein the characteristic calculation portion compares the color information and the brightness information of the plurality of target regions that have been selected by the region selection portion, with the color information and the brightness information of a plurality of surrounding regions that are present in the area around the plurality of target regions, to calculate a contrast amount;

wherein the color information correction portion includes a first color information correction portion and a second color information correction portion;

wherein the first color information correction portion performs the first color information correction using the contrast amount to correct the color information of the plurality of target regions so that the contrast with the color information of the plurality of surrounding regions is enhanced;

wherein the second color information correction portion performs a second color information correction on regions other than the plurality of target regions, using information related to the first color information correction; and wherein the output portion outputs an image signal that includes the regions corrected by the first color information correction portion and the second color information correction portion.

* * * * *